US012033157B2

(12) United States Patent
Yeager

(10) Patent No.: US 12,033,157 B2
(45) Date of Patent: Jul. 9, 2024

(54) SYSTEMS AND METHODS FOR AUTHORIZING A TRANSACTION WITH AN UNEXPECTED CRYPTOGRAM

(71) Applicant: OV Loop, Inc., Northborough, MA (US)

(72) Inventor: Charles Douglas Yeager, Austin, TX (US)

(73) Assignee: OV Loop, Inc., Woburn, MA (US)

( * ) Notice: Subject to any disclaimer, the term of this patent is extended or adjusted under 35 U.S.C. 154(b) by 0 days.

(21) Appl. No.: 17/724,921

(22) Filed: Apr. 20, 2022

(65) Prior Publication Data
US 2022/0358513 A1 Nov. 10, 2022

Related U.S. Application Data

(63) Continuation of application No. 15/996,113, filed on Jun. 1, 2018, now abandoned, which is a continuation
(Continued)

(51) Int. Cl.
*G06Q 20/40* (2012.01)
*G06Q 20/02* (2012.01)
(Continued)

(52) U.S. Cl.
CPC ....... *G06Q 20/40975* (2013.01); *G06Q 20/02* (2013.01); *G06Q 20/20* (2013.01);
(Continued)

(58) Field of Classification Search
CPC ................... G06Q 20/00–425; H04L 9/00–50
See application file for complete search history.

(56) References Cited

U.S. PATENT DOCUMENTS 5,636,280 A 6/1997 Kelly
5,737,423 A 4/1998 Manduley
(Continued)

FOREIGN PATENT DOCUMENTS

CN 1882963 A 12/2006
CN 101048794 10/2007
(Continued)

OTHER PUBLICATIONS

Brazilian Office Action in Brazilian Application No. BR112014004374-4 dated Nov. 5, 2019, 5 pages (with English Translation).
(Continued)

*Primary Examiner* — Ari Shahabi
(74) *Attorney, Agent, or Firm* — Fish & Richardson P.C.

(57) ABSTRACT

Methods are described for performing a timely authorization of digital credential data delivered from a mobile device that is without access to a local persistently stored permanent cryptographic key. An application executable in the operating system of a mobile device receives a first non-permanent cryptographic key associated with the account from a remote computer system, stores the first non-permanent cryptographic key as a local cryptographic key associated with the account; generates a response cryptogram using the local cryptographic key and without accessing the permanent cryptographic key and sends a device response communication from the mobile device to an electronic reader of a POS terminal, the device response communication comprising an application data protocol unit containing the response cryptogram and an account identifier for the account.

16 Claims, 25 Drawing Sheets

Related U.S. Application Data of application No. 13/599,647, filed on Aug. 30, 2012, now Pat. No. 10,032,171.

(60) Provisional application No. 61/685,863, filed on Mar. 26, 2012, provisional application No. 61/573,476, filed on Sep. 6, 2011, provisional application No. 61/575,846, filed on Aug. 30, 2011.

(51) Int. Cl.
| | | |
|---|---|---|
| *G06Q 20/20* | | (2012.01) |
| *G06Q 20/32* | | (2012.01) |
| *G06Q 20/38* | | (2012.01) |
| *H04L 9/32* | | (2006.01) |

(52) U.S. Cl.
CPC ....... *G06Q 20/3223* (2013.01); *G06Q 20/326* (2020.05); *G06Q 20/382* (2013.01); *G06Q 20/385* (2013.01); *G06Q 20/40* (2013.01); *H04L 9/321* (2013.01); *H04L 9/3234* (2013.01); *H04L 9/3271* (2013.01); *H04L 2209/56* (2013.01); *H04L 2209/80* (2013.01)

(56) References Cited

U.S. PATENT DOCUMENTS

| | | | |
|---|---|---|---|
| 5,892,900 A | 4/1999 | Ginter | |
| 6,199,762 B1 | 3/2001 | Hohle | |
| 7,774,231 B2 | 8/2010 | Pond et al. | |
| 8,151,345 B1 | 4/2012 | Yeager | |
| 8,306,228 B2 | 11/2012 | Le Saint et al. | |
| 8,374,916 B2* | 2/2013 | White | G06Q 20/3223 705/16 |
| 8,548,924 B2 | 10/2013 | Yeager | |
| 8,549,586 B2 | 10/2013 | Mendel | |
| 8,806,600 B2 | 8/2014 | Taratine et al. | |
| 9,124,433 B2 | 9/2015 | Marien et al. | |
| 9,767,262 B1 | 9/2017 | Canavor et al. | |
| 10,032,171 B2 | 7/2018 | Yeager | |
| 11,080,693 B2* | 8/2021 | Fiske | G07F 7/127 |
| 2002/0026414 A1 | 2/2002 | Nakajima et al. | |
| 2002/0073315 A1 | 6/2002 | Candelore | |
| 2003/0163708 A1 | 8/2003 | Tang | |
| 2004/0118914 A1 | 6/2004 | Smith et al. | |
| 2004/0143550 A1 | 7/2004 | Creamer | |
| 2006/0022033 A1 | 2/2006 | Smets et al. | |
| 2006/0224470 A1 | 10/2006 | Garcia Ruano et al. | |
| 2007/0075133 A1 | 4/2007 | Yeager | |
| 2007/0156436 A1 | 7/2007 | Fisher et al. | |
| 2007/0266131 A1 | 11/2007 | Mazur et al. | |
| 2007/0278291 A1 | 12/2007 | Rans et al. | |
| 2007/0297610 A1* | 12/2007 | Chen | H04L 9/083 380/270 |
| 2008/0040285 A1 | 2/2008 | Wankmueller | |
| 2008/0046367 A1 | 2/2008 | Billmaier et al. | |
| 2008/0219444 A1 | 9/2008 | Benteo et al. | |
| 2008/0238610 A1 | 10/2008 | Rosenberg | |
| 2009/0006262 A1 | 1/2009 | Brown et al. | |
| 2009/0044012 A1 | 2/2009 | Bishop et al. | |
| 2009/0075592 A1 | 3/2009 | Nystrom et al. | |
| 2009/0124234 A1 | 5/2009 | Fisher et al. | |
| 2009/0143104 A1 | 6/2009 | Loh et al. | |
| 2009/0210308 A1 | 8/2009 | Toomer et al. | |
| 2010/0153721 A1* | 6/2010 | Mellqvist | H04W 12/03 713/168 |
| 2010/0185545 A1* | 7/2010 | Royyuru | G06Q 30/06 705/67 |
| 2010/0207742 A1 | 8/2010 | Buhot et al. | |
| 2010/0211504 A1 | 8/2010 | Aabye et al. | |
| 2010/0274726 A1 | 10/2010 | Florek et al. | |
| 2010/0317318 A1 | 12/2010 | Carter et al. | |
| 2011/0078245 A1* | 3/2011 | Kiffer | G06Q 20/355 709/204 |
| 2011/0099079 A1 | 4/2011 | White | |
| 2011/0112918 A1 | 5/2011 | Mestre et al. | |
| 2011/0140841 A1 | 6/2011 | Bona et al. | |
| 2011/0246369 A1 | 10/2011 | de Oliveira et al. | |
| 2011/0258452 A1* | 10/2011 | Coulier | H04L 9/3242 713/171 |
| 2012/0074219 A1* | 3/2012 | Burdett | G06Q 20/3827 235/380 |
| 2012/0109764 A1 | 5/2012 | Martin | |
| 2012/0173432 A1 | 7/2012 | Yeager | |
| 2012/0317628 A1 | 12/2012 | Yeager | |
| 2013/0054474 A1 | 2/2013 | Yeager | |
| 2013/0262317 A1* | 10/2013 | Collinge | G06Q 20/405 705/72 |
| 2014/0189359 A1 | 7/2014 | Marien et al. | |

FOREIGN PATENT DOCUMENTS

| | | |
|---|---|---|
| CN | 101048794 A | 10/2007 |
| CN | 101828205 A | 9/2010 |
| WO | WO200108113 | 2/2001 |
| WO | WO2009017754 | 2/2009 |

OTHER PUBLICATIONS

European Search Report in EP Appln. No. 19199694.1, dated Nov. 25, 2020, 7 pages.
European Search Report in European Patent Application No. 12827026.1, dated May 5, 2015, 14 pages.
Examination Report in European Patent Application No. 12827026.1, dated Jun. 23, 2017, 9 pages.
Examination Report in Malaysian Patent Application No. PI2014000569, dated Oct. 13, 2017, 3 pages.
Examiners Report in Canadian Patent Application No. 2,846,462, dated Aug. 1, 2017, 5 pages.
Extended European Search Report in European Appln. No. 21198983.5, dated Jan. 26, 2022, 11 pages.
International Preliminary Report on Patentability for International Application No. PCT/US2012/041670, dated Dec. 10, 2013, 14 pages.
International Preliminary Report on Patentability for International Application No. PCT/US2012/053129, dated Dec. 10, 2013, 10 pages.
International Search Report and Written Opinion for International Application No. PCT/US2012/041670, dated Aug. 17, 2012, 15 pages.
International Search Report and Written Opinion for International Application No. PCT/US2012/053129, dated Nov. 16, 2012, 12 pages.
ISO7816-4 (http://cardwerk.com/smartcards/smartcard_standard_ISO7816-4_annex-d.aspx) Feb. 13, 2009.
Murdoch et al., "Chip and PIN is broken", 2010, IEEE Symposium on Security and Privacy, May 2010, 14 pages.
Notice of Allowance issued for Canadian Patent Application No. 2,846,462, dated Feb. 1, 2018, 1 page.
Notice of Allowance issued for U.S. Appl. No. 13/599,647, dated Mar. 1, 2018, 13 pages.
Office Action for Canadian Patent Application No. 2,846,462, dated Nov. 4, 2016, 3 pages.
Office Action for Chinese Patent Application No. 20128053080.6, dated Jun. 22, 2016, 20 pages.
Office Action for U.S. Appl. No. 13/491,922, dated Jul. 27, 2015, 14 pages.
Office Action for U.S. Appl. No. 13/599,647, dated Oct. 6, 2015, 50 pages.
Office Action issued for Chinese Patent Application No. 201280053080.6, dated Apr. 25, 2018, 17 pages.
Office Action issued for Chinese Patent Application No. 201280053080.6, dated Mar. 7, 2017, 24 pages.
Office Action issued for Chinese Patent Application No. 201280053080.6, dated Oct. 18, 2017, 19 pages.
Office Action issued for Chinese Patent Application No. 201280053080.6, dated Sep. 26, 2018, 3 pages.

(56) References Cited

OTHER PUBLICATIONS

Office Action issued for U.S. Appl. No. 13/599,647, dated Jun. 14, 2016, 31 pages.
Office Action issued for U.S. Appl. No. 13/599,647, dated Jun. 5, 2016, 31 pages.
Patent Examination Report for Australian Patent Application No. 2012301897, dated Nov. 22, 2016, 4 pages.
Search Report issued for European Patent Application No. 12827026.1, dated Jun. 10, 2016, 6 pages.
Wikipedia.com [online], "Cryptographic hash function," Feb. 14, 2010, retrieved from URL<http://en.wikipedia.org/w/index.php?title=Cryographic hash function&oldid=344034775>.
*MasterCard Incorporated and MasterCard International Incorporated*, Petitioner, v. *OV Loop, Inc.*, Patent Owner, Case No. IPR2023-01289, U.S. Pat. No. 10,032,171, filed on Sep. 6, 2023, 97 pages.
*MasterCard Incorporated and MasterCard International Incorporated*, Petitioner, v. *OV Loop, Inc.*, Patent Owner, Case No. IPR2023-01290, U.S. Pat. No. 10,032,171, filed on Sep. 6, 2023, 97 pages.
*Mastercard Incorporated and Mastercard International Incorporation* v. *OV Loop, Inc.*, Decision Denying Institution of Inter Partes Reveiw; Case No. IPR2023-01290; U.S. Pat. No. 10,032,171, filed on Mar. 21, 2024, 11 pages.
*Mastercard Incorporated and Mastercard International Incorporation* v. *OV Loop, Inc.*, Decision Granting Institution of Inter Partes Reveiw; Case No. IPR2023-01289; U.S. Pat. No. 10,032,171, filed on Mar. 20, 2024, 36 pages.

\* cited by examiner

```
     ⎧ nUN:        3
     | UN:         00 00 08 99
     | ATC:        00 5E
     | CVC3_TRACK1: 2 LEAST SIGNIFICANT BYTES OF
  9 <                DES3(KD_CVC3) [77 80 00 00 08 99 00 5E]
     | CVC3_TRACK1: FB C7
     | CVC3_TRACK2: 2 LEAST SIGNIFICANT BYTES OF
     |                DES3(KD_CVC3) [99 D3 00 00 08 99 00 5E]
     ⎩ CVC3_TRACK2: B8 92

• SELECT PPSE COMMAND
     ⎧ >CARD: 00 A4 04 00 0E 32 50 41 59 2E 53 59 53 2E 44 44
  10<          46 30 31 00
     ⎩ CARD>: 6F 23 84 0E 32 50 41 59 2E 53 59 53 2E 44 44 46
               30 31 A5 11 BF 0C 0E 61 0C 4F 07 A0 00 00 00 04
               10 10 87 01 01 90 00

• SELECT AID COMMAND
  11⎧ >CARD: 00 A4 04 00 07 A0 00 00 00 04 10 10 00
     ⎩ CARD>: 6F 17 84 07 A0 00 00 00 04 10 10 A5 0C 50 0A 4D
               61 73 74 65 72 43 61 72 64 90 00

• GET PROCESSING OPTIONS COMMAND
  12⎧ >CARD: 80 A8 00 00 02 83 00 00
     ⎩ CARD>: 77 0A 82 02 00 00 94 04 08 01 01 00 90 00

• READ RECORD COMMAND
     ⎧ >CARD: 00 B2 01 0C 00
     | CARD>: 70 7F 9F 6C 02 00 01 56 3E 42 35 34 31 33 31 32
     |        33 34 35 36 37 38 34 38 30 30 5E 53 55 50 50 4C
     |        49 45 44 2F 4E 4F 54 5E 30 39 30 36 31 30 31 33
  13<        33 30 30 30 33 33 33 30 30 30 32 32 32 32 32 30
     |        30 30 31 31 31 31 30 9F 64 01 03 9F 62 06 00 00
     |        00 38 00 00 9F 63 06 00 00 00 00 E0 E0 9F 65 02
     |        00 0E 9F 66 02 0E 70 9F 6B 13 54 13 12 34 56 78
     |        48 00 D0 90 61 01 90 00 99 00 00 00 0F 9F 67 01
     ⎩        03 90 00

• COMPUTE CRYPTOGRAPHIC CHECKSUM COMMAND
  14⎧ >CARD: 80 2A 8E 80 04 00 00 08 99 00
     ⎩ CARD>: 77 0F 9F 61 02 B8 92 9F 60 02 FB C7 9F 36 02 00
               5E 90 00
```

FIG. 3

THE PAYPASS READER GENERATES THE TRACK 2 DATA TO BE INCLUDED IN THE AUTHORIZATION
MESSAGE AS FOLLOWS:
CVC3$_{TRACK2}$ IN BASE 10: 47250
ATC IN BASE 10: 94

=> TRACK 2 DATA:  54   13   12   34   56   78   48   00   D0   90   61   01
                   9   094  99   899  250            3    F
                       ↑↑↑       ↑↑↑  ↑↑↑            ↑
                       ATC       UN   CVC3$_{TRACK2}$  nUN

THE PAYPASS READER GENERATES THE TRACK 1 DATA TO BE INCLUDED IN THE AUTHORIZATION
MESSAGE AS FOLLOWS:
CVC3$_{TRACK1}$ IN BASE 10: 64455
ATC IN BASE 10: 94

=> TRACK 1 DATA:  42  35  34  31  33  31  32  33  34  35  36  37  38  34  38  30
                  30  5E  53  55  50  50  4C  49  45  44  2F  4E  4F  54  5E  30
                  39  30  36  31  30  31  33  33  34  35  35  33  33  33  30  39
                  34  32  32  32  32  32  38  39  39  31  31  31  31  33

ASCII DUMP:       B5413123456784800^SUPPLIED/NOT^0906101
                  33455333094222289911113
                  ↑↑↑      ↑↑↑ ↑↑↑ ↑
                  CVC3$_{TRACK1}$  ATC  UN  nUN

FIG. 4

| 211 | 212 | 213 | 214 | 215 | 218 | 380 | 216 | 217 |
|---|---|---|---|---|---|---|---|---|
| PAN | MK | UN | ATC | Transaction Data | Cryptogram | Temp Key | UN_TERM | Transaction Data TERM |
| 4147202082225410 | 45 | 476 | 0 | $20.55 USD | 01AFDE97... | 2345DF01... | N/A | N/A |
| 4064285484457038 | 45 | 876 | 64 | $12.10 USD | 230AC48D... | 025845AA... | N/A | N/A |
| 4147202082225410 | 45 | 348 | 9 | $9.67 USD | AA4FEC3B... | 848133AD... | N/A | N/A |
| | | | | | | | | |

| PAN | MK | UN | ATC | Transaction Data | Cryptogram | Temp Key | UN_TERM | Transaction Data TERM |
|---|---|---|---|---|---|---|---|---|
| 4147202086225410 | 46 | 476 | 8 | $20.98 USD | 014FD297... | 2345DF01... | 143 | $4.99 USD |
| 4054285004467036 | 46 | 876 | 54 | $12.13 USD | 200AC480... | 025845AA... | N/A | N/A |
| 4147202086225410 | 46 | 348 | 9 | $9.67 USD | A44FEC38... | 848133AD... | N/A | N/A |
| ... | | | | | | | | |

Fig. 26

| 351 | 352 | 353 | 354 | 355 | 356 | 357 | 358 | 359 | 360 | 361 | 362 | 363 | 364 | 365 | 366 |
|---|---|---|---|---|---|---|---|---|---|---|---|---|---|---|---|
| PAN | EXP | NAME | CODE | T1_DATA | T2_DATA | T1_FCVC3 | T2PCVC3 | T1_PUMATC | T2_PUMATC | T1_MATC | T2_MATC | CVM_LIST | AC | AVN | RMC |
| 5117891... | 1036 | DOUG... | 101 | 313353837330... | 1369700000000 | 000000000E0 | 00E0 | 00000000001E | 001E | 03 | 03 | 0800... | 0840 | 0001 | 012... |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

350

SYSTEMS AND METHODS FOR AUTHORIZING A TRANSACTION WITH AN UNEXPECTED CRYPTOGRAM

CROSS REFERENCES TO RELATED APPLICATIONS

This application is a continuation of, and claims a benefit of priority from U.S. patent application Ser. No. 13/599,647, filed Aug. 30, 2012, entitled "SYSTEMS AND METHODS FOR AUTHORIZING A TRANSACTION WITH AN UNEXPECTED CRYPTOGRAM," which claims priority from and is related to: U.S. Provisional Patent Application Ser. No. 61/575,846 filed Aug. 30, 2011, entitled: "Remote Hosted Secure Element Repository," U.S. Provisional Patent Application Ser. No. 61/573,476 filed Sep. 6, 2011, entitled: "Remote Hosted Secure Element Repository," U.S. Provisional Patent Application Ser. No. 61/685,863 filed Mar. 26, 2012, entitled: "Remote Hosted Secure Element Repository," each of which are fully incorporated by reference herein in their entireties.

FIELD

This disclosure relates to the field of payment and authorization methods. More particularly this disclosure relates to using a mobile computing device in combination with a remotely hosted Secure Element representation to make payments, authorizations or exchange information with other devices.

BACKGROUND

In some payment technologies such as smartcard payment, a microchip referred to as a "Secure Element" (SE) is embedded into a payment card, a payment fob (medallion), a cell phone, or other mobile devices that may be used for making payments. For the purpose of simplifying language in this document, a device that houses the SE will be referred to as a "card" or "card device". It is important to note that the "card" or "card device" may not physically resemble the shape or size of a typical payment card and may come in various form factors such as embedded into a mobile phone or embedded into a removable storage or removable device. Also, it is important to note that the SE may be an emulated software based SE and not strictly hardware based. For example, virtually any electronic device with a digital memory and processor or controller may be adapted to emulate and pretend to be an SE.

In order to extract information from the SE, an interrogator, also referred to in this document as a "reader," is required to interact electrically with the SE. The reader typically follows standards set forth by the International Organization for Standardization (ISO) and the International Electrotechnical Commission (IEC) and by application providers (such as VISA and MASTERCARD).

Secure element systems typically require that the user have physical possession of a card that matches the authorization capabilities of a merchant's system where a purchase is made. In many instances this is inconvenient. Therefore more flexible and convenient systems and methods for authorizing financial transactions are needed.

SUMMARY

Provided herein, in one embodiment, is a method for acquiring digital credential data by a point-of-sale terminal from a mobile device for authorization of a financial transaction. This embodiment includes a step of using a remote permanent cryptographic key to calculate an expected cryptogram that is expected to include at least a portion of the digital credential data. In this embodiment the remote permanent cryptographic key is persistently stored at a remote source that is remote from the mobile device and the mobile device does not store or access a duplicate local permanent cryptographic key persistently stored locally to the mobile device. This embodiment also includes a step of performing an interrogation between the point-of-sale terminal and the mobile device. This performing an interrogation step includes sending through a communication channel at least one POS command communication from the point-of-sale terminal to the mobile device requesting the digital credential data. This performing an interrogation step also includes sending through the communication channel at least one device response communication from the mobile device to the point-of-sale terminal including the expected cryptogram as the at least a portion of the digital credential data, such that the financial transaction is authorized.

A further embodiment provides another method for acquiring digital credential data by a point-of-sale terminal from a mobile device for authorization of a financial transaction. This embodiment includes a step of performing an interrogation between the point-of-sale terminal and the mobile device. This performing an interrogation step includes sending through a communication channel at least one POS command communication from the point-of-sale terminal to the mobile device, the at least one POS command communication that includes (a) a request for the digital credential data that is expected to include an expected cryptogram that is expected to be calculated, at least in part, from unpredictable data, and, at least in part, from a permanent cryptographic key and (b) the unpredictable data. This performing an interrogation step further includes sending through the communication channel at least one device response communication from the mobile device to the point-of-sale terminal, with the at least one device response communication including at least a portion of the digital credential data that includes an unexpected cryptogram, substituted in place of the expected cryptogram, such that the financial transaction is authorized.

A further embodiment provides a method for acquiring digital credential data by a point-of-sale terminal from a secure mobile device for authorization of a financial transaction. This embodiment includes a step of performing an interrogation between the point-of-sale terminal and the secure mobile device. In this embodiment the performing an interrogation step includes sending through a communication channel at least one POS command communication from the point-of-sale terminal to the secure mobile device, the at least one POS command communication comprising (a) a request for the digital credential data that is expected to comprise an expected cryptogram that is expected to be calculated, at least in part, from unpredictable data, and, at least in part, from a permanent cryptographic key and (b) the unpredictable data. In this embodiment the performing an interrogation step also includes sending through the communication channel at least one device response communication from the secure mobile device to the point-of-sale terminal, where the at least one device response communication includes at least a portion of the digital credential data that includes the expected cryptogram. Then, in a step that follows the step of performing an interrogation, a secure mobile device transmitting step is provided, which includes sending over a second communication channel the unpredictable data from the secure mobile device to a remote application system. Further in this embodiment, in a step that follows the step of performing an interrogation, a point-of-sale terminal transmitting step is provided, which includes sending over a third communication channel an authorization request from the point of sale terminal to the remote application system, where the authorization request includes the expected cryptogram and the unpredictable data. Further, in a step that follows the secure mobile device transmitting step and the point-of-sale terminal transmitting step, a corroborative authorizing step is provided. The corroborative authorizing step includes verifying a correctness of the expected cryptogram by the application system and verifying a correctness of the unpredictable data by the application system by comparing the unpredictable data sent over the second communication channel with the unpredictable data sent over the third communication channel. The corroborative authorizing step further includes sending through the third communication channel an authorization response from the remote application system to the point-of-sale terminal wherein data contained in the authorization response is determined, at least in part, by the verifying of the correctness of the unpredictable data and at least in part by the verifying of the correctness of the expected cryptogram, such that the financial transaction is authorized.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein:

FIG. 3 illustrates certain raw data related to an embodiment of a transaction between a reader and an SE;

FIG. 4 illustrates an embodiment of a format for which a reader may be required to deliver the results of a previous interrogation;

FIG. 22 illustrates an embodiment of data elements from a sequence of transactions prior to the processing of the transactions;

FIG. 26 illustrates an embodiment of data elements from a transaction during or after the processing of a transaction;

DETAILED DESCRIPTION

Figure 1:
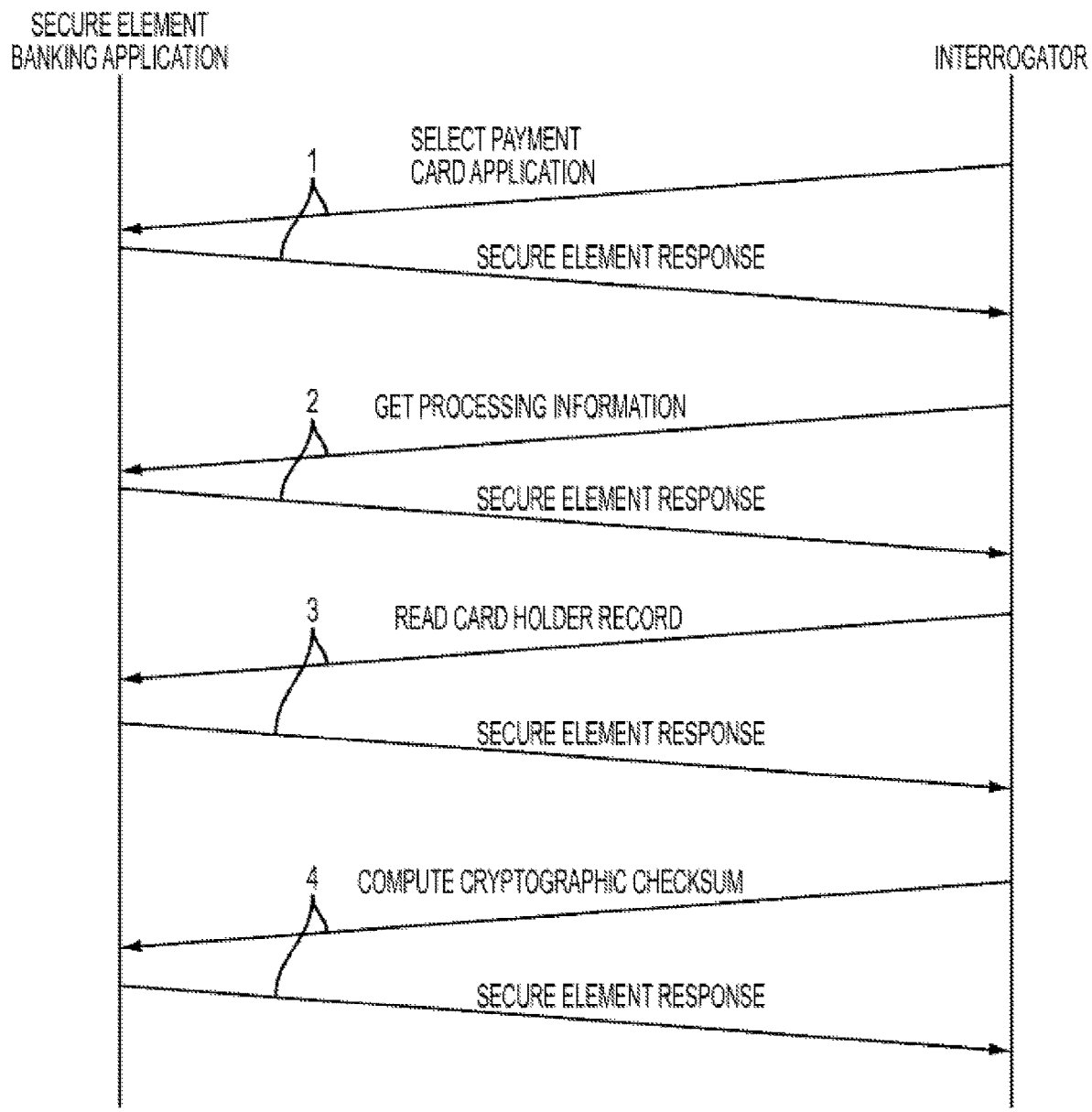
FIG. 1 illustrates an embodiment of a command and response APDU (Application Protocol Data Unit) flow between a reader and an SE.

In the following detailed description of the preferred and other embodiments, reference is made to the accompanying drawings, which form a part hereof, and within which are shown by way of illustration the practice of specific embodiments of systems and methods for acquiring digital credential data and for securing authorization for a financial transaction. It is to be understood that other embodiments may be utilized, and that structural changes may be made and processes may vary in other embodiments.

Prior to card issuance, an SE is typically injected with personalization or "credential" data that is generated from a "Hardware Security Module" (HSM). The HSM securely contains the cryptographic keys and algorithms that relate to a particular banking application and more specifically may contain a set of individual digital credentials. An HSM typically is accessed in a secure environment and never allows direct access to master keys which are used to create diversified keys or to encrypt or decrypt input data that may be provided to the HSM.

A significant advantage of extracting and delivering data that are contained within an SE is provided by an ability to know beyond reasonable doubt that the data string being delivered indeed came from a particular SE or card. This knowledge creates a more secure transaction with lower risk to the merchant, card issuing bank, and card associations. Traditionally the methods for extracting information from a banking card involve swiping the magnetic stripe on a card through a magnetic stripe reader, or extracting the information with a separate contact or contactless reader connected to a point-of-sale (POS) terminal. Because of inherent security that is provided by these methods of extracting the information on the card, a merchant may receive a lower transaction fee for that particular transaction. On the other hand, reading or entering account numbers, expiration dates, and card verification codes off of a card during a phone call or internet shopping experience is less secure, and may result in a higher transaction fee.

It is important to note that acquiring transactional data from an SE (such as Track1/Track2 data that are equivalent to data located on a card magnetic stripe) is significantly different than simply using a duplicate of transactional data (such as a copy of Track1/Track2 data). A typical magnetic stripe on a card is a static data set because it never changes Track 1/Track2 data between transactions or "swipes". For this reason, the data on the stripe may simply be copied or duplicated for use without having physical access to the payment card. Simply copying the card digits printed on the front and back of the card presents this same security risk. In other words, the data on a magnetic stripe may be copied and even programmed to another mobile device and used to make transactions continuously from the copy with no technical limitation. In the same way, card numbers that are simply copied from the face or front or back of the card and programmed to a mobile device and may also be continuously used to make transactions without a technical limitation.

In contrast to the acquisition of transactional Track1/Track2 data from a magnetic stripe on a card, the acquisition of transactional Track1/Track2 data from a SE is "singular." In other words, those data have a life span of a single transaction or a single "swipe" and then the data are no longer valid. Moreover, the Track1/Track2 data acquired during normal usage of an SE cannot be created by any other entity except the SE which has been programmed with at least one secret key owned by the bank that loaded the key(s) and their accessing system to that SE.

Knowing this difference, various embodiments disclosed herein are directed specifically to SE transactions because the security of these types of transactions makes the architecture much more credible and secure under current industry banking and processing standards.

Cards containing an SE are typically presented to an RFID (Radio Frequency Identification) reader device as the interrogator that extracts the information from the card and delivers the data to the POS terminal and then forwarded by the POS terminal on to a card processor for authorization. Mobile phones that contain NFC (Near Field Communication) functionality with embedded SEs have the ability to pretend to be (or emulate) a card that contains an SE. In this case the mobile phone may be presented to the RFID reader just as a card would be presented, and the information may be extracted from the SE that is on the mobile phone and delivered to POS, which then forwards the data on to a card processor for authorization.

Figure 31:
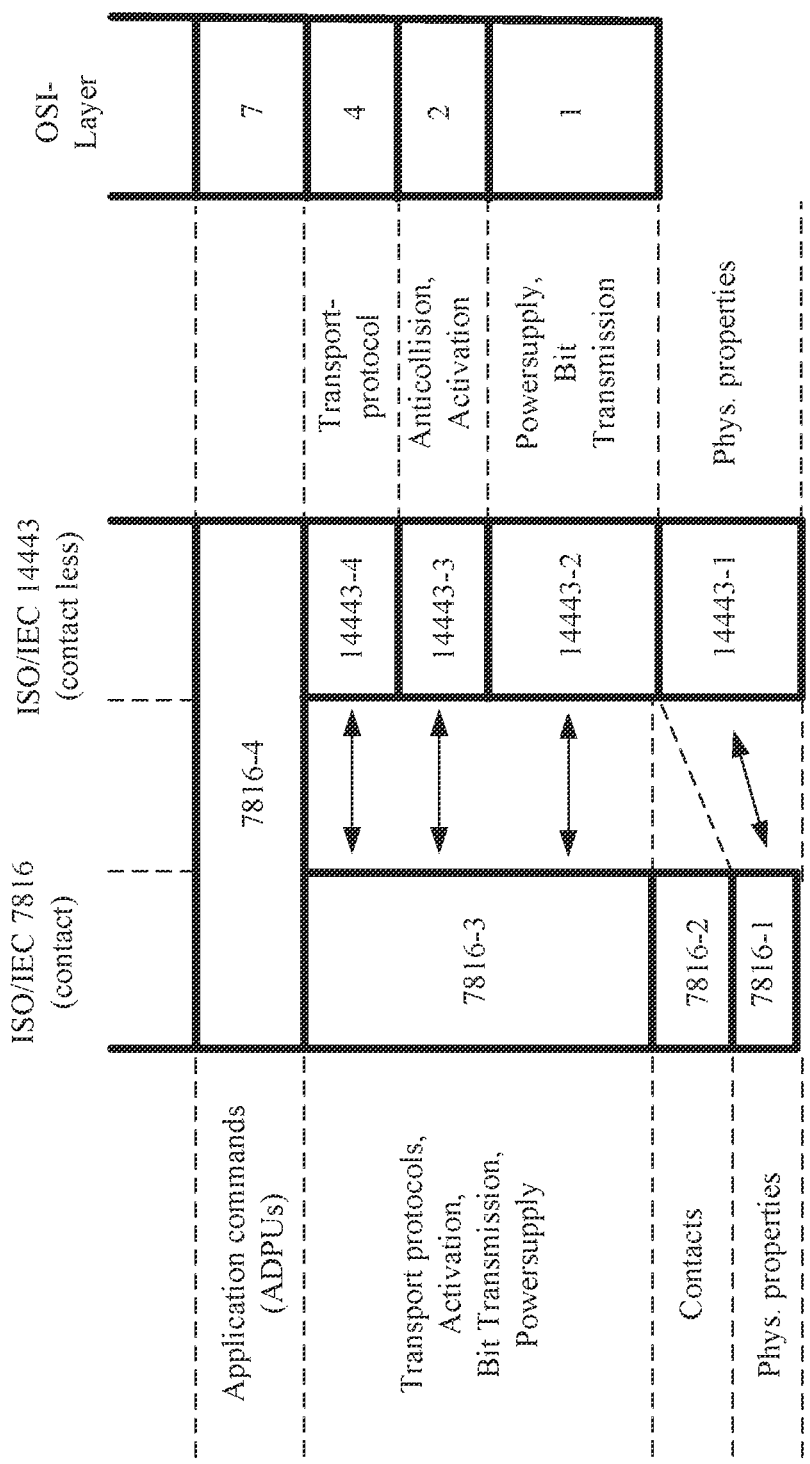
FIG. 31 illustrates layers of communication protocols associated with ISO/IEC specification 7816.

FIG. 1 describes a protocol level communication between a reader and an SE. The protocol layer is a standard protocol referred to as APDU. APDU stands for Application Protocol Data Unit and typically the protocol is defined by ISO/IEC specification 7816. This specification (commonly referred to as "ISO 7816") is a broad specification with different sections directed toward different "layers" of communication protocols, as seen in FIG. 31.

Communications referred to herein as being according to ISO7816-4 correspond to Open Systems Interconnection (OSI) layer 7. The OSI model is a product of the Open Systems Interconnection effort at the ISO. OSI layer 7 is a high-level software applications layer. The APDU section of the 7816-4 specification describes two forms of APDU communications abbreviated as C-APDU ("command APDU") and R-APDU ("response APDU"). "Commands" are sometimes referred to as "queries" because they originate from an "interrogator," which has a querying connotation.

The APDU data typically are transmitted over the air on 13.56 MHz radio waves between the reader and the SE. There is no hardware requirement limitation on this process; the APDU commands are just data moving from one entity to another. Various embodiments disclosed herein use the standard APDU commands to interact with the SE regardless of whether the SE is the mobile device's own embedded SE, or is a remote SE embedded into a different mobile device or a card. Communications 1, 2, 3 and 4 show the sequential commands of a typical command and response between and SE and a reader. Usually multiple steps are involved with accessing a SE, which involves multiple APDU commands and responses. FIG. 1 shows the general interrogation steps to access digital credential data specifically for a MASTERCARD PAYPASS Mag Stripe application running on an SE, according to "Mag Stripe.pdf" (Ver. 3.3) presently available at http://www.PayPass.com/approved-products.html. The term "digital credential data" as used herein refers to at least a portion of all data, including any data that are required to calculate the data, that are necessary to authorize approval of a transaction at a POS terminal.

Figure 2:
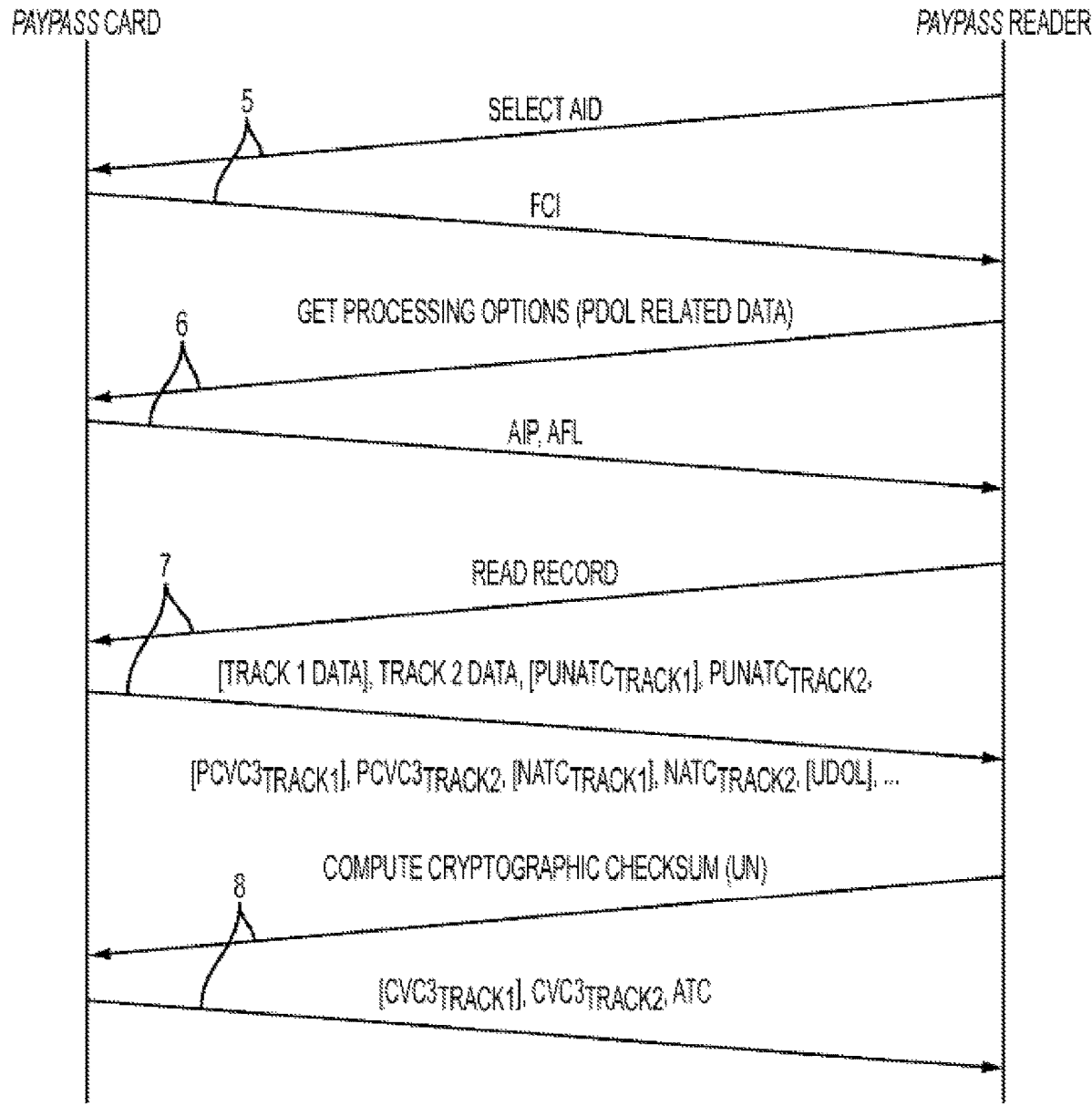
FIG. 2 illustrates an embodiment of a command and response APDU flow between a reader and an SE with specific details about the MASTERCARD PAYPASS application that may be installed on the SE.

FIG. 2 describes the detailed commands and responses expected when a reader interrogates a MASTERCARD PAYPASS Mag Stripe Ver. 3.3 application running on a SE. This sequence is provided in the MASTERCARD PAYPASS card specification. Shown in FIG. 2 are communications 5, 6, 7, 8 and 9 with details including abbreviations and acronyms explained subsequently herein.

FIG. 3 describes example transactions at the ISO/IEC 7816-4 Application Protocol Data Unit (APDU) protocol level between a reader and a card. The transaction processing depicted in FIG. 3 is representative of the MASTERCARD PAYPASS Mag Stripe application card specification v. 3.3. The notation ">CARD" denotes commands to the card and the notation "CARD>" denotes responses from the card. Communication 9 defines some of the initial parameters used in the transaction which include an unpredictable number issued by the reader, a transaction counter maintained on the SE. Communication 10 describes the command that the reader issues to the SE to find out what applications exist on the SE. This example shows that the MASTERCARD PAYPASS application responds as an active one. Next, communication 11 shows how the reader commands the SE to properly select the PAYPASS application for further processing. Communication 12 shows how the reader receives the type of processing options that the PAYPASS application supports. Communication 13 shows how the reader commands and then receives the PAYPASS application specific credential information about its card holder including card account number, holder name, expiration date, and more. Communication 14 shows how the reader receives the dynamic aspects of the transaction that will be inserted into the Track 1 and Track 2 data. This command uses a shared key on the SE, the unpredictable number from the reader, and the transaction counter on the SE to determine a new number sequence for each transaction called a cryptogram. After the SE calculates the cryptogram, it sends it back to the reader in the response APDU. These data are obtained through the MASTERCARD PAYPASS card specification that was referenced earlier in this document. All details including abbreviations and acronyms are explained in detail through that card specification document.

Figure 5:
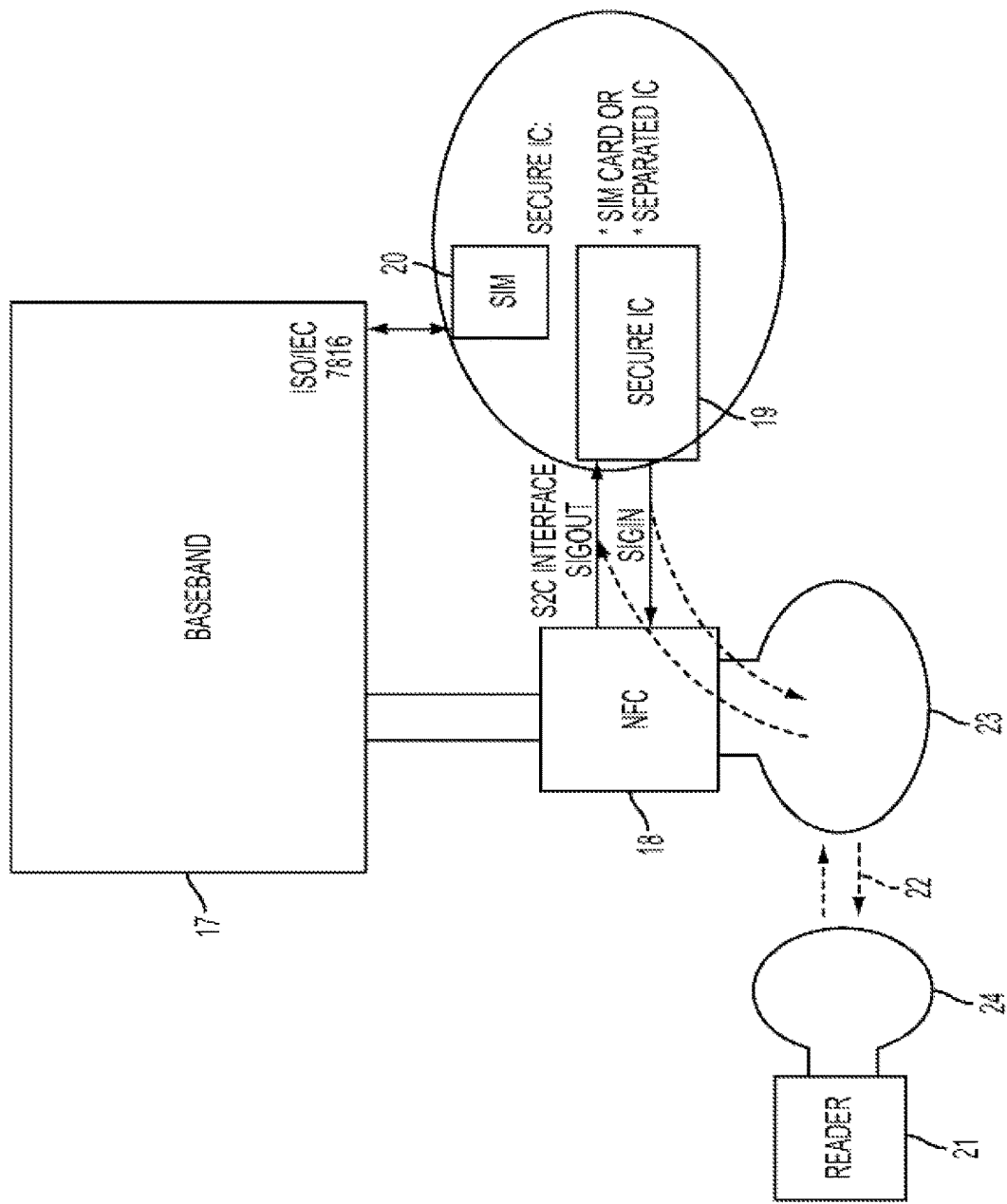
FIG. 5 illustrates an embodiment of a diagram of a mobile device that contains NFC capabilities.

FIG. 4 describes how the reader 21 in FIG. 5 formats the response data received from the SE into accepted Track1 and Track2 data strings that are used in existing processing systems. Communication 15 shows a Track2 data string built from the card interrogation in FIG. 3. The CVC3 (Track2) UN and ΔTC numbers will all vary with each transaction or interrogation of the SE. Communication 16 shows a Track1 data string built from the card interrogation in FIG. 3. CVC3 (Track1), ATC, and UN numbers will all vary with each transaction or interrogation of the SE. These data are obtained through the MASTERCARD PAYPASS card specification that was referenced earlier herein. All details including abbreviations and acronyms are explained in detail through the cited MASTERCARD card specification document.

FIG. 5 describes the inner architecture of a mobile device that supports NFC functionality. Examples of such devices are described in U.S. Pat. No. 8,151,345 issued to C. Douglas Yeager from U.S. patent application Ser. No. 12/019,318. U.S. Pat. No. 8,151,345 and U.S. patent application Ser. No. 12/019,318 are incorporated by reference in their entirety herein. A base band processor 17 of a mobile device typically runs an OS (Operating System) to control all aspects and interfaces on the device including communication access to the SIM, NFC controller, Secure IC 19. The NFC controller acts as a router to determine where the communication is routed. The baseband controller has the option:

a. To communicate through the NFC controller to the reader and antenna 23 to communicate with an external card or device 24 over 13.56 MHz radio 22. There are 2 modes of this:
  i. The external card or device is a passive tag. This is reader mode
  ii. The external card or device is a mobile device in peer to peer mode.
b. To communicate through the NFC controller to the embedded Secure IC
c. To configure the NFC controller into card emulation mode in which case the NFC controller routes information from the external antenna 23 directly to the Secure IC 19 or a SIM 20.

Both options a. and b. could use APDU data to exchange information between the baseband processor 17 and the applications located in the internal SE 19 or to a remote SE. It is important to note that the SIM 20 or Secure IC (SE 19) may also be created with software and emulated within the baseband processor 17. The interrogation example mapped out in FIGS. 3 and 4 could easily be implemented on this system in all three modes a., b., and c. above. This suggests that the baseband processor 17 could perform the identical interrogation on the internal secure element 19.

Figure 6:
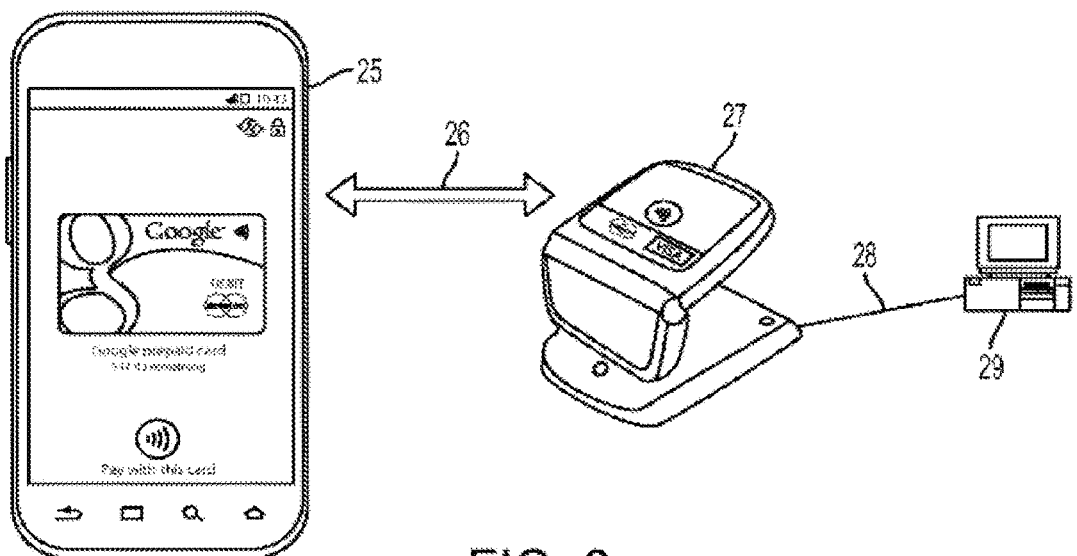
FIG. 6 illustrates an embodiment of a diagram for how a mobile device that contains NFC capabilities and how that device may be used with an RFID POS reader.

FIG. 6 describes a typical interaction between a mobile device with NFC functionality and an RFID POS reader. The mobile device 25 is set to NFC mode in which it is emulating or pretending to be a card. The mobile device 25 is then presented to the RFID reader 27 and communication begins over the 13.56 MHz baseband 26. The reader then interrogates the card similar to FIG. 1 and FIG. 2, and FIG. 3 and compiles the standardized credential data into Track1 and Track2 equivalent data like in FIG. 4. The term "equivalent" is used in some industry documentation to refer to Track1/Track2 data that were not generated by a magnetic-head reader from a magnetic stripe on a card, but instead are created in a purely digital data form, such as by an RFID reader. The term "Track Data" is used herein to refer to data comprising all or portions of the Track 1 and/or Track 2 data as defined in ISO7813. The data are then delivered to the connected POS computer 29 that then routes the data properly to the processor with other transactional information for authorization. In some embodiments Track Data are delivered to a field in a transaction authorization system using keyboard emulation. Some software applications expect data to be entered using a keyboard, and the application may check features of the data entry process, such as cadence and elapsed time, to verify that the data are entered via a keyboard. "Keyboard emulation" refers to a process of delivering data by a device or software representation of a device that is not a physical keyboard in manner that tricks the operating system into believing that a key has been pressed. Effectively the keyboard emulation system provides an entry as if it were a keystroke in a form field that correctly has the focus of the cursor.

Figure 7:
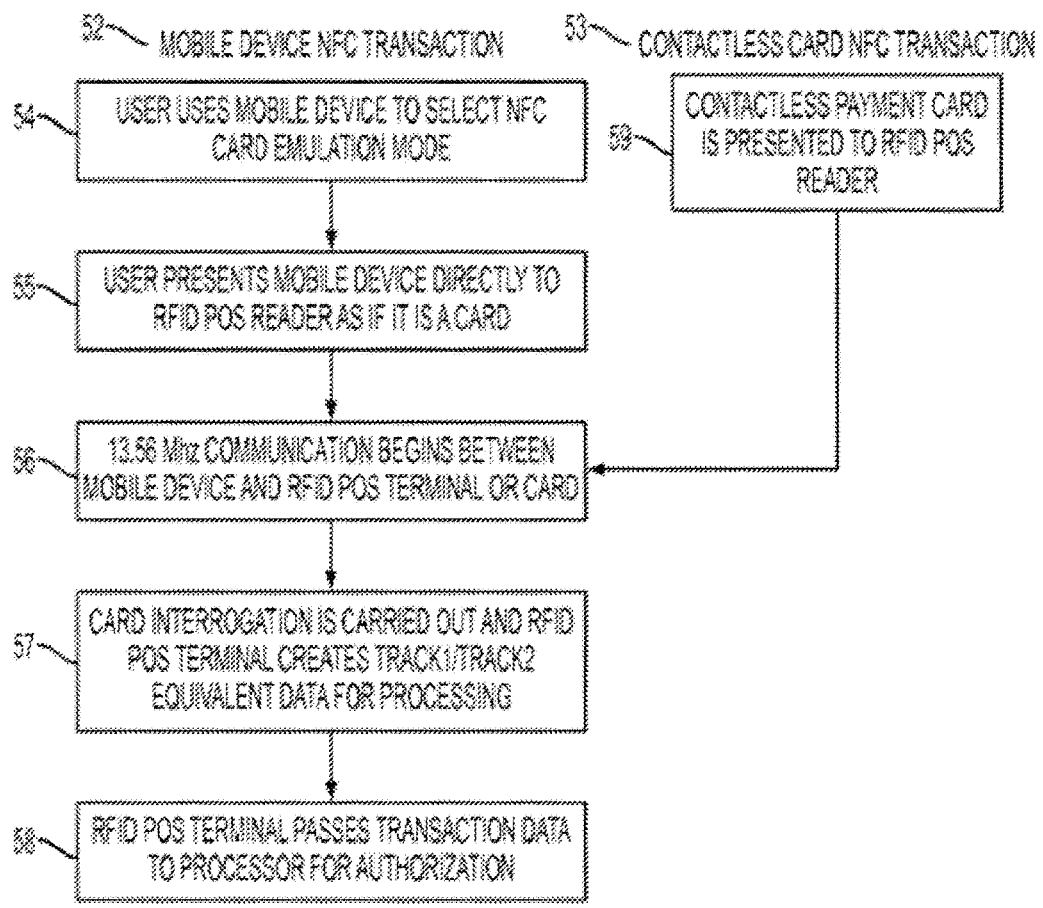
FIG. 7 illustrates an embodiment of an interaction flow between a typical RFID POS reader and a mobile device with NFC or a contactless card.

FIG. 7 describes a typical transaction flow between an NFC enabled mobile device 52 or a contactless card 53. Step 54 describes setting up the mobile device to perform a transaction with an RFID POS reader. Step 55 describes presenting the mobile device within field range of the RFID POS reader. Step 59 describes presenting a contactless payment card to an RFID POS reader. Step 56 describes the RFID POS reader interrogating either the mobile device or the contactless card over the 13.56 MHz radio. Step 57 describes how the RFID POS reader constructs the Track1/Track2 data from the interrogation. Step 58 describes how the formatted data are delivered to the POS and on to the processor for authorization.

The systems and methods described herein above may be extended to facilitate transactions at a point-of-sale terminal where it is not necessary for the user (e.g., the purchaser) to have physical possession of a card with a magnetic stripe or possession of a secure element at the point-of-sale terminal. Such systems typically employ a "Remote Hosted Secure Element" (RHSE). An RHSE is a repository for a plurality of "secure element representations" each of which is provided for one or more mobile devices or mobile device owners. The repository storing the plurality of secure element representations is typically remote from the point-of-sale terminal. As used herein the term "remote" refers to locations that are geographically far apart. One indication of remoteness is that the two locations are not within a distances such that most persons at one or the other of the remote locations would consider walking to the other location, or at least would not be able to do so within one day. This frame of reference is provided merely to explain the meaning of the term "remote" and does not imply that actually walking between remote locations has anything to do with embodiments disclosed herein. To further explain remoteness using as an example the situation where many point-of-sale terminals are serviced by one repository, it is entirely possible that one or more of the point-of-sale terminals may be within walking distance of the repository. However, when that is not the case for most of the pointof-sale terminals having access to the repository, then all of these point-of-sale terminals are considered to be remote from the repository. As used herein the term "local" refers to locations that are geographically proximate to each other. One indication of a local relationship between two locations would be the locations are separated by a distance of less than one foot.

The plurality of secure element representations (or the "array of secure element representations") is typically hosted in a secure environment such that it is protected from cyber attack. The secure element representations may be (a) actual SE hardware (referred to herein as a "hardware representation"), or may be (b) virtual hardware secure element representations such as a computer model that simulates the operation of a hardware SE element (referred to herein as a "virtual hardware secure element representation"), or may be (c) data in a database (typically a secure database), such as static Track Data or data dynamically or statically generated by an HSM (Hardware Security Module), where the data in the database are elements of data that are typically stored in an SE memory (referred to herein as a "database secure element representation"). The term "software representation" is used herein to refer to either (i) a virtual hardware secure element representation or to (ii) a database secure element representation. As the terms are used herein, a "secure element," a "remote secure element," an "SE," or a "remote SE" may be a hardware representation, or a virtual hardware secure element representation, or a database secure element representation. Each form of representation, or a combination of just two of these three forms of representation, may be advantageously employed in certain embodiments such as described in the context of various figures and descriptions provided herein.

In a case where an array of secure element representations are present as actual SE hardware, a repository may be created with a network server that is connected to a wide-area network (such as the internet) and one or more SE readers that are each addressable by the network server. The one or more SE readers receive ISO 7816 protocol commands for communication to an SE using a communications protocol such as TCP/UDP/IP data packets. The one or more SE readers are each in communication with one or more SE's. Software and hardware that interacts with each card reader has the ability to query (command) each SE at a particular network address that corresponds to a particular remote mobile device. As a result data that are to be passed to a particular SE from a remote mobile device are translated (if necessary) and routed over a TCP/UDP/IP network to the correct hardware SE reader and hence to the SE. Responses from the SE are relayed to that particular remote mobile device. These readers and SEs are not limited to one particular form factor or any particular communications protocol.

In a case where an array of secure element representations are present as virtual hardware secure element representations, the one or more SE readers may interact with the virtual hardware secure element representations in substantially the same manner as the one or more SE readers interact with hardware representations (i.e., actual SE hardware). A software representation allows a completely contained system that gives the same remote mobile device functionality as the previous completely hardware based case. An example of a virtual hardware secure element representation is the jcop.exe software that is presently sold and supplied by NXP semiconductor within the JCOP tools suite. The jcop.exe software provided is not a secure element, but rather a self-contained smart card operating system contained within an executable file that is meant to run on a host computer as a process. When jcop.exe runs, it opens a communications port that is accessible through the host computer operating system. The communications port that jcop.exe opens up accepts and responds to 7816-4 protocol and effectively simulates real SE hardware. The JCOP tools suite that contains jcop.exe additionally is a development platform to develop Java Card applications. JCOP tools give the user the ability to program and test application-specific software. This is accomplished using a combination of a virtual machine (the Java Card Virtual Machine, one version of which is contain in the jcop.exe referenced above) and a well-defined runtime library, which largely abstracts the applet from differences between smart cards. Using this technique one can run and debug both the Java Card code for the application that will eventually be embedded in a smart card, as well as a Java application that will be in systems that will use the smart card, all working jointly in the same environment.

In the case where the SEs in an array of SEs are database secure element representations, a SE card reader is not needed to interrogate the SE representations. In such systems the data may be acquired by using an electronic processor to translate the ISO 7816-4 protocol queries (commands) from the remote device into standard database queries and then translating the database responses into ISO 7816-4 responses for transmittal to the remote device. An array of SEs may include combinations of one or more types of secure element representations. That is, an array may include hardware representations and/or virtual hardware representations and/or database secure element representations.

The SE hardware implementation may be the preferred case by the financial transaction industry simply because of the more secure nature of controlling the removable SE that may be manufactured with secure data residing on the SE chip in a secure facility and then shipped to the remote system facility to be plugged in and activated and verified.

Figure 10:
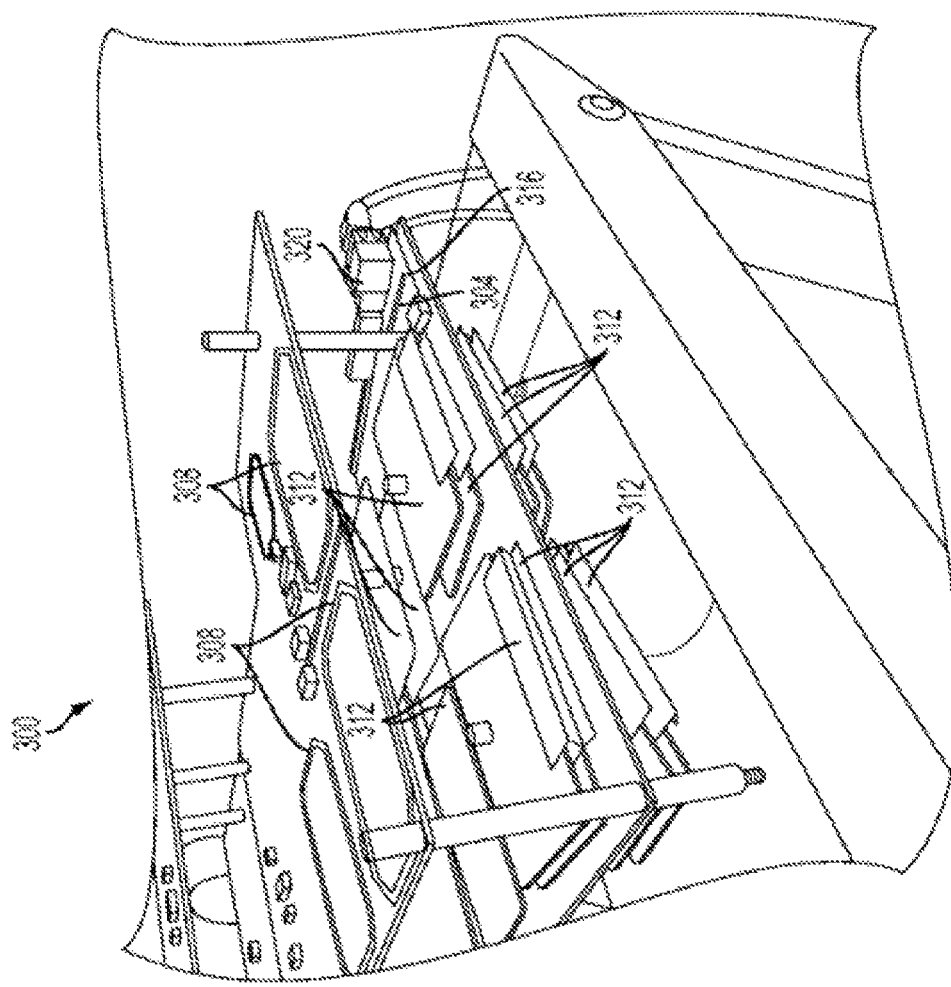
FIG. 10 illustrates an embodiment of a repository that uses hardware representations of secure elements.

FIG. 10 illustrates a repository 300 that employs hardware representations of secure elements. The repository 300 includes at least one secure element reader 304, and in the embodiment illustrated the repository 300 includes one secure element reader 304 having four RFID antennas 308. In the embodiment of FIG. 10, the secure element reader 304 is a contactless (RFID) reader operating under ISO 14443A or B protocols. A repository (such as the repository 300) typically includes a plurality of secure element representations, and in the embodiment of FIG. 10 the repository 300 includes eleven secure element hardware representations 312 each of which is integrated into one of eleven bank-issued transaction cards. In the embodiment of FIG. 10 the secure element reader 304 is disposed adjacent to the plurality of secure element hardware representations 312. As used herein the term "adjacent to" refers to a spatial condition where two devices are very close to each other, such as being in the same electronics cabinet, or at least in the same room. A data server 316 is provided to communicate with the plurality of secure element representations 312 through the secure element reader 304.

In typical embodiments a data server (e.g., the data server 316) is a hardware/firmware device that includes a multi-tasking processor, such as a multithreading processor, or a parallel processor, or a time-shared processor, to communicate with a plurality of secure element representations (e.g., the secure element hardware representations 312) through a secure element reader (e.g., the secure element reader 304). Typically such communication is conducted according at least one part (e.g., part 1, part 2, part 3 or part 4) of the ISO7816 specification to extract at least a portion of the digital credential data from the paired secure element representation. In some cases only the bus communication protocol of the ISO layer may be used, in other embodiments the data section (i.e., part-4) may be used, and in some cases several or all of the sections (i.e., parts-1 through part-4) of ISO7816 may be used. In the embodiment of FIG. 10 the secure element reader 304 includes a multiplexor in order to sequentially address the secure hardware element representations 312. Typically the multiplexor is part of the hardware at the reader circuitry level. In other embodiments the multiplexor may be provided in software. The multiplexing function allows a single secure element reader to rotate through multiple ports or antennas in order to address and communicate with a plurality of secure element representations. Such a configuration allows a data server (e.g., the data server 316) to conduct a plurality of command/response time-wise overlapping sessions with the plurality of secure element representations (e.g., the secure element hardware representations 312) without causing confusion about which card is being interrogated and which card is responding. The data server 316 also includes a network interface processor that communicates with the internet over an internet connection 320. The use a plurality of secure element hardware representations to store multiple different secure elements in a common processing environment in order to conduct a plurality of command/response time-wise overlapping sessions with the plurality of secure element hardware representations provides utility (as an SE repository) that is unexpected from the usual application a secure hardware representation, such as a single bank-issued card that is read by an SE reader at a point-of-sale terminal.

Figure 8:
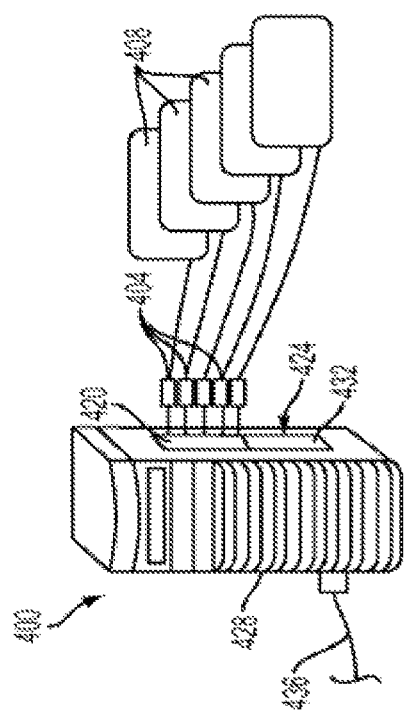
FIG. 8 illustrates an embodiment of a repository that uses hardware representations of secure elements.

FIG. 8 illustrates an embodiment of a repository 400 that employs a plurality of contact readers 404 operating under ISO 7816. A separate dedicated reader is provided for each of a plurality of secure element hardware representations 408. In the embodiment of FIG. 8 the secure element hardware representations 408 are bank-issued cards containing a secure element chip that is accessible by a Universal Serial Bus (USB) connector, and the contact readers 404 are USB readers. A first portion 420 of a CPU 424 in a computer 428 is a multitasking data server to conduct a plurality of command/response time-wise overlapping sessions with the plurality of secure element hardware representations 408 through the plurality of contact readers 404. The USB standards typically limit the number of USB ports on a computer to 127 ports. A different bus architecture may be used to overcome that limitation, or a single USB reader may be configured to address multiple cards through electronic or even mechanical switching mechanisms. In the latter case the switching mechanism acts as a portion of a multitasking data server. In some embodiments (such as, for example, embodiments that employ contact readers as illustrated in the FIG. 8) a plurality of secure element representations may be disposed proximate to a secure element reader. As used herein the terms "proximate to" and "local" refers to a spatial condition where two devices are close to each other, but may not be adjacent to each other. For example, two devices that are in the same building (but not the same room) are considered to be proximate to each other. The term "proximate to" encompasses devices that are "adjacent to" each other.

Continuing with FIG. 8, a second portion 432 of the CPU 424 is a network interface processor that communicates with the internet over an internet connection 436. The internet connection 436 to the second portion 432 of the CPU 524 provides addressability of the plurality of secure element hardware representations 408 over the internet. The use a plurality of secure element hardware representations to store multiple different secure elements in a common processing environment in order to conduct a plurality of command/response time-wise overlapping sessions with the plurality of secure element hardware representations provides utility (as an SE repository) that is unexpected from the usual application a secure hardware representation, such as a bank-issued card.

Figure 9:
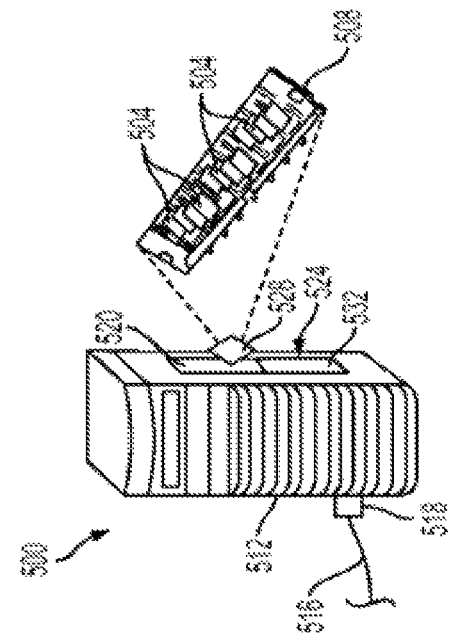
FIG. 9 illustrates an embodiment of a somewhat schematic representation of a repository that uses virtual hardware representations of secure elements.

FIG. 9 illustrates a repository 500 that employs virtual hardware secure element representations. A plurality of instances of virtual hardware secure element representations (shown symbolically as elements 504) is provided in a memory 508 of a computer 512. These virtual hardware secure element representations 508 may be multiple instances of the Java Card software previously described. Each instance is programmed as if it were a different secure element. Typically each instance is a separately-running thread of a standard jcop.exe program. Each instance may be run from a DOS command line such as:

jcop.exe-port 50000

Running that command opens up a TCP/IP PORT number 50000 and, presuming that the computer is on the internet (such as per internet connection 516), the program listens for telnet terminal type data on the telnet port, shown symbolically as element 518. It is expecting ISO7816-4 data communications and will respond just like a real SE with response ISO7816-4 data. Thus, when that program is running on the computer 512, another DOS window may be opened on a different computer to communicate with that instance of jcop.exe by executing the following command line:

telnet 192.168.0.14 50000 where the 192.168.0.14 is the IP address of the computer 512 where the simulation program (jcop.exe) is running, and where 50000 is the port number that it is running on. A local I/O bus 520 is controlled by a CPU 424 in the computer 512 so that when the telnet window on the second computer connects to that IP address and port number on the first computer 512, standard command/response communications may be established by sending 7816-4 formatted data and getting the response from the designated virtual hardware secure element representation 504 back into the telnet window of the second computer.

In the embodiment of FIG. 9, a first portion 520 of the CPU 524 operates as a secure element reader using a local I/O bus 528 to communicate with the virtual hardware secure element representations 504. The instances of virtual hardware secure element representations 504 are a plurality of secure element representations proximate to the secure element reader (I/O bus 528). A second portion 532 of the CPU 524 is a data server to conduct a plurality of command/response time-wise overlapping sessions with the plurality of secure element representations (e.g., the virtual hardware secure element representations 504) through the first portion 520 of the CPU 524 that is operating as the secure element reader. The second portion 532 also includes a network interface processor that communicates with the internet over the internet connection 516. In the embodiment of FIG. 9 the secure element reader (i.e., the first portion 520 of the CPU 524) is disposed adjacent to the plurality of virtual hardware secure element representations 504. In other embodiments a secure element reader may be disposed proximate to the plurality of virtual hardware secure element representations. The internet connection 516 to the second portion 532 of the CPU 524 provides addressability of the plurality of secure element representations (504) over the internet. The use of multiple instances of the JCOP environment to store multiple different virtual hardware secure elements in a common processing environment in order to conduct a plurality of command/response time-wise overlapping sessions with the plurality of virtual hardware secure element representations provides utility (as an SE repository) that is unexpected from the usual application of the JCOP programming environment.

Figure 11:
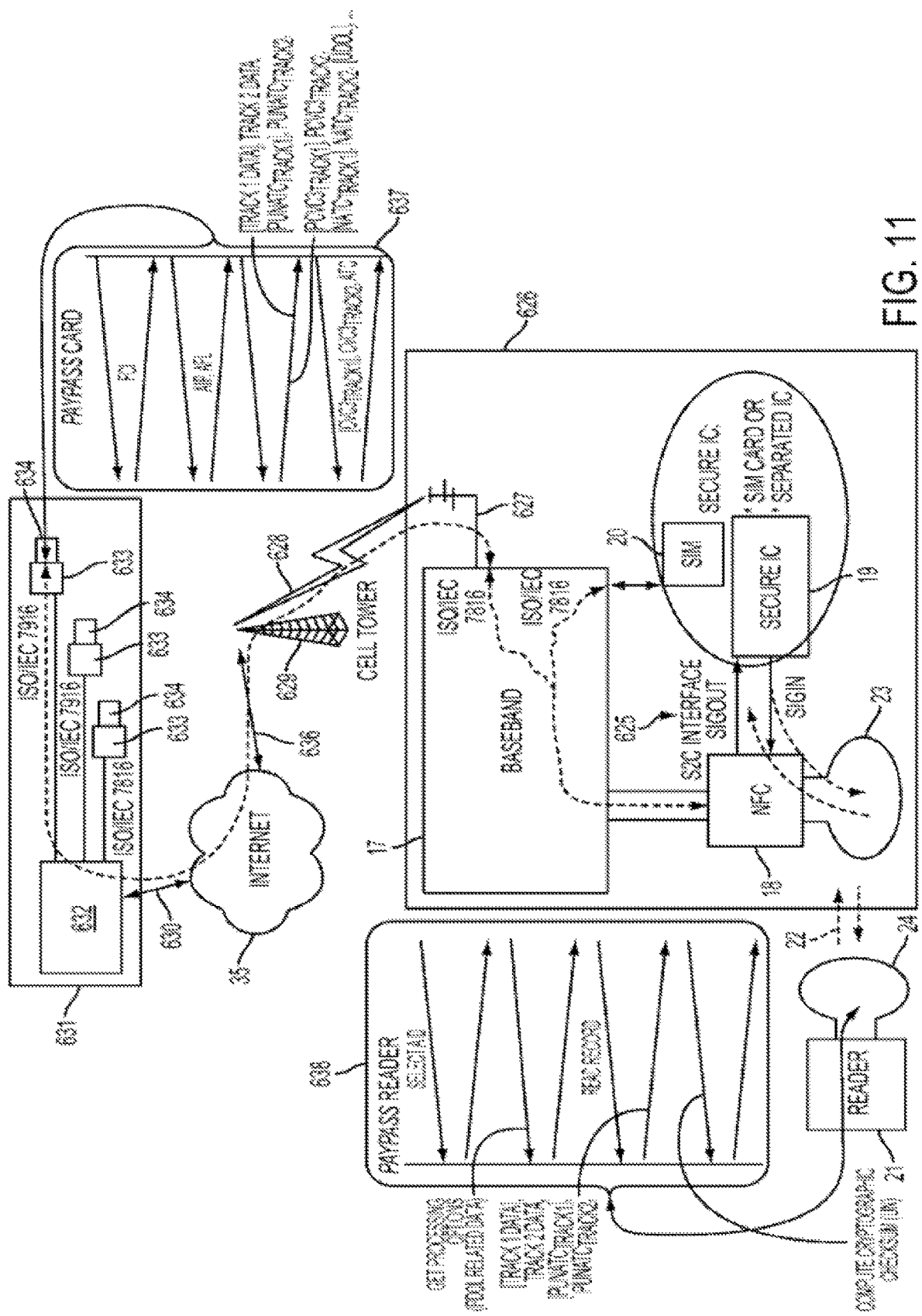
FIG. 11 illustrates an embodiment of a diagram of a mobile device that contains NFC capabilities and how that device may allow access to secure elements.

FIG. 11 describes an inner architecture of a mobile device 626 that supports NFC functionality and how that device may allow access to its attached secure elements as well as access to a secure element where the mobile device is remote from the secure element. A base band processor 17 is provided in the mobile device and the baseband processor 17 typically runs an OS (Operating System) to control all aspects and interfaces on the device including communication access to the SIM 20, NFC controller 18, Secure IC 19, or data that are eventually sent to the internet 35. The NFC controller 18 acts as a router to determine where the communication is routed. When a mobile NFC device is presented to an RFID POS, the mobile device may emulate a card (pretend to be a payment card). When this happens the NFC controller 18 which is controlled by the baseband processor 17 in the mobile device may be configured to route interrogation commands and responses (such as communications 1, 2, 3, 4, 5, 6, 7, and 8 depicted in FIGS. 1 and 2) from the reader (interrogator) 21 to a secure element for processing and response. Thus an SE application that is used in a payment transaction may be configured to respond to interrogation commands the same or similar to the sequences described in FIG. 1 and FIG. 2. The commands and responses illustrated in FIG. 1 and FIG. 2 are comprised of a string of data that conforms to ISO/IEC 7816 specification. The baseband controller may choose to route the commands from the reader 21 to any secure element it chooses for processing. Some of the options include:

a. Routing ISO/IEC 7816-4 data through the NFC interface 18 to an embedded secure IC over its proprietary connected SE interface 625 b. Routing ISO/IEC 7816-4 data through the NFC interface 18 through the baseband processor 17, to an attached SIM card 20 c. Routing ISO/IEC 7816-4 data through the NFC interface 18 through the baseband processor 17, to an attached SD, miniSD, or microSD card that contains an SE d. Routing ISO/IEC 7816-4 data through the NFC interface 18 through the baseband processor 17, over a data connection 627, 628, 629, 636, 35, 630 to a remote data server 632 using TCP/UDP/IP All options a., b., c., and d. use APDU data to exchange information between the RFID reader 21 and the applications located in an SE located in the mobile device 626 or in a remote SE 634. It is important to note that the remote SE 634 may also be created with software and emulated within the remote system 631. The interrogation example mapped out in FIGS. 3 and 4 may be implemented on this system in all 4 modes a., b., and c. above. Thus the remote system SE 634 may perform the identical interrogation on a remote secure element 634

It is important to note that at the ISO/IEC 7816-4 (APDU) level, an entire interrogation similar to those described in FIG. 1, and FIG. 2 may be carried out from a RFID POS reader 21 through an NFC enabled mobile device 626, through a data connection over the internet 35 to a remote system 631 that contains the actual SE 634. An example of reader commands is illustrated in element 638 as a PAYPASS reader. The PAYPASS reader 638 shows an exemplary sequence of ISO/IEC 7816-4 APDU commands and responses that may be pushed through the reader 21 and end up at the remote SE 634. Element 637 shows an example of APDU commands that are received by the remote SE 634 and the appropriate response that is issued as defined by the 7816-4 application for MASTERCARD PAYPASS. Elements 638 and 637 show how FIG. 2 may be broken up so that the PAYPASS card may be hosted on a remote SE 634 on a remote system 631 and show that the PAYPASS reader may be an RFID POS 621.

The remote system 631 has a connection to the internet 630 and connections to an array or plurality of SE readers 633 that are each connected to an SE 634. A server or set of servers 632 may be used for pairing the connections originating at the mobile NFC device 626 to the correct SE 634 within the remote system 631. The server or set of servers 632 may, for example, be one or more computers each of which has access to control one or more of the SE readers 633.

The data connection described in FIG. 11 (i.e., the path 627, 628, 629, 636, 35, 630) is a TCP/UDP/IP connection that is offered by most cellular carriers over a cellular network and cellular towers 629 using a cellular link 628. The TCP/UDP/IP connection may run socket software that allows for raw data to be transmitted from one end of the data connection 626 and the other 631 and vice versa. The data packets within the socket software may be configured to exchange data that contains ISO/IEC 7816-4 data.

In alternate embodiments a stationary device may be used in place of the mobile device 626 depicted in FIG. 11.

Figure 12:
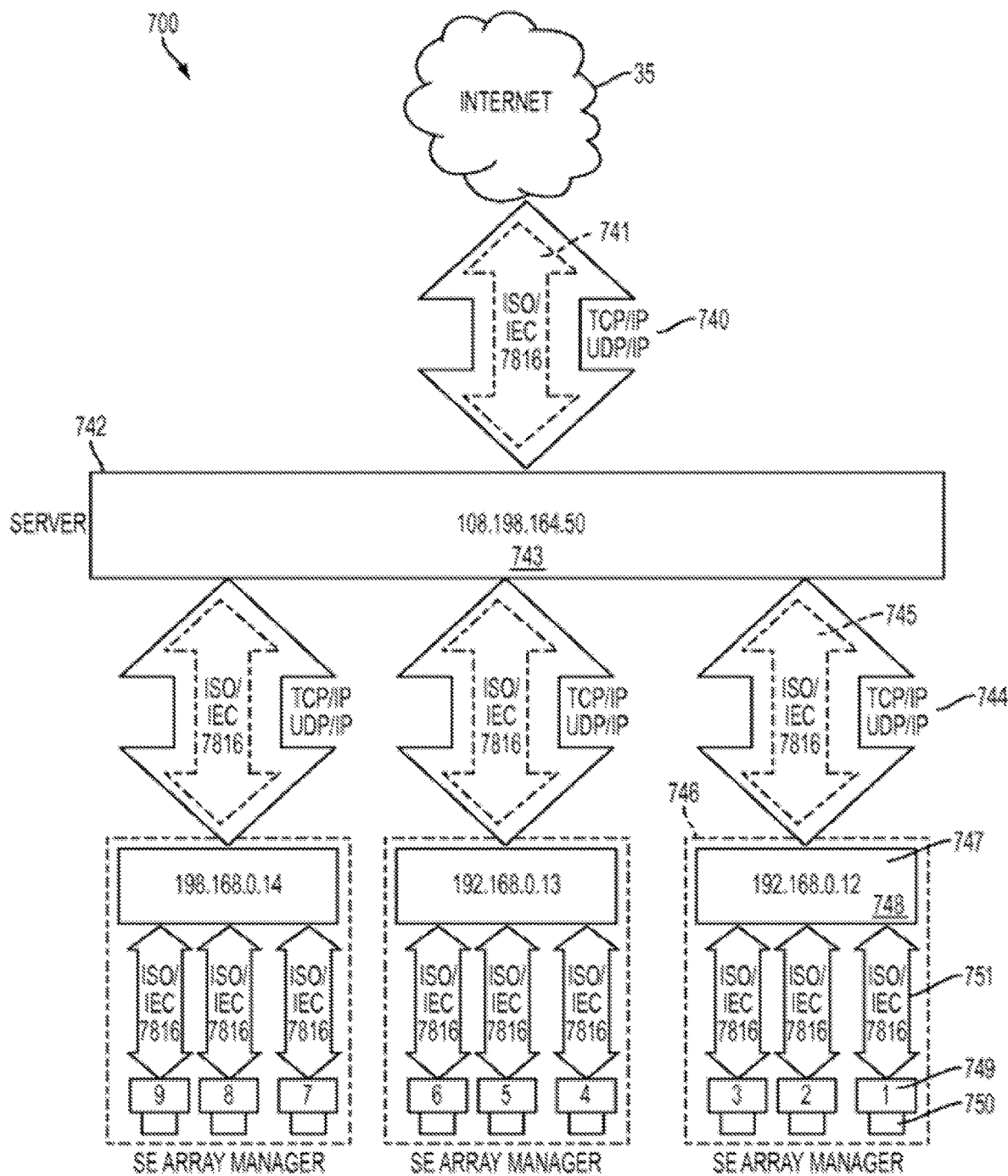
FIG. 12 illustrates an embodiment of a diagram of an addressable array of remote hosted SEs.

FIG. 12 describes a remote system 700 that is capable of bridging a data (TCP/UDP/IP) connection through the internet 35 to a single addressable SE reader 749 and SE 750. Communications 740 and 741 show how a data link (TCP/UDP/IP) 740 may be used to pass ISO/IEC 7816-4 APDU data 741 to a remote server 742. In this example the remote system is identified on the internet through the IP address 743. The remote system is comprised of a remote server 742 that routes the connection to an internet network of attached SE Array Managers 746. The TCP/UDP/IP data 740 that enters this remote system and is routed to the internal SE Array Manager 746 over TCP/UDP/IP 744 contains data that uses the protocol for ISO/IEC 7816-4 APDU data 741 and 745. Each SE Array Manager 746 contains an internally unique IP address 748 within a TCP/UDP/IP socket server 747. Each TCP/UDP/IP socket server 747 is responsible for receiving ISO/IEC 7816-4 APDU data 745 and routing as it as ISO/IEC 7816-4 APDU data 751 to the appropriate addressable SE reader 749 and SE 750.

FIG. 12 further illustrates one method to create a communication channel from the remote system to the mobile device over TCP/UDP/IP using socket server and client methods. Identification data from the mobile device may be used to set up a socket connection all the way through the remote server 742 to the TCP/UDP/IP socket server 747. The data that are sent over the socket server and client may be formatted to be ISO/IEC 7816-4 APDU data. The APDU command may enter the socket server 747 and be routed to the appropriate SE reader 749 and SE 750 and the response APDU may be sent from the SE 750 and SE reader 749 back to the remote mobile device through the SE Array Manager socket server 748, the remote system socket server 742, and through the internet 35 and be received by the socket client on the remote mobile device.

FIG. 12 also depicts a plurality of remote SEs that are each addressable and may be accessed by a plurality of remote mobile devices independently. The descriptions herein above describe how a single remote mobile device may connect to a remote system and specifically a single remote SE to complete a transaction. This same process may occur through this same system concurrently with different SE's in the system from different remote mobile devices.

Figures 13, 14:
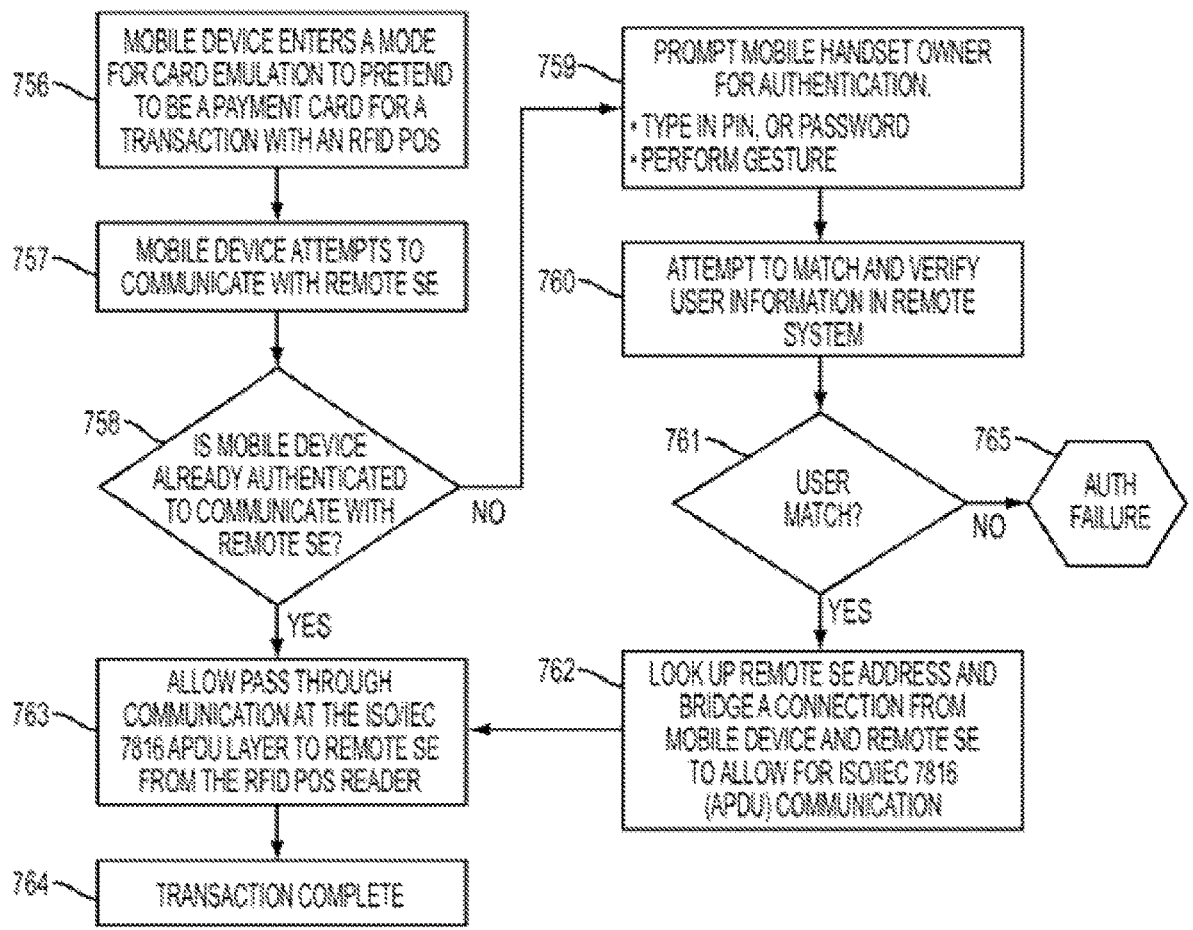
FIG. 13 illustrates an embodiment of a User ID SE address lookup table.
FIG. 14 illustrates an embodiment of an authorization flow for using a remote hosted SE.

FIG. 13 depicts a table in a database that may be used to identify which remote SE within a remote system described in FIG. 12 that a user and particular mobile device may be attached to. Unique row identifiers 754 are provided in the table. Each row contains related data. The other columns of this table are the User ID 752 and the SE Address 753. The SE address is the unique address within the remote system for a particular SE. The table of FIG. 13 further illustrates a relationship 755 between two fields that form a row in the database. This table in FIG. 13 may be used to properly match a remote user or remote mobile device with the address of a particular SE.

In order to connect to the remote system and create the connection to the correct SE for that user or mobile device, it is generally necessary that the mobile device must be validated by the remote system. At a minimum, validating a mobile device by a repository involves pairing a particular secure element or secure element representation to a specific mobile device. Generally this involves establishing at the repository a digital database that lists at least one secure element representation identifier for each of a plurality of mobile device identifications.

FIG. 14 describes one process flow for allowing a data connection between a mobile device and remote hosted secure element. Step 756 describes how a mobile device that supports NFC is initiated and presented to a RFID POS reader in order to make a payment transaction. The phone is placed into a mode that is referred to as card emulation mode where the NFC interface on the phone pretends to be contactless RFID card. The phone has a bit more control to select which card is presented to the POS. The subject of this patent describes how the NFC mobile device has the ability to use a SE for the transaction that is not physically located in the mobile device. This may be done be creating a data connection to a remote SE for which is used for the payment transaction. In step 757, while the phone is being placed into card emulation mode, the connection to the remote SE that will be used for emulation is attempting to connect. As illustrated in step 758 there is a chance that the connection is already open in which case the flow in FIG. 14 will simply allow the ISO/IEC 7816-4 APDU data to pass directly through the connection to the remote SE and back 763 successfully completing the transaction 764. There is also a chance that the connection to the remote SE does not exist and needs to be created, as described subsequently in step 762.

Typically systems require that a mobile device "authenticate" itself with a remote hosted secure element. The method of authentication to the remote system that is described in FIG. 14 may, for example, be initiated and completed using HTTPS/SSL (Hypertext Transfer Protocol Secure/Secure Socket Layer (SSL) or Transport Layer Security (TLS)) web services. Authentication may also be initiated and completed using a telephone link, such as a cell-phone connection. In some embodiments authentication is facilitated through a remote system authorization server. As used herein the term "remote authorization server" refers to an electronic computer or set of computers configured for the purpose of approving or disapproving access to a particular secure element by a particular mobile device or stationary device. In some embodiments a remote system authorization server may be configured to access secure element representations that may be either proximate to the remote authorization server or that may be proximate to the remote authorization server, and in such embodiments the remote system authorization server is considered to be a remote repository having a plurality of secure element representations. The mobile device connecting to the remote system is able to pass various credentials to the remote system such as user ID, passwords, PIN, "gesture signal," unique electronic communication device identity number, and so on securely to the remote system for mobile device validation 759. In steps 760 and 761 the system attempts to match and verify the user information in the remote system. Where a gesture signal is used, the verification includes an assessment as to whether the gesture signal is a valid gesture signal (i.e., a gesture signal that is expected by the remote system). Upon a successful match the remote system is said to "validate" the remote device, and the remote system opens up a communication channel (step 762) to the appropriate SE within the remote system and creates a handle to that communication channel that may be used to access it from the remote mobile device. When a communication link is established between a mobile device (or a stationary device) and a particular SE in a repository, the device and the particular SE may be described as being "paired" with each other. Once the mobile device is paired with a particular SE the remote system (repository) may securely pass back over HTTPS/SSL a shared encryption key and handle to the communication channel that may be used for continued communication over that communication channel through a TCP/UDP/IP data socket 762. If the authorization fails (step 765), the connection to the remote SE is not opened, and the process ends. When the remote device receives the shared encryption key and handle to the communication channel to a particular SE on the remote system, the ISO/IEC 7816-4 APDU commands from the RFID POS may be passed to this remote hosted SE through a socket connection and the data may be encrypted with the shared encryption key. The remote system may decrypt the data and send it to the correct SE within the remote system. The remote system may then send the response APDU from the SE back to the remote mobile device in a similar manner. The remote mobile device may forward this response APDU back through the NFC interface to the RFID POS reader.

Some electronic communication devices (such as a mobile device) have memory for storing at least a portion of digital credential data as cached data. Such electronic communication devices are configured to send the cached data as at least a portion of a device response communication. When such an electronic communication device authenticates with a secure element representation, cache data can be copied from or extracted from data within a single secure element representation that is specifically matched or "paired" to an electronic communication device and may be provided to the electronic communication device, such as in FIG. 17, element 801. In such embodiments the electronic communication device may be paired with the single secure element representation for the purpose of extracting or copying cache data and may not be paired for any subsequent command/response communications. Such cache data are a "cached portion" of a set of digital credential data, and in some embodiments this cached portion is all of the digital credential data that are needed to complete a transaction. In some embodiments the cache data may include an ISO 7816-4 protocol response communication. In some embodiments the cache data may also include ISO7816-4 protocol command communication for the purposes of matching or analyzing it against other incoming ISO7816-4 protocol command communication data to determine which ISO7816-4 protocol response communication from the cache to use.

Figure 15:
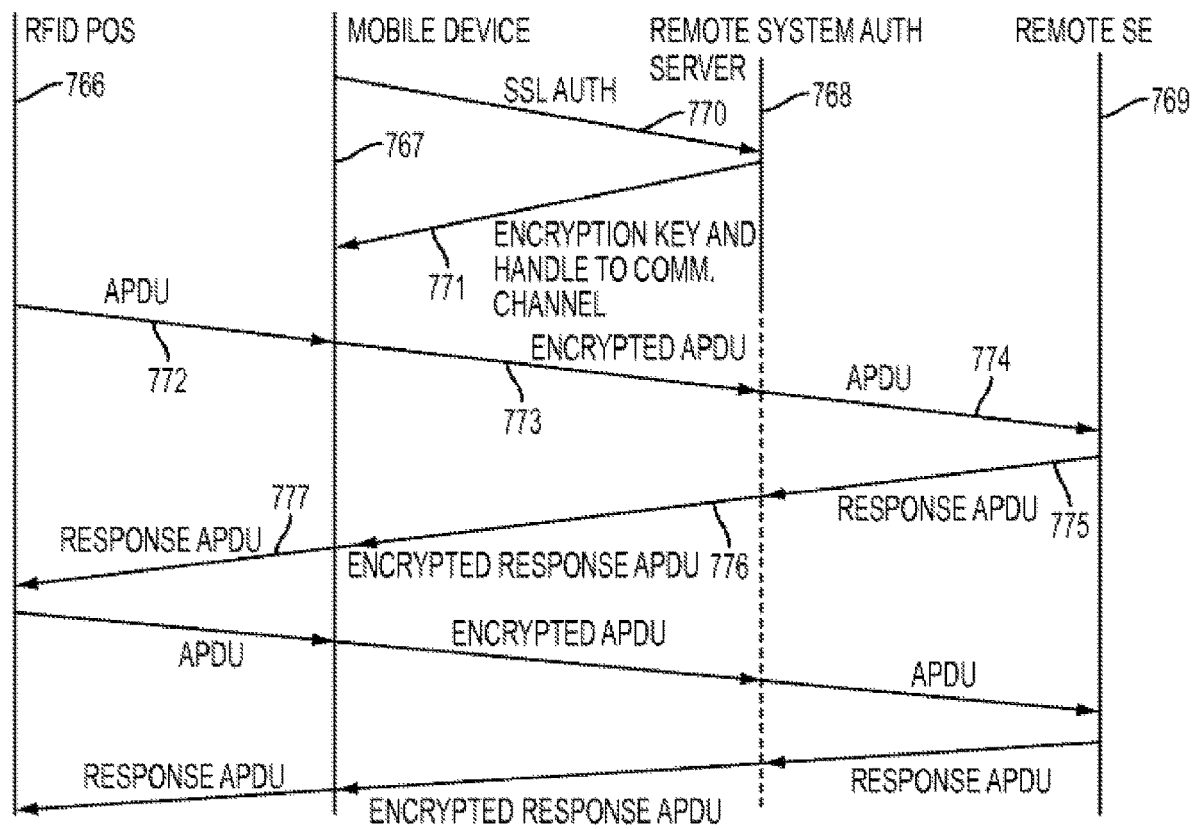
FIG. 15 illustrates an embodiment of a data flow diagram including authorization between a mobile device and a remote hosted SE.

FIG. 15 illustrates an authorization and communication process in more detail. The vertical line 766 represents the RFID POS entity. The vertical line 767 represents the mobile device. The vertical line 768 represents a remote system authorization server, and the vertical line 769 represents the remote hosted SE. As shown in FIG. 15, the mobile device 767 may interact with a remote authorization server (e.g., remote authorization server 768) in order to facilitate the access of digital credential data from a remote hosted SE (e.g., remote SE 769).

In the example of FIG. 15, a communication channel is opened between the RFID POS 766 and the remote SE 769. Authorization over SSL is initiated where credentials 770 are sent to the remote authorization server 768. The remote authorization server 768 verifies the credentials and sends back a successful response 771 which contains a handle to a communication channel and an encryption key. The mobile device 767 may then open a channel to the remote SE 769. At that point APDU command and response APDUs may be sent securely between the RFID POS reader 766 and the remote SE 769 and back through the mobile device 767. An APDU command 772 is sent from the RFID POS reader 766 to the mobile phone 767, which may encrypt that APDU as command 773 and forwards an APDU command 773 on to the remote system 768 and on to the remote SE 769 as APDU command 774. In some embodiments the command communications 773 and 774 comprise at least a portion of the command communication 772 from the RFID POS 766 to the mobile device 767. In some embodiments the mobile device 767 may know ahead of time what the RFID POS 766 will command the mobile device 767 in the APDU command 772 in advance of actually interacting with the RFID POS 766. In such cases the command 773 may have been sent already sent by the mobile device 767 before the command 772 was received by the mobile device 767 from the RFID POS 766. The return APDU response from the SE is delivered back to the RFID POS through the communication channel using the handle provided by the response 771, via communications 775, 776, and 777.

With some data networks that pass TCP/UDP/IP information there are network delays and latencies that contribute to delays for round trip information exchange with a destination. With many embodiments disclosed herein, data are intended to go round-trip from a mobile device to a remote SE. Many payment applications that communicate with an SE may require a plurality of commands and responses to the SE for each transaction carried out by an interrogation from the POS RFID reader. Each or some of these command and responses to the SE may be subject to network delays and latency. Prolonged delays during a transaction with the RFID POS may cause an unsatisfactory user experience. Here is an example of a delay that was recorded during evaluation of an embodiment described herein:
  a. Card transaction with a MASTERCARD PAYPASS plastic card and a RFID POS reader was measured to take ~200 ms
  b. Card transaction with a remote SE programmed with the MASTERCARD PAYPASS application over a 3G network managed by VERIZON through a mobile handset was measured to take ~600 ms The remote SE took ~400 ms longer in the above example due to network latency and delay during the SE interrogation.

A local cache (a memory located in the mobile device for data caching) may be implemented for use in some embodiments. Many of the responses to a 7816-4 APDU commands or queries are static and unchanging in a payment application on a SE. For this reason, a cache system may be configured to respond locally for these static information requests with the known 7816-4 APDU data responses, and to only generate real-time commands the remote SE in the event that the response 7816-4 APDU data are dynamic or changing with each transaction. This should limit the number of round trip data requests to the remote SE. Because each round trip request to the remote SE is subject to network delay and latency, a relatively significant total transaction time savings may be realized. The main advantages of implementing a caching system in the current invention is to save over-all time to perform a full transaction with a payment card application between a RFID POS reader through a mobile device to a remote SE.

Figure 16:
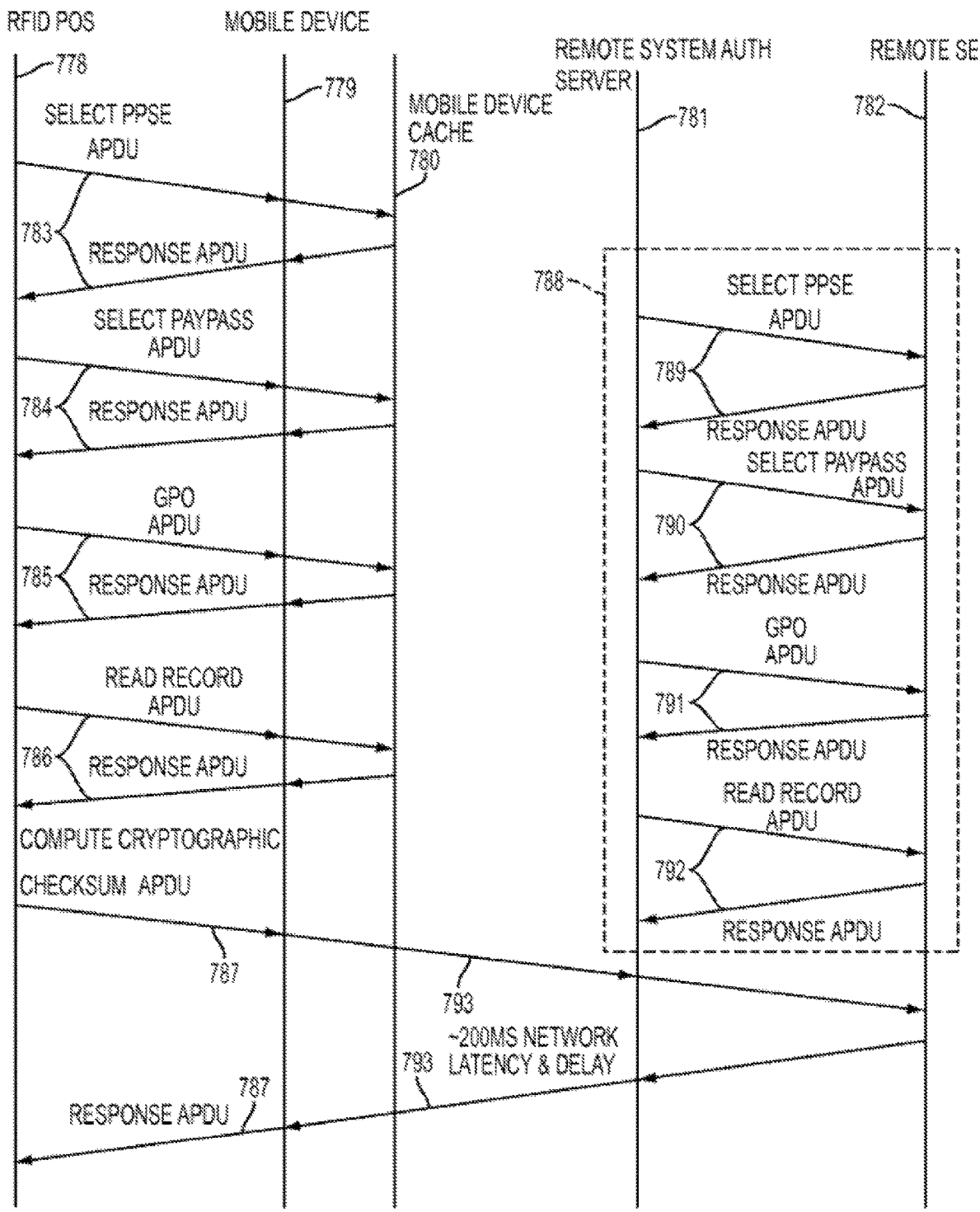
FIG. 16 illustrates an embodiment of an example of caching being used during a MASTERCARD PAYPASS transaction between a RFID POS and a remote SE.

FIG. 16 illustrates an example of caching being used during a MASTERCARD PAYPASS transaction between a RFID POS and a remote SE. The vertical line 778 represents the RFID POS entity. The vertical line 779 represents the mobile device. The vertical line 781 represents the remote system authentication server, and the vertical line 782 represents the remote hosted SE. The vertical line 780 represents the caching system in the mobile device.

The MASTERCARD PAYPASS card specification indicates that the response to the Select PPSE APDU 83 will always be the same:
  a. APDU to the card for Select PPSE APDU: 00 A4 04 00 0E 32 50 41 59 2E 53 59 53 2E 44 44 46 31 00
  b. APDU response from the card for Select PPSE APDU is ALWAYS: 6F 23 84 0E 32 50 41 59 2E 53 59 53 2E 44 44 46 30 31 A5 11 BF 0C 0E 61 0C 4F 07 A0 00 00 00 04 10 10 87 01 01 90 00

In some embodiments the fact that the APDU response from the card for Select PPSE APDU is ALWAYS a prescribed sequence is used to advantageously cache this response and then the caching system 780 may respond to this APDU without making a command all the way to the remote SE over the data network.

The MASTERCARD PAYPASS card specification indicates that the response to the Select PAYPASS AID APDU 84 always be the same:
  a. APDU to the card for Select PAYPASS AID APDU: 00 A4 04 00 07 A0 00 00 00 04 10 10 00
  b. APDU response from the card for Select AID APDU is ALWAYS: 6F 17 84 07 A0 00 00 00 04 10 10 A5 0C 50 0A 4D 61 73 74 65 72 43 61 72 64 90 00

This prescribed response to this APDU may also be cached and the caching system 780 may respond to this APDU without making a command all the way to the remote SE over the data network.

Furthermore, the MASTERCARD PAYPASS card specification indicates that the response to the GPO (Get Processing Options) APDU 785 always be the same:
  a. APDU to the card for GPO APDU: 80 A8 00 00 02 83 00 00
  b. APDU response from the card for GPO APDU is ALWAYS: 77 0A 82 02 00 00 94 04 08 01 01 00 90 00

This means that the response to this APDU may be cached and the caching system 780 may also respond to this APDU without making a command all the way to the remote SE over the data network.

The MASTERCARD PAYPASS card specification indicates that the response to the Read Record APDU 786 is to always be the same for a particular card that has been personalized, but will be different from personalized card to a different personalized card:
  a. APDU to the card for Read Record APDU: 00 B2 01 0C 00 b. APDU response from the card for Read Record APDU is ALWAYS for a specific card:
   70 7F 9F 6C 02 00 01 56 3E 42 35 34 31 33 31 32 33 34 35 36 37 38 34 38 30 30 5E 53 55 50 50 4C 49 45 44 2F 4E 4F 54 5E 30 39 30 36 31 30 31 33 33 30 30 33 33 33 30 30 30 32 32 32 32 32 30 30 30 31 31 31 31 30 9F 64 01 03 9F 62 06 00 00 00 38 00 00 9F 63 06 00 00 00 00 E0 E0 9F 65 02 00 0E 9F 66 02 0E 9F 6B 13 54 13 12 34 56 78 48 00 DO 90 61 01 90 99 00 00 00 0F 9F 67 01 03 90 00

This means that the response to this APDU may be cached and the caching system 780 may respond to this APDU without making a command all the way to the remote SE over the data network, UNLESS the card on the SE has changed to a different card, in which case the caching system should send this command to the remote SE for processing.

The MASTERCARD PAYPASS card specification indicates that the request and the response to the Compute Cryptographic Checksum APDU 787 will always be different for each transaction. This means that this APDU will always need to be processed by the actual remote SE through the data network. Communication 793 indicates the estimated or example of network processing time for this single APDU command and response 787. The over-all example in FIG. 16 illustrates how there is potentially only a single command and response that need to happen in real time over the data network 793 as a result of implementing a caching system.

In this specific example in FIG. 16, communications 788 illustrate one method to maintain the proper state of the remote SE 882 when a caching system is used. It is important that the remote SE 782 maintain the same processing state as the system is expecting when introducing a caching system. For this reason, it is important to actually issue the APDU commands to the remote SE in order to bring that SE to the appropriate system state. The dashed line illustrates how these ghost commands may be issued by the remote system in order for the SE to maintain an up-to-date state. The communications 789, 790, 791, and 792 mirror the APDU commands and responses 783, 784, 785, and 786 managed by the caching system 780.

Figure 17:
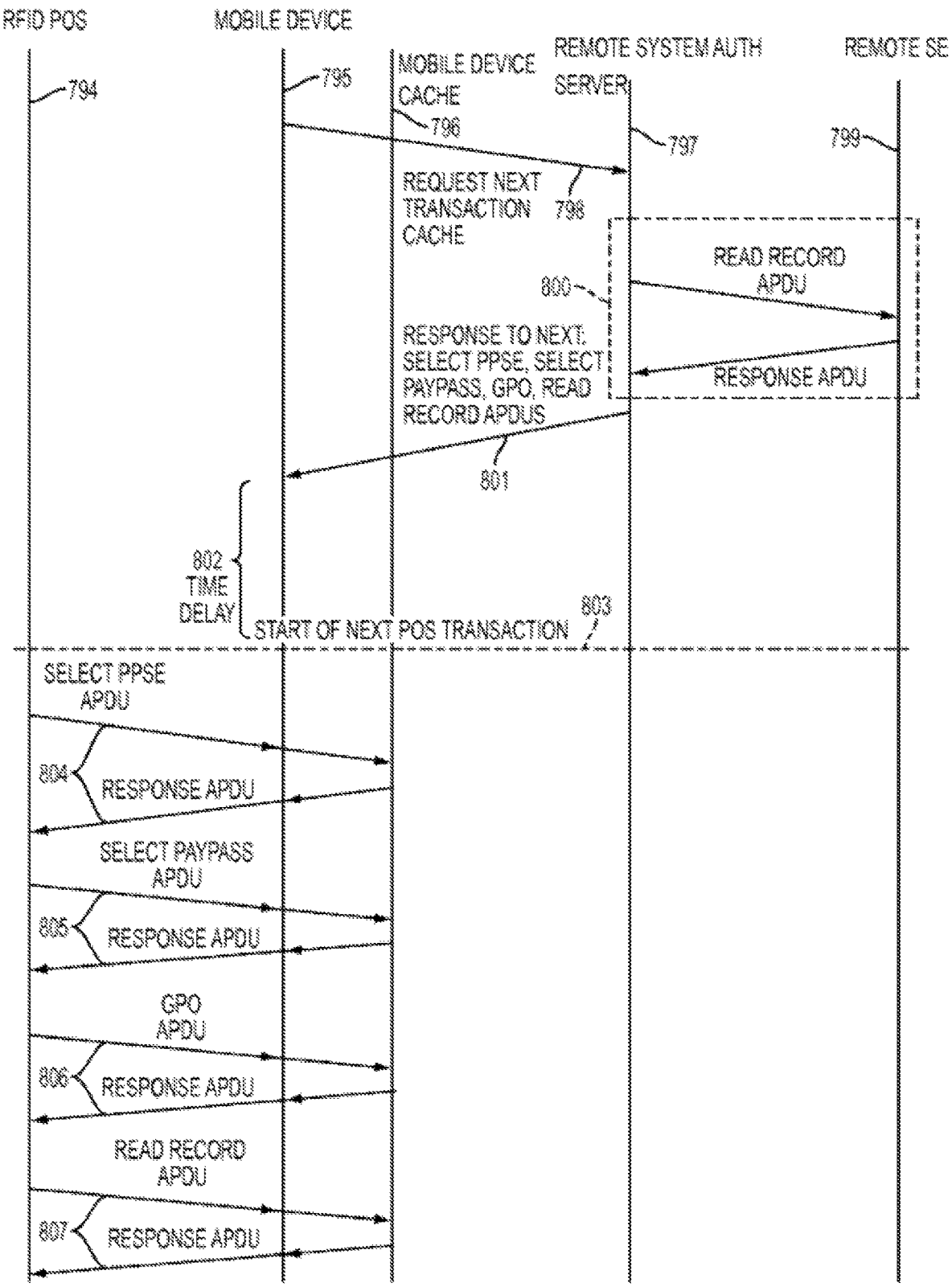
FIG. 17 illustrates an embodiment of an example of 100% transaction caching being used during a VISA PAYWAVE transaction.

FIG. 17 illustrates a slightly different caching concept using a VISA PAYWAVE transaction as an example. In this figure, the entire transactional sequence with all APDU commands and responses is cached at a separate time 802 prior to the actual transaction. In this example illustrated in FIG. 17, the RFID POS 794 does not initiate the initial request to the remote authentication server 797. Instead, it is initiated by the mobile device application at some prior time from the actual RFID POS transaction. When the mobile device 795 makes a request to the remote system authentication server 797, the remote system authentication server 797 either retrieves caching information from a database, or from making a request to a HSM (Hardware Security Module) or other storage system or, if needed, makes commands with a remote SE 799 as indicated by the dotted box in the figure with a read record request 800 to the remote SE 799. The remote SE 799 may be a hardware representation of a secure element or a software representation of a secure element. This example is particularly pertinent in the event that the response to the read record request 800 is dynamically changing data with each individual transaction with the SE. When all known responses to the remote SE transactional command(s) are gathered, the entire set of caching information may be passed back to the mobile device 795 as shown in communication 801. In communication 801 the SE responses to Select PPSE, Select PAYPASS, GPO, and Read Record APDU is passed back to the mobile device all at once.

FIG. 17 illustrates an unspecified time delay 802 after communication 801 until the actual start of the RFID POS transaction 803. During this time delay 802 the cached APDU command and response data may be stored safely in non-persistent memory or RAM in a cached format 796. An alternative is to store this data safely through encryption techniques in a persistent manner.

Communications 804, 805, 806, and 807 illustrate the real time transaction with an RFID POS at a later time 802 than the previous interaction with the remote authentication server 797. In this example each and every response APDU command that the RFID POS requested was replied to locally by the mobile device cache 796.

Figure 18:
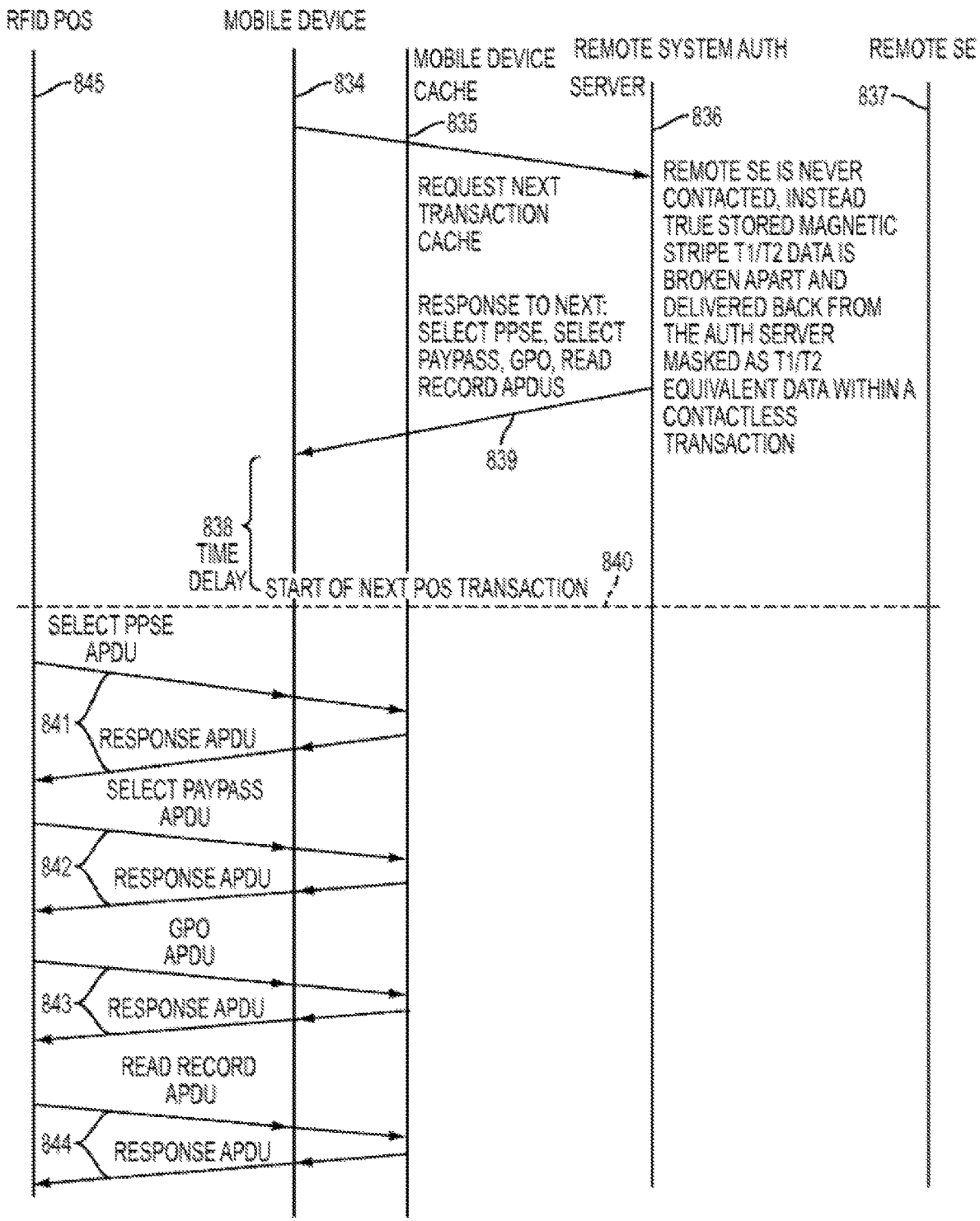
FIG. 18 illustrates an embodiment of an example of using a remote authorization server to deliver static T1/T2 data without the use of a Remote SE to a mobile handset.

The configuration of FIG. 18 closely represents an embodiment which employs secure element software representations where the secure element software representations are in the remote system authorization server 836. Much of the transaction scenario in FIG. 18 is identical to FIG. 23 including the time delay 838 (802 in FIG. 23) prior to the actual transaction 840 (803 in FIG. 23) and the delivery of the transactional data from the server 836 (801 in FIG. 23). This type of data substitution is possible with existing contactless APDU commands as defined in the VISA PAYWAVE_card specification. That card specification allows for a transaction with an RFID POS to be made using these commands:
  a. Select AID: communication 11 FIG. 3
  b. GPO: communication 12 FIG. 3
  c. Read Record: communication 13 FIG. 3

The read record command for VISA PAYWAVE indicates there may be 3 data elements with the tags:
  a. Tag 57: Track 2 Equivalent Data
  b. Tag 5F20: Cardholder Name
  c. Tag 9F1F: Track 1 Discretionary Data Specifically Tag 57 is a required tag that presents Track 2 Equivalent Data to the POS transaction. This format of the data is processed by the RFID POS and converted into ISO7813 data format. An example of this data conversion is this:
  a. Raw Tag 57 data:
   i. 54 13 12 34 56 78 48 00 DO 90 61 01 90 94 99 89 92 50 3F
  b. Converted to ISO 7813 format:
   i. ;5413123456784800=09061019094998992503?

In this instance the data conversion is almost a direct conversion, just adding the start sentinel ';', the end sentinel '?' and substituting "=" the "D" and removing the trailing padding 'F' gives the ISO7813 equivalent data. ISO 7813 data are used to send out for authentication processing for both magnetic stripe cards and contactless cards. Because of this, the actual data in Tag 57 may be gathered and populated from a regular magnetic stripe card as described in FIG. 26 tasks in the remote system auth server 836.

Figure 19:
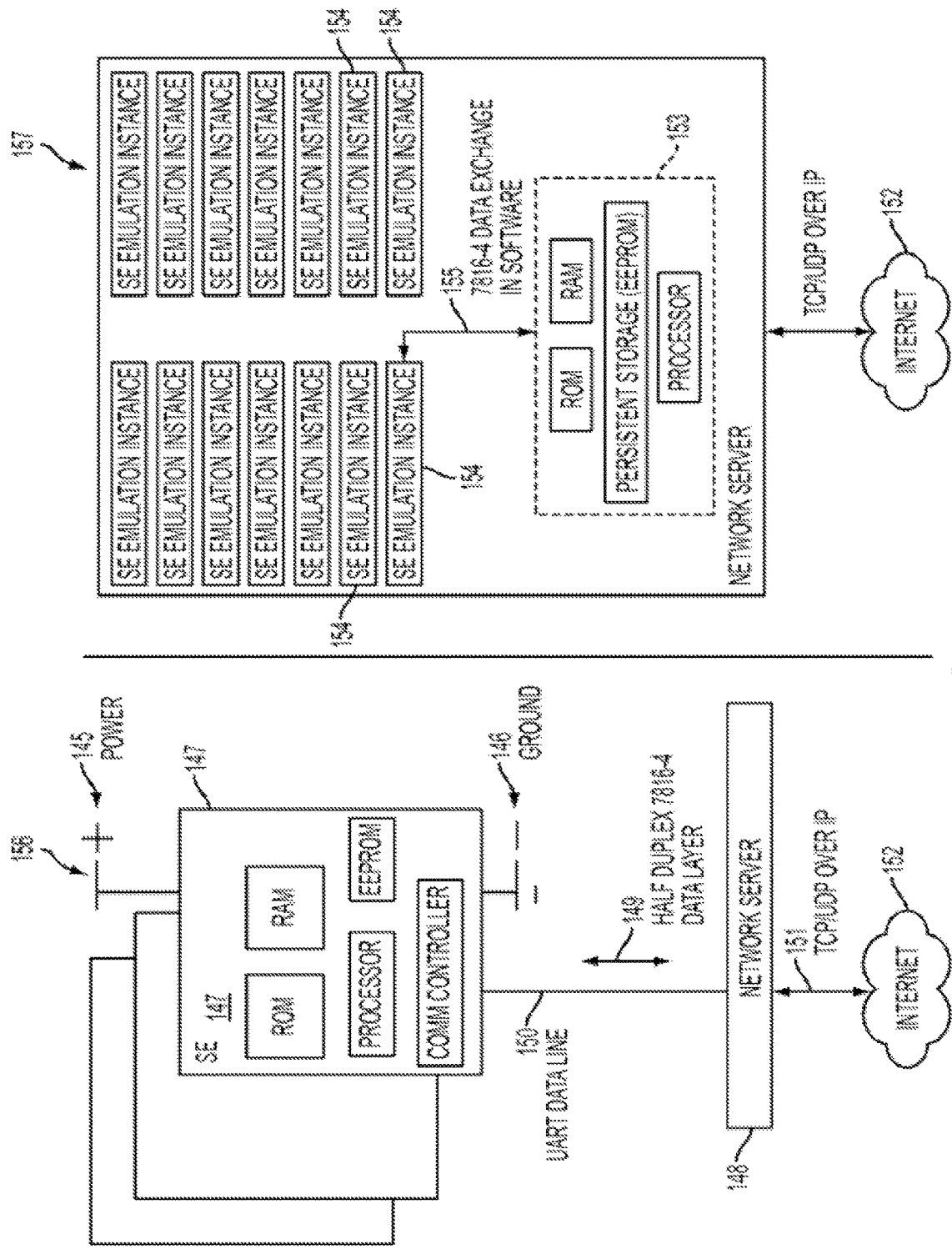
FIG. 19 illustrates an embodiment of how a system may be created to simulate a remote hosted bank of SEs.

Extrapolating this concept displayed in FIG. 18 further, it is possible to substitute any Track 2 data into tag 57 of the read record APDU response. Some substitution examples are:

a. MASTERCARD data: 54 13 12 34 56 78 48 00 DO 90 61 01 90 94 99 89 92 50 3F
b. VISA data: 44 13 12 34 56 78 48 00 DO 90 61 01 90 94 99 89 92 50 3F
c. AMEX data: 34 13 12 34 56 78 48 00 DO 90 61 01 90 94 99 89 92 50 3F
d. Any propriety data format (MCDONALDS ARCH CARD): 64 13 12 34 56 78 48 00 DO 90 61 01 90 94 99 89 92 50 3F FIG. 19 illustrates two embodiments of SE repositories, repository 156 and repository 157, to illustrate some similarities between hardware representations of an SE 147 and a software representation of an SE 154. In both cases the mobile device that is accessing the secure element representation is remote from repository 156/157, and the secure element representation is accessed over an internet 152 or other global network. In the hardware based SE side (i.e., repository 156 on the left side) of the figure, the hardware representation of the SE 156 is a "chip" that may be mounted to a circuit board or located in a physical plastic card or a SIM module. Each such form factor has both power 145 and ground 146 lines, and also includes a data line 150 that is configured to be half duplex communication over various serial data rates 149. The SE 147 is a fully functional processor chip that includes ROM, RAM, communications controller, EEPROM or persistent memory and a processor. It is addressable by and communicated with by a Network Server 148 provided the correct conversion hardware is in place to do so. Such conversion hardware is depicted in FIG. 12 where the SE array manager 746 sits in between the network server 742 and the SE's 750. One job performed by the SE array manager 746 is to translate TCP/UDP/IP communication packets from the network server 742 into 7816-4 data packets for the SE's and vice versa.

Figure 27:
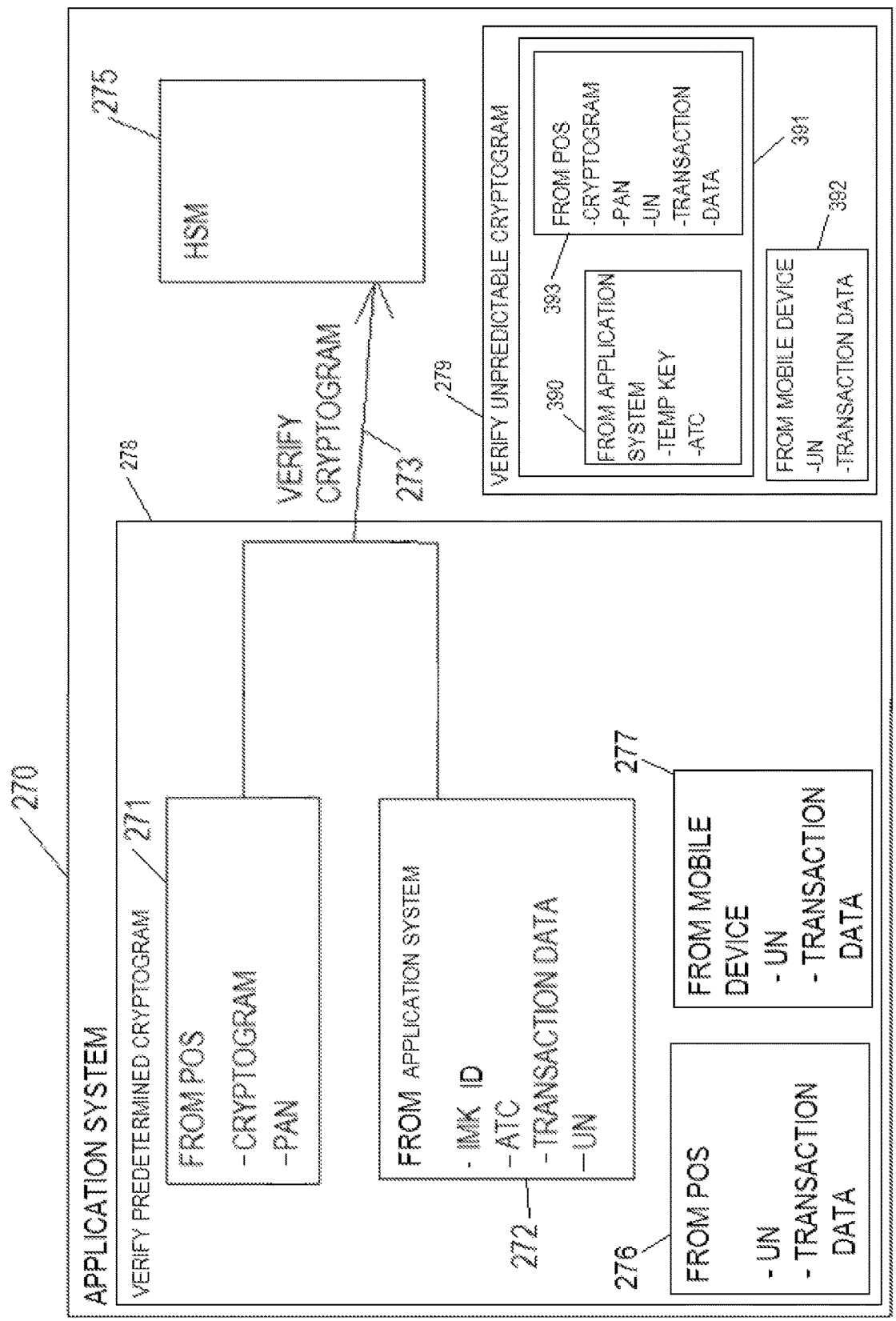
FIG. 27 illustrates an embodiment of a verifying transactional data.

In FIG. 19, the Network Server 148 serves as a communication server for communicating with the SEs and as a network interface with the internet 152. The APDU data communication (typically standard SE communication) between the Network Server 148 and the SEs 147 is extended to the Internet 152 over TCP/UDP/IP protocol. In FIG. 27, for clarity of illustration, details are depicted for only one hardware representation of SE 147.

The right side of FIG. 19 shows a repository 157 where the function of the SE are handled as multiple software representations 154 (SE Emulation Instances) in a single computer or a bank of several computers. In this configuration, there is no separate hardware that is the SE. In the embodiment of FIG. 19, the functions of the SEs are provided as software representations depicted as SE Emulation Instances 154 that are established entirely in software and contained inside a Network Server 153. The communication format of APDU 7816-4 structure 155 may also be provided by the software of the Network Server 153. A general purpose computer or server typically has all the necessary components (such as ROM, RAM, Persistent Memory, and a processor) that are necessary to provide the SE software representations. The software architecture within the Network Server 153 may be arranged as such to divide and address many different SE software representations 154 within a single computer. In the same manner the hardware based SEs 147 are exposed to the Internet over TCP/UDP/IP, the software representations of the SEs 154 are also be exposed to the Internet.

FIG. 19 illustrates that either of the depicted architectures (i.e., the hardware representations 147 and the software representations 154) are functionally interchangeable and are interoperable from the external world over the Internet. FIG. 19 also suggests that a repository (such as repository 157) using software representations of SEs may be more easily scalable than a repository (such as repository 156) using many hardware representations. The use of virtual hardware representations may be a good compromise between the security of hardware representations and portability and scalability of database secure element representations.

Figure 20:
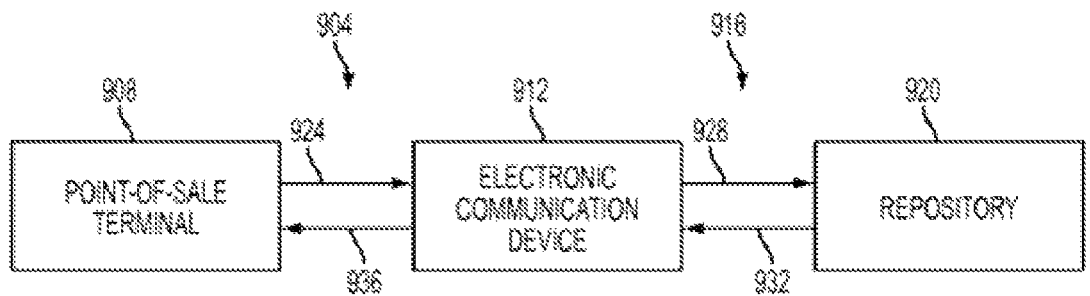
FIG. 20 illustrates an embodiment of communications and communication channels between a point-of-sale terminal, an electronic communication device, and a repository.

FIG. 20 illustrates communications channels and communications between a point-of-sale terminal and an electronic communication device and a repository, according to some embodiments. There is a first communication channel 904 between a point-of-sale terminal 908 and an electronic communication device 912. The first communication channel may, for example, include a near field communication channel or an internet connection. The electronic communication device 912 may be a mobile device or a stationary device. There is a second communication channel 916 between the electronic communication device 912 and a repository 920. The second communication channel 916 may include, for example, a cell-phone connection or an internet connection. A POS command communication 924 may be sent over the first communication channel 904 and a device command communication 928 may be sent over the second communication channel 916. A repository response communication 932 may be sent over the second communication channel 916 and a device response communication 936 may be sent over the first communication channel.

Figure 21:
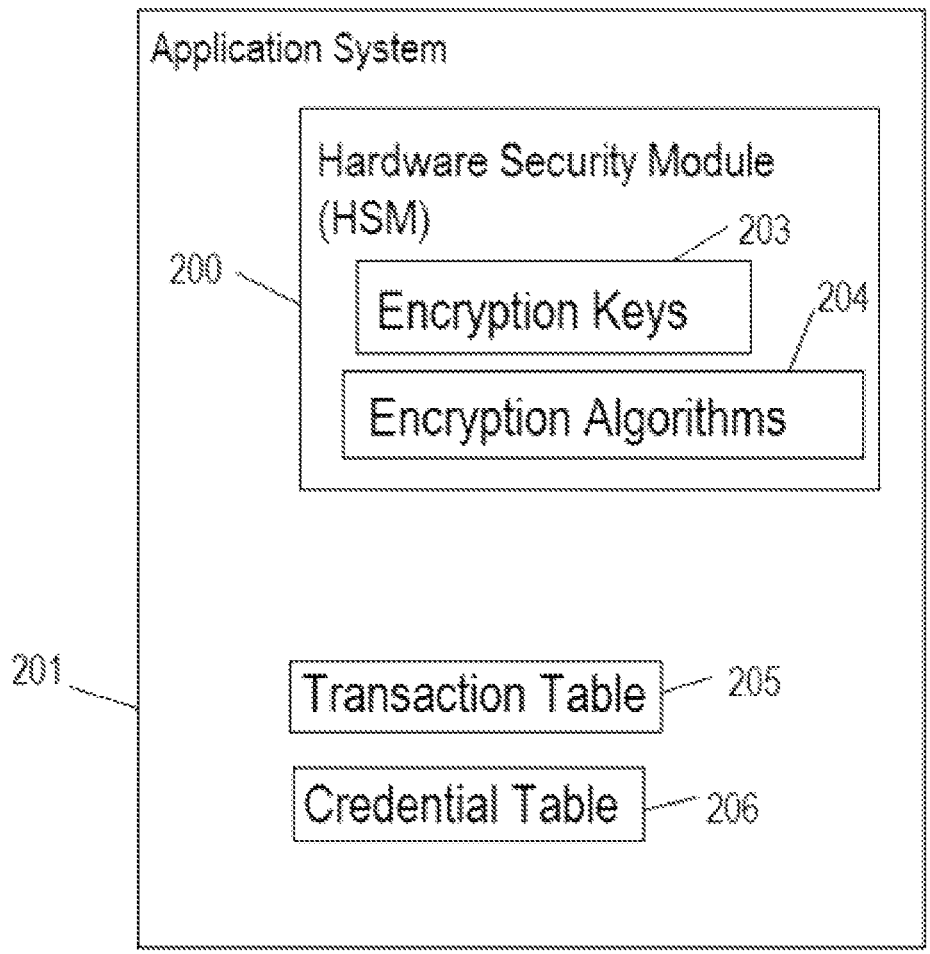
FIG. 21 illustrates an example of an application system that uses a hardware security module.

FIG. 21 illustrates an arrangement of an application system 201 (a variant of remote system auth server) that contains a Hardware Security Module (HSM) 200. The application system also includes a system of one or more computers that all may have access to the transaction table 205 and the credential table 206 within the application system. The application system contains data that should be kept in a secure manner and as a result may have both network accessibility and physical accessibility limitations built in to it. The application system can be further detailed as a "software representation" of a plurality of secure element representations as the application system has access to all the information used to create APDU responses for any particular SE representation in its repository data. An added feature of the application system that extend its capabilities beyond a "software representation" of a plurality of secure element representations is that because it has access to the HSM that stores keys used to create the data in each SE representation, it can be configured for authorizing or verifying the output data (digital credential data) for any of the SEs contained in its repository data as well. An HSM is a device commonly used in the banking and processing industry. The HSM is responsible for securely containing encryption keys 203 (cryptographic keys) that are used to authorize card payments, or create digital credential data for new cards. Encryption algorithms 204 that use these keys are also contained on the HSM. An example of an HSM used in the industry at the time of this filing is currently distributed by SafeNet Inc. and is named the LUNA EFT Mark II Edition. An example, from the MASTERCARD PAYPASS MSD v3.3 card specification document, of an encryption key that may be stored on the HSM is called an Issuer Master Key (IMK). The HSM can then, for example, use the embedded algorithms 204 to create a "diversified key for card verification code creation" (KDcvc3) from the IMK that is used for each individual card that is issued based on a certain algorithm that is also stored in the HSM. The HSM is designed to protect individual encryption keys, and to use embedded encryption algorithms to calculate encryption output based on an encryption input request from an application system. The encryption algorithm must be located within the HSM because the algorithm must have direct access to the protected encryption keys 203. The application system will provide additional input data to be used in the encryption algorithms to the HSM. The application system will also expect output data from the encryption algorithms from the HSM. The input data to the HSM may be stored in the transaction table 205 and the credential table 206. An HSM is commonly a separate device within the application system that is connected to other devices within the application system through a communication channel. The communication channel may be a network connection such as an RJ45 cable or in some cases is a hardware bus connection such as a PCI connector within a computer casing. An example of using this arrangement may be that the application system contains:

a. Encrypted data (cryptogram)
b. Unpredictable number (UN)
c. Application Transaction Counter (ATC)
d. Transaction data such as a dollar amount
e. A key identifier (but the not key itself)
in its transaction table and credential table. The application system would like to verify encrypted data (a) was created from a particular encryption key (e), unpredictable number (b), ATC (c), and transaction data (d). The application system knows which key was used to create the cryptogram (a), but opts, for security reasons, not to have access to the key itself. The application system then uses the cryptogram (a), unpredictable number (b), ATC (c), transaction data (d), and a key identifier (e) as input for the HSM and sends the input to the HSM. The HSM then uses the input data from the application system and locates the proper encryption algorithm and encryption key to use. The HSM then creates the output response from the algorithm using the encryption key and sends the output to the application system. The output in this example would be a simple "verified" or "not verified" message.

The application system 201 is an embodiment of a "software representation" of a repository of a plurality of secure element representations and has access to all the information that is used to create APDU responses generated by any particular database SE representation in its repository data. This repository data is represented in the credential database table 206. This would include credential data such as PAN, expiration date, card holder name, contactless application type, automated transaction counter, card record, etc. This gives the application system the ability to formulate APDU responses to APDU commands that are issued from the point-of-sale to an SE during an interrogation. So if a mobile device requests a transaction cache for a particular SE or card identified by a card id or PAN, for example, the application system has the ability, using the data in the credential table, transaction table, and HSM, to formulate all the responses that the mobile device may need at a later point in time when the mobile device is being interrogated by the point-of-sale. This set of responses could be in the format of APDU responses and passed to the mobile device to be cached for use later. Alternatively, just the data required for the mobile device to formulate the responses may be passed to the mobile device cache. The application system also may have access to the encryption key for creating cryptograms in the HSM, in which case the keys themselves could be sent to a mobile device to allow the mobile device to calculate a cryptogram that may be requested by a point-of-sale.

Examples of SE responses are shown in FIG. 3 next to the 'CARD>:' prompt indicating data from the SE to the point-of-sale. The application system may know the specific responses based on a number of factors. In FIG. 3, the responses are for a PAYPASS 3.3 MSD transaction, because the application system knows the particular card id or PAN is associated to this PAYPASS 3.3 MSD transaction, and the PAYPASS card specification for 3.3 MSD dictates specifically elements 10, 11, and 12 exactly as shown in FIG. 3, so the response APDU data as shown in 10, 11, and 12 can be sent verbatim over a communication channel to the mobile device cache when requested by the mobile device.

FIG. 3, element 13 after the 'CARD>:' prompt shows the format of the read record command response, but the data inside the response may change from one card id or PAN to another because it is credential data that is stored in the read record command response. Fortunately the application system has access to all the credential data that comprises the response to the read record command such as displayed, in part in FIG. 2, element 7:

a. Track 1 and Track 2 data comprised of PAN, Exp Date, card code, issuer discretionary data
b. Substitution bitmaps for Track 1 and Track 2 (PU-NATC, PCVC3)
c. Number of ATC digits used in bitmaps (NATC)
d. Application Version Number From this data, the application system can create the proper APDU response to the read record command that is formatted just like FIG. 3, element 13 and send it specifically for the card credential the mobile device has requested to the mobile device for caching over a communication channel. For a MASTERCARD PAYPASS MSD v. 3.3 credential, table 2 shows a technical breakdown of how the data in the read record response is formulated from data in the application system in proper APDU response BER-TLV format.

TABLE 2

| | | 7F T | L | | | | | | | | | | | | | | | | | V | |
|---|---|---|---|---|---|---|---|---|---|---|---|---|---|---|---|---|---|---|---|---|---|
| 70 | 9F | 6C | 02 | 00 | 01 | | | | | | | | | | | | | | | -Application Version Number | |
| | 56 | 3E | | 42 | 35 | 54 | 31 | 33 | 31 | 32 | 33 | 34 | 35 | 36 | 37 | 38 | 34 | 38 | | 30 | Track 1 |
| | | | | 30 | 5E | 53 | 55 | 50 | 50 | 4C | 49 | 45 | 44 | 2F | 4E | 4f | 54 | 513 | | 30 | Data |
| | | | | 39 | 30 | 30 | 31 | 30 | 31 | 33 | 33 | 30 | 30 | 30 | 33 | 33 | 33 | 30 | | 30 | |
| | | | | 30 | 32 | 32 | 32 | 32 | 32 | 30 | 30 | 30 | 31 | 31 | 31 | 31 | 30 | | | | |
| | 9F | 64 | 01 | 03 | | | | | | | | | | | T1_NATC | | | | | | |
| | 9F | 62 | 06 | 00 | 00 | 00 | 38 | 00 | 00 | | | | | | T1_PCVC3 | | | | | | |
| | 9F | 63 | 06 | 00 | 00 | 00 | 00 | E0 | E0 | | | | | | T1_PUNATC | | | | | | |
| | 9F | 65 | 02 | 00 | 08 | | | | | | | | | | T2_PCVC3 | | | | | | |

TABLE 2-continued

| | | 7F T | L | | | | | | | | | | | | | | | | V |
|---|---|---|---|---|---|---|---|---|---|---|---|---|---|---|---|---|---|---|---|
| 70 | 9F | 6C | 02 | 00 | 01 | | | | | | | | | | | | | | -Application Version Number |
| | 9F | 66 | 02 | 0E | 70 | | | | | | | | | | | | | | T2_PUNATC |
| | 9F | 6B | 13 | 54 | 13 | 12 | 34 | 56 | 78 | 48 | 00 | D0 | 90 | 61 | 01 | 90 | 00 | 90 | 00 Track 2 |
| | | | | 00 | 00 | 0F | | | | | | | | | | | | | Data |
| | 9F | 67 | 01 | 03 | | | | | | | | | | | | | | | T2_NATC |
| 90 | 00 | | | | | | | | | | | | | | | | | | |

Application Version Number, Track 1 Data, T1_NATC, T1_PCVC3, T1_PUNATC, T2_PCVC3, T2_PUNATC, T2_NATC, and Track 2 Data are all accessible by the application system in the credential table.

As used herein the term "cryptogram" refers to encrypted data that may or may not be able to be un-encrypted. Encrypted data that cannot be un-encrypted is many times called a "hash." A cryptogram is typically calculated from a series of input data that comprises some data and a cryptographic key, where the cryptographic key is used to encrypt some data. As used herein the term "cryptographic key" refers to a key used, at least in part, to calculate a cryptogram. A cryptogram is calculated based on an algorithm or calculation formula. As use herein the term "calculation formula" refers to an algorithm or formula that is specified by a card specification as the method to calculate a cryptogram. A calculation formula typically may be known by any entity. The output result of the calculation formula that uses the input data and a cryptographic key is a cryptogram. Examples of cryptograms at the time of this filing are defined by the following card specifications in table 4.

TABLE 4

| Card specification | Cryptogram Designator or Name |
|---|---|
| MASTERCARD PAYPASS MSD | CVC3 |
| VISA Contactless MSD | dCVV |
| DISCOVER ZIP MSD | dCVV |
| EMV, VISA QVSDC, VISA VSDC, MASTERCARD MCHIP | AC, TC, AAC, ARQC |

A "cryptogram" as used herein may be classified as "dynamic" meaning that it is always changing from one interrogation (transaction) to the next over the life a digital credential (SE representation). As used herein the term "life of", as in, the life of a digital credential, the life of a card, the life of a SE, the life of a SE representation, refers to the life beginning when it is used its first interrogation and ending when it is used in its last interrogation. One indication of this dynamic aspect of a cryptogram is to perform two sequential independent interrogations between a mobile device and a point-of-sale terminal where the same digital credential is used on the mobile device, and the point-of-sale terminal receives two sets of digital credential data with each including a single cryptogram, one with each interrogation. If the cryptogram received by the point-of-sale terminal is different from one interrogation to the next, it is dynamic.

The details of an interrogation between a point-of-sale and a digital credential, card, SE representation, and mobile device are defined in "card specifications" and implemented in point-of-sale terminals. Examples of these card specifications at the time of this filing are MASTERCARD PAYPASS—Mag Stripe v3.3, Contactless EMV, DISCOVER NETWORK RF Contactless Specification—Supplement Guide For Functional Support, AMEX ALIS v1.7, and VISA Contactless Payment Specification v2.0.2. As used herein the term "card specification" refers to a specification or reference within the specification to other specifications and so on that a point-of-sale terminal must adhere to in order to interrogate a card, SE, mobile device as expected by that card specification. A point-of-sale terminal, as the interrogator, controls the interrogation. The card specification that defines the details of an interrogation may also define the details of a cryptogram request, calculation, and delivery from the card, SE, or mobile device to the point-of-sale as part of the interrogation sequence. Card specifications may include references to other specifications and those other specifications to even more specification wherein the card specification may be defined by the card specification in conjunction with other supporting documents sited within a card specification. Card specifications typically consist of an application layer that defines an interrogation sequence and calculations that are to be performed by both the card, SE, mobile device and also the interrogator or point-of-sale. Both a mobile device and a point-of-sale are expected to be operating under the direction of a card specification during an interrogation.

The card specification may define a cryptogram to be calculated by the card, SE or mobile device based, at least in part, on unpredictable data sent from the point-of-sale during the interrogation. In this context, it is said that the cryptogram delivered by the mobile device is "expected" because the card specification indicates it will be calculated, at least in part, from the unpredictable data delivered by the point-of-sale during the interrogation and that is what the card specification expects.

Also, the card specification may define a cryptogram to be calculated by the card, SE, or mobile device based, at least in part, on a cryptographic key, where the cryptographic key is a "permanent cryptographic key". In this context, it is said that the cryptogram delivered by the mobile device is "expected" because the card specification indicates it will be calculated, at least in part, from a permanent cryptographic key and that is what the card specification expects. As used, herein the term "permanent cryptographic key" refers to a cryptographic key that is unchanging (or static) throughout the life of a card, SE, mobile device, or digital credential.

As used herein the term "temporary cryptographic key" refers to a cryptographic key that changes (or is dynamic) from one interrogation to the next over the life of a digital credential (e.g., an SE representation). A temporary cryptographic key may be selected or changed randomly from its use in one interrogation to the next. It is unpredictable from one interrogation to the next. A temporary cryptographic key may be recorded or stored in assigned to an individual transaction (interrogation) as shown in the "TEMP KEY" column 380 in the transaction table 210. As used herein, if not otherwise explicitly stated, the term "cryptographic key" means a "permanent cryptographic key". As used herein, if not otherwise explicitly stated, the term "encryption key" means a "permanent cryptographic key".

As used herein the term "persistent" or "persistently stored" refers to of data that are stored in a storage container (such as non-volatile read-only-memory) where the data "persists", and is not erased in the event of a power failure or outage to that storage container. Another example of a persistent storage container is a hard drive, or flash memory.

As used herein the terms "transient," "transiently stored," "non-persistent," and "non-persistently stored" refers to data that are stored in a storage container where they are erased or otherwise rendered not accessible after a power failure to the storage container. An example of a transient storage container is RAM (Random Access Memory).

Cryptograms used herein may be "expected" to be calculated, at least in part, from unpredictable data passed from a point-of-sale to a mobile device during an interrogation that is dictated by a card specification. As used herein the term "predetermined cryptogram" refers to a cryptogram that is formulated without the use of unpredictable data passed from the point-of-sale terminal to a mobile device during an interrogation; wherein the interrogation is defined by a card specification; and the card specification indicates the cryptogram to be calculated, at least in part, by the unpredictable data. This may include a predetermined cryptogram being entirely made up of a string of random data. This may also include a predetermined cryptogram being calculated based on other unpredictable data instead of the unpredictable data from the point-of-sale. As used herein "predetermined cryptogram" also refers to a type of unexpected cryptogram.

Cryptograms used herein are many times may be "expected" to be calculated, at least in part, from a permanent cryptographic key during an interrogation between a mobile device and a point-of-sale. As used herein the term "unpredictable cryptogram" refers to a cryptogram calculated, at least in part, from a temporary cryptographic key for use in an interrogation between a mobile device and a point-of-sale; wherein the interrogation is defined by a card specification; and the card specification indicates a cryptogram to be calculated, at least in part, by a permanent cryptographic key. As used herein "unpredictable cryptogram" also refers to a type of unexpected cryptogram.

As used herein the terms "unexpected cryptogram", "unexpected predetermined cryptogram", and "unexpected unpredictable cryptogram" refer to a cryptogram that is sent from a mobile device to a point-of-sale during an interrogation; wherein the interrogation is defined by a card specification implemented on the point-of-sale; and the cryptogram is calculated from a different calculation formula than is defined in the card specification. For example, the "different calculation formula" includes a predetermined cryptogram. As used herein the term "predetermined cryptogram" refers to a cryptogram that is calculated without the use of unpredictable data passed from the point-of-sale terminal to a mobile device during an interrogation; wherein the interrogation is defined by a card specification; and the card specification indicates the cryptogram to be calculated, at least in part, by the unpredictable data. A predetermined cryptogram may be entirely made up of a string of random data. A predetermined cryptogram may also be calculated based on other unpredictable data instead of the unpredictable data from the point-of-sale. As used herein "predetermined cryptogram" is an example of an unexpected cryptogram.

As a further example, the "different calculation formula" includes an unpredictable cryptogram. As used herein the term "unpredictable cryptogram" refers to a cryptogram calculated, at least in part, from a temporary cryptographic key instead of a permanent cryptographic key for use in an interrogation between a mobile device and a point-of-sale; wherein the interrogation is defined by a card specification; and the card specification indicates a cryptogram to be calculated, at least in part, by a permanent cryptographic key. As used herein "unpredictable cryptogram" is an example of an unexpected cryptogram. An unexpected cryptogram can also be said to deviate from the card specification.

As a further example, the "different calculation formula" may include using a temporary cryptographic key in place of a permanent cryptographic key in the case of an "unexpected unpredictable cryptogram", or may include using a random value in place of the cryptogram in the case of an "unexpected predetermined cryptogram". As a controlled consequence of the "different calculation formula", the value of the unexpected cryptogram may be different than that of an expected cryptogram; however, it is to be of the same general data format as the expected cryptogram. For example, if the expected cryptogram is 3 bytes long, then the unexpected cryptogram will be 3 bytes long, however the data within the respective cryptograms may not match.

The response for the compute cryptographic checksum command (FIG. 3, element 14), is created by a method employed in FIGS. 22, 23, 24, 25, 26, 27, 28, 29 and 30 called "Cryptogram Substitution" using a predetermined cryptogram or unpredictable cryptogram and in some embodiments sent for each transaction to the mobile device cache over a communication channel when requested by the mobile device. In other embodiments cryptogram substitution is used with unexpected cryptograms created on the mobile device and sent to a remote application system. For a MASTERCARD PAYPASS MSD v. 3.3 credential, table 3 shows a technical breakdown of how the data in the read compute cryptographic checksum response is formulated from data in the application system in proper APDU response BER-TLV format.

TABLE 3

| 77 0F T | L | V |
|---|---|---|
| 9F 61 | 02 | B8 92 T2_CVC3 |
| 0F 60 | 02 | FB C7 T1_CVC3 |
| 9F 36 | 02 | 00 5E ATC |
| 90 00 | | |

The ATC is the automated transaction counter that increments with every point-of-sale interrogation, and can be stored in the transaction table or credential table and updated with each interrogation by a mobile device. The CVC3 is cryptogram that is expected to be calculated with this algorithm from the MASTERCARD PAYPASS MSD v3.3 card specification:

First KDcvc3 is created:

$Z_L := DES3(IMK_{CVC3})[Y]$ $Z_R := DES3(IMK_{CVC3})[Y \oplus ('FF'\|'FF'\|'FF'\|'FF'\|'FF'\|'FF'\|'FF'\|'FF')]$ and define:

$KD_{CVC3} := (ZL\|ZR)$.

KDcvc3 calculation may be performed inside the HSM because the HSM contains IMK. The application system will pass Y, which is defined as the PAN and PAN sequence number concatenated as an input to the HSM in conjunction with the IMK id to use. The HSM will respond back with the KDcvc3 as output. The KDcvc3 in this example would be considered a permanent cryptographic key because it will not change over the life of the digital credential, as none of the inputs to the calculation of KDcvc3 change over the life of the credential.

Next T2_IVCVC3 is created:
O:=PayPass-MagStripe(3.3) Annex B alg(KDcvc3) [Track 2 Data]

The least two significant bytes of the output data are defined to be T2_IVCVC3.

Finally, the CVC3 cryptogram for track 2 is calculated:
O:=DES3($KD_{CVC3}$)
O:=DES3($KD_{CVC3}$)[T2_IVcvc3||UN||ATC]

The least two significant bytes of the output data are defined to be CVC3

CVC3 calculation may be performed inside the HSM because the HSM contains the IMK which is used to create KDcvc3, which is used to create IVCVC and CVC3. So the application system will pass UN and ATC as inputs in conjunction with the IMK id to use. The HSM will respond back with the CVC3 cryptogram as output. The CVC3 is a dynamic cryptogram as the input to the calculation of the cryptogram change with each interrogation. This is known because with each interrogation the digital credential is expected to increment the ATC (Automated Transaction Counter) and also have different UN value.

This card specification expects KDcvc3 cryptographic key to be a permanent cryptographic key. In the event that an unpredictable cryptogram is to be calculated instead, in this example, the permanent key of KDcvc3 is not used and is replaced by a temporary cryptographic key that may consist of a random value that changes, and may be erased or altered after a single interrogation. The temporary cryptographic key that is used can be recorded in the application system transaction table for future reference during cryptogram verification. Proceeding with the following formula using the temporary cryptographic key instead of the permanent cryptographic key will yield an unpredictable cryptogram.

The UN input value in this algorithm is intended (expected) to be an unpredictable number from the point-of-sale that was acquired during interrogation. In order to calculate an unexpected predetermined cryptogram instead, in one embodiment this UN number will be created randomly and used as input to the cryptogram algorithm. The UN number used will be recorded in the application system transaction table for future reference during cryptogram verification. The predetermined cryptogram can now be used to formulate a response to the "compute cryptographic checksum" request without consulting the application system during the interrogation. In this embodiment, the mobile device may share access to the predetermined cryptogram during the scope of the authorization process.

In another embodiment of substituting a predetermined cryptogram, random data could simply be used to create the predetermined cryptogram. In this embodiment, the mobile device may share access to the predetermined cryptogram during the scope of the authorization process.

In another embodiment of substituting an unpredictable cryptogram, a temporary cryptographic key could be used to allow the mobile device to calculate and create the unpredictable cryptogram. The temporary cryptographic key would be recorded in the application system transaction table for future reference during cryptogram verification. In this embodiment, the mobile device may share access to the temporary cryptographic key with the application system during the scope of the authorization process.

Alternatively, although less secure, in another embodiment of the application system could deliver the permanent cryptographic key to the mobile device to be stored transiently to allow the mobile device to calculate and create an expected cryptogram that can be used to formulate the "compute cryptographic checksum" response without consulting the application system.

The concept of transaction (command/response) caching is disclosed herein. A cache is a component that transparently stores data so that future requests for that data may be served faster. The data that are stored within a cache may be values that have been computed earlier or duplicates of original values that are stored elsewhere. If requested data are contained in the cache ("cache hit"), this request may be served by simply reading the local cache, which is comparatively faster that accessing the remote source. Otherwise ("cache miss"), the data have to be recomputed or fetched from its original storage location, which is comparatively slower. Hence, the more requests that may be served from the local cache, the faster will be the overall system performance. Caching implies that the cache values may be temporary and the original values from the remote source can be easily accessible time after time if needed in order to update, or replace the cached values. As used herein the term "non-persistent cache" and "transient cache" refers to the cached data to be transient or non-persistent. Unless otherwise stated the term "cache" also refers to the cached data to be transient or non-persistent.

The mobile device cache is setup to hold the cached data in preparation for the next interrogation from the point-of-sale that will happen at a later time. It is important to note that the data transmitted to the mobile device cache may hold the literal APDU formatted data, or may simply hold the data required to formulate a correctly formatted APDU response. The important aspect is that the cache holds all the data required to properly create APDU responses to the APDU commands.

As used herein the term "card data" or "credential data" may refer to the data used to create a proper APDU response to credential specific APDU commands such "read record" 7, and data used in "compute cryptographic checksum" 8. It is common for an application system in a software representation of a plurality of remote secure element repository to have access to all the data to properly create a valid APDU response.

FIG. 16 illustrates a caching system for each transaction or interrogation between a point-of-sale 778 and a mobile device 779 for a MASTERCARD PAYPASS transaction. The advantage of caching secure element responses is to lessen the effect of network latency and speed up an interrogation. In the example contained FIG. 16, network latency is reduced from a potential 800 ms to a potential 200 ms because of the caching technique applied. This is a significant effect in the application of NFC or RFID because the as the total interrogation timeframe shrinks, the likelihood of a successful interrogation sequence goes up because it is less likely the communication channel between the point-of-sale and the mobile device will be interrupted from the mobile device moving out of the field generated by the point-of-sale. Notice that not all interrogation command and responses 787 and 793 in FIG. 16 are handled from the mobile device cache 780. The non-cached command and response, lead to the 200 ms network latency of the entire transaction in FIG. 16.

FIG. 17 illustrates a caching system for each transaction or interrogation between a point-of-sale 794 and a mobile device 795 for a VISA PayWave transaction. In this figure the concept of 100% transaction caching is employed. It illustrates how all of the responses for an interrogation from a point-of-sale may be cached at some point of time ahead 802 of the actual mobile device and point-of-sale interrogation. This causes network latency of the interrogation to be 0ms (zero) because no data is queried during the interrogation over the network from the remote system auth server's remote repository. This is a tremendous advantage over the system in FIG. 16, which in-turn had a tremendous advantage to the system that does not employ transaction caching at all.

Depending on the interrogation sequence selected by the point-of-sale, it may not always be possible to implement a system set forth in FIG. 17. Many point-of-sale interrogation sequences carried out at the time of this filing are based on card specifications such as:

a. MASTERCARD, PAYPASS, MChip
 b. AMERICAN EXPRESS, EXPRESS PAY
 c. DISCOVER ZIP
 d. VISA QVSDC, VSDC
 e. Contactless EMV Employ a method of creating an expected cryptogram by the mobile device that is calculated, at least in part, from unpredictable data generated on the point-of-sale and delivered to the mobile device during the interrogation sequence. Because creating an expected cryptogram requires a calculation to be performed that includes a permanent cryptographic key, the secure element or system with access to this key must be used to carry out the expected cryptogram calculation. Because the secure element representation is stored in a remote repository and contains the permanent cryptographic key, this expected cryptogram calculation would incur network latency to perform the calculation during the interrogation, as shown in FIG. 16, element 793.

During point-of-sale interrogation with a mobile device, the point-of-sale may request a cryptogram and supply some data to be used in cryptogram calculation to the mobile device in the same APDU command request. The APDU response to this request by the mobile device, which is also in the same interrogation sequence, is expected to contain the cryptogram itself, calculated, at least in part, using the input data from the point-of-sale, and also other input data. After receiving the cryptogram in the APDU response from the mobile device, the point-of-sale then sends the cryptogram, the input data it used to request the cryptogram, and possibly other information about the credential data from the mobile device to a remote processor for an authorization request. As part of the authorization request process, the cryptogram is verified based on the input data that was used to create it, some of which was generated by the point-of-sale.

Because many of these cryptograms referenced by external card specifications use transaction data or unpredictable number data created by the point-of-sale as part of the input during the calculation of the expected cryptogram, the step of calculating the cryptogram requires the secure element at the time of interrogation because the secure element contains the permanent cryptographic key required to create the cryptogram. If the secure element is contained in a remote repository, network latency must be factored into the total interrogation time in order for the secure element to calculate the cryptogram using data from the point-of-sale.

If data created by the point-of-sale is not part of the input to the creation of the expected cryptogram, such as in VISA Contactless MSD cryptogram (dCVV), then the cryptogram can be calculated by the remote repository, transferred to the mobile device, and cached for use at a later time during point-of-sale interrogation. This scenario creates no network latency and allows for one hundred percent transaction caching during the interrogation, because the secure element representation need not be accessed during the actual interrogation time. As used herein the term "one hundred percent (100%) transaction caching" refers to the ability for the mobile device to complete the interrogation with a point-of-sale terminal without the requirement to contact the secure element during the interrogation, and instead have all the data on hand local to the mobile device to complete the interrogation.

Most cryptogram algorithms referenced by external card specifications require input data from the point-of-sale during the interrogation, so many of the following figures address this problem and how it can be solved in the context of one hundred percent transaction caching. The method of "Cryptogram Substitution" and creating a pre-defined cryptogram are defined and described in FIGS. 21, 22, 23, 24, 25, 26, 27, 28, 29, and 30 explain a solution to the problem of creating a response to a cryptogram request the expected cryptogram is calculated, at least in part, by unpredictable data sent by the point-of-sale to the mobile device.

FIG. 22 illustrates how one embodiment of an application system could create cryptograms using random, predetermined, or "made up" input data. A transaction table 210 is defined in which each row represents a transaction between a mobile device and a point-of-sale. The state of the data in this table currently shows transaction data that have been delivered to a mobile device cache, but have not been verified through a point-of-sale. In order to comply with the request of a point-of-sale to a mobile device during an interrogation, the mobile device must deliver cryptogram in the proper data format that the point-of-sale expects. The data that is contained in the actual cryptogram that is delivered to the point-of-sale from the mobile device may not be accurately calculated with the input data from the point-of-sale, but it does not matter at this point as the point-of-sale alone does not verify the cryptogram, it simply receives the cryptogram and relays it for verification to the application system, which has access to the input data used to create the original pre-determined cryptogram. This is why the predetermined cryptogram 218 can be calculated based on randomly selected terminal input data UN 213, and Transaction Data 215. The other inputs to create the predetermined cryptogram are based on credential data of each secure element such as the Application Transaction Counter 214, the Issuer Master Key id 212, and the account Personal Account Number 211. After gathering all predetermined cryptogram input data, the application system sends the input to the HSM and receives the predetermined cryptogram as an output response. The application system may optionally store the predetermined cryptogram 218 into the table 210, for use during verification later.

The actual unpredictable number 216 and transaction data 217 sent by the point-of-sale terminal during interrogation is not known at this point in time because the interrogation has not actually happened yet. However, it is still possible to create a predetermined cryptogram, in this manner, to be delivered to a mobile device for use in a mobile device cache to use during a point-of-sale interrogation that includes a properly formatted predetermined cryptogram. This predetermined cryptogram is formatted properly, but will not be calculated based on the input data from the point-of-sale interrogation. Because it is formatted properly, it will still be accepted by the point-of-sale and sent to off for verification in an authorization request. Also note that there may be multiple transactions in processing at a single point of time, 219 shows two different rows representing two different transactions currently being processed for the same PAN 211. The application system has the ability to process each of the transactions independently because there is a row in the table to discern each one separately.

Note that because the same application system that is creating the cryptogram will also be verifying the same cryptogram, another embodiment of predetermined cryptogram creation is simply make up a predetermined cryptogram from random data without performing a calculation from input data at all. This embodiment requires the application system to store the random predetermined cryptogram 218 into the table 210 for verification later. This embodiment also does not require an HSM to create the cryptogram as it is simply created randomly.

Note that in another embodiment, it is possible to create a temporary cryptographic key for each transaction. This key may be shared with the mobile device allowing the mobile device to calculate an unpredictable cryptogram using, at least in part, the unpredictable data received from the point-of-sale during the interrogation. This embodiment requires the application system to store the temporary key 380 into table 210 for use during unpredictable cryptogram verification later.

These methods of substituting a predetermined cryptogram and of substituting an unpredictable cryptogram are vital to the concept of 100% transaction caching with the existing point-of-sale infrastructure. The existing point-of-sale infrastructure is pre-set for each interrogation sequence and expects data to be formatted according to each interrogation sequence that is programmed in the point-of-sale. Changing the interrogation sequence(s) is out of the control of the mobile device, and so this method of creating a predetermined cryptogram or unpredictable cryptogram as defined using data, at least in part, from FIG. 22 may be required for 100% transaction caching which creates no network latency during the interrogation between the point-of-sale and the mobile device. Because the predetermined cryptogram is created without input from the point-of-sale, the calculation time to create a predetermined cryptogram may also be removed from the overall interrogation time. In the case of an unpredictable cryptogram, this calculation time persists and cannot be removed from the overall interrogation time.

Figures 29, 30:
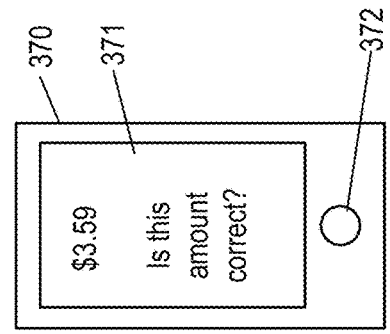
FIG. 29 illustrates an embodiment of data elements that may be used to form a digital credential.
FIG. 30 illustrates an embodiment of a request on a mobile device for card-holder validation of a transaction.

FIG. 29 illustrates a representation of a table of digital credentials 350 (digital credential data) that may be stored inside the application system. This table, in conjunction with the transaction table, and in some embodiments the HSM allows the application system to perform as a repository of a plurality of secure element software representations. The credential data used to create data inside an SE and also allow it to formulate its proper APDU responses is contained in this table for a plurality of credentials (SEs). For a MASTERCARD PAYPASS MSD v3.3 credential, the example shown in this table, the columns of data list personal account number (PAN) 351, expiration date 352, name of card holder 353, card code 354, track 1 data 355, track 2 data 356, track 1 cvc3 bitmap 357, track 2 cvc3 bitmap 358, track 1 UN and ATC bitmaps 359, track 2 UN and ATC bitmaps 360, track 1 number of ATC digits 361, track 2 number of ATC digits 362, CVM list 363, AC 364, application version number 365, and the master key identifier 366.

Figure 23:
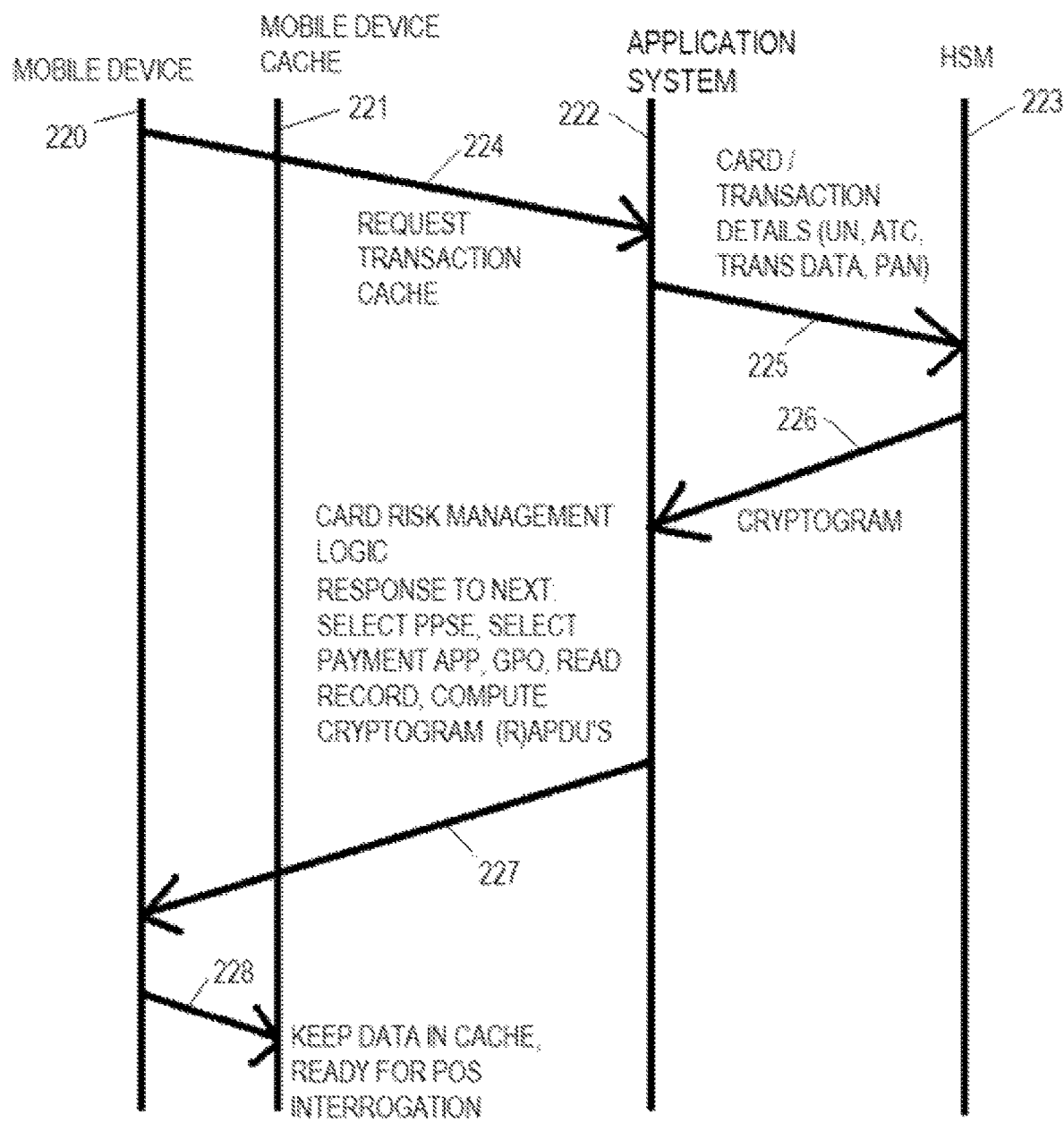
FIG. 23 illustrates an embodiment of a mobile device acquiring transactional data to store in a mobile device cache.

FIG. 23 illustrates a method for a mobile device 220 to request a transaction cache 224 prior to being interrogated by a point-of-sale. As used herein the term "transaction cache" refers to data required to formulate proper mobile device responses during an interrogation with a point-of-sale, which may comprise digital credential data. As discussed in FIG. 17 and FIG. 18, FIG. 23 is very similar and describes a method for a mobile device 220 to receive a cache of transaction data (transaction cache) 227 over a communication channel to be used during a point-of-sale interrogation at a later point in time. Before an interrogation with a point-of-sale, the mobile device will request a transaction cache to be used during the point-of-sale interrogation from the application system 222 over a communication channel. This transaction cache data may comprise the randomly generated unpredictable data such as UN and transaction data from the application system, the other credential based inputs 225 to cryptogram calculation and sends them to the HSM 223 over a communication channel. The HSM then may calculate the predetermined cryptogram 226 and return it to the application system. The predetermined cryptogram may then be used to formulate the cache response to a "request cryptogram" APDU command from a point-of-sale. In a further embodiment, the application system could avoid the step of contacting the HSM and simply make up a random sequence of bytes to be used as a predetermined cryptogram to be used in place of the expected cryptogram. This predetermined cryptogram is a sequence of random data and is shared with the mobile device, so the mobile device could have, just as well, created the random bytes as the predetermined cryptogram and shared them with the application system. In a further embodiment, the application system could avoid the step of contacting the HSM and simply make up a temporary cryptographic key from a random sequence of bytes to be shared with and used by the mobile device while creating an unpredictable cryptogram to be used in place of the expected cryptogram. This temporary cryptographic key is a sequence of random data and is shared with the mobile device, so the mobile device could have, just as well, created the random bytes as the temporary cryptographic key and shared them with the application system.

For an example, the MASTERCARD PAYPASS interrogation from the point of sale incorporates an APDU command request called "compute cryptographic checksum" 14 as seen in FIG. 3. The command APDU follows a particular format and may look like this:

80 2A 8E 80 04 00 00 08 99 00

The digits 00 00 08 99 in the APDU command above from the point-of-sale indicate the unpredictable number to be used as an expected cryptogram calculation input. This unpredictable number is a random sequence of numbers that changes with each interrogation the point-of-sale initiates. The format of this APDU command request is discussed in more detail inside the MASTERCARD PAYPASS MSD v3.3 card specification. The immediate APDU response from the mobile device is expected to follow a particular format and may look like this:

77 0F 9F 61 02 B8 92 9F 60 02 FB C7 9F 36 02 00 5E 90 00

The digits B8 92 represent the cryptogram. It is identified by the preceding BER-TLV formatted tag 9F 61 (track 2 CVC3), and length value of 02. It was expected to have been calculated from the unpredictable number issued by the preceding point-of-sale APDU command request in combination with other inputs such as the ATC. A correct expected cryptogram must be calculated using the permanent cryptographic key that is securely stored inside the SE. Because FIG. 23 implements 100% transaction caching, it is not impossible for the expected cryptogram to be calculated after receiving the unpredictable number from the point-ofsale, because in that event, the mobile device would need to access the network to contact the remote repository as in FIG. 16, elements 787 and 793 in order to perform the expected cryptogram calculation. The method of substituting a predetermining a cryptogram, or an unpredictable cryptogram in place of the expected cryptogram, in this case, needs to be applied in order to create this response. With this method applied, the "compute cryptographic checksum" response from the mobile device can be successfully delivered interrogation with the point-of-sale without contacting the remote SE representation during the interrogation. In this case, the cached response may look like this instead:

77 0F 9F 61 02 A4 56 9F 60 02 FB C7 9F 36 02 00 5E 90 00

Where, in one embodiment, the digits A4 56 is the predetermined cryptogram, and NOT calculated using, at least in part, the expected unpredictable number from point-of-sale. Where, in another embodiment, the digits A4 56 is the unpredictable cryptogram, and NOT calculated, at least in part, using the expected permanent cryptographic key rather using a temporary cryptographic. This is an example of "Cryptogram Substitution" technique. The point-of-sale does not have the means or keys to check the received cryptogram for correctness, so it will accept the cryptogram answer because it is of the proper format. The point-of-sale will rely on the authorization request later to verify the correctness of the cryptogram.

In this manner, with some embodiments the entire transaction cache data comprising elements that make up the response to "compute cryptographic checksum" 227 may be returned to the mobile device from the application system over a communication channel prior to point-of-sale interrogation. The transaction cache can be used during interrogation from a point-of-sale to successfully cache the responses to 100% of the interrogation requests without requiring network access to the remote repository and SE during the complete interrogation time. Please also note that the data supplied in the transaction cache response 227 may be literally APDU formatted responses. It may also simply contain all the data required to formulate proper APDU responses without requesting more information from the application system during interrogation time. In this case the mobile device must employ some logic to properly formulate the APDU responses. This logic may also be delivered with transaction cache data 227.

From time to time, such as during a contactless EMV interrogation sequence from the point-of-sale, the point-of-sale may request one of a plurality of cryptograms. In this case, the response to more than one cryptogram type request must be delivered in the transaction cache response 227 over a communication channel. In this case, the mobile device must employ some logic as to which cryptogram response is being requested and direct the mobile device cache appropriately to deliver the correct cryptogram response. This logic may also be delivered with transaction cache data 227.

Also, from time to time, such as during a contactless EMV interrogation sequence, a response during the interrogation with the point-of-sale based on "card risk management" decisions may be implemented. Card risk management is described by the card having enough logic and information about the transaction at the point-of-sale to approve or decline the transaction without consulting an application system or remote processing server. An example of performing card risk management logic using unpredictable data is:

A point-of-sale interrogates a secure element or mobile device and during the process, it indicates to the mobile device it will not be forwarding credential data immediately for authorization of a transaction. This is sometimes called an "offline transaction". At that point during the interrogation, the point-of-sale sends the mobile device unpredictable data, such as a transaction amount that is a portion of the unpredictable data, and requests an approval cryptogram from the SE or mobile device. The SE or mobile device has the ability at that point to make "card risk management" decision as to accept or decline the transaction based on the transaction amount. If the transaction amount is above a "ceiling limit" it may opt to decline the transaction.

The response from a mobile device to a point-of-sale that indicates the decision it has made regarding the card risk management logic is typically formulated with a cryptogram wherein the cryptogram calculation formula is different depending on the type of response to the point-of-sale. So "declining" message from the mobile device may include a different cryptogram that was calculated by a different calculation formula than the cryptogram that is designated for an "approved" message. The card specification will define the different calculation formulas Element 227, in addition to delivering transaction cache information, may also contain logic and data to make decisions regarding card risk management during the interrogation with the point-of-sale.

Element 227, although it may be less secure, in another embodiment could contain the permanent cryptographic key that is used to create an expected cryptogram.

Element 227 in a further embodiment could contain a temporary cryptographic key that is used to create an unpredictable cryptogram.

Element 227 could also contain data required to be used with the encryption key to create the cryptogram such as ATC. This would allow the mobile device to create a cryptogram without consulting the application system and effectively cache a response to a cryptogram request from a point-of-sale during an interrogation. Sharing the permanent cryptographic key with the mobile device would be an alternative to using a predetermined cryptogram to achieve a similar system performance result with the context of 100% transaction caching. Also sharing a temporary cryptographic key with the mobile device wherein the mobile device calculates an unpredictable cryptogram would be an alternative to using a predetermined cryptogram to achieve a similar system performance result with the context of 100% transaction caching. During an authorization step, the verification of correctness method that pertains to the mobile device calculated cryptogram and unpredictable cryptogram compared to a predetermined cryptogram may be different as the mobile device may use the unpredictable data passed from the point-of-sale in the cryptogram calculation. The mobile device may store the transaction cache data and card risk management logic securely in a mobile device cache 221 which can be non-persistent memory or RAM, or possibly encrypted memory.

Figure 24:
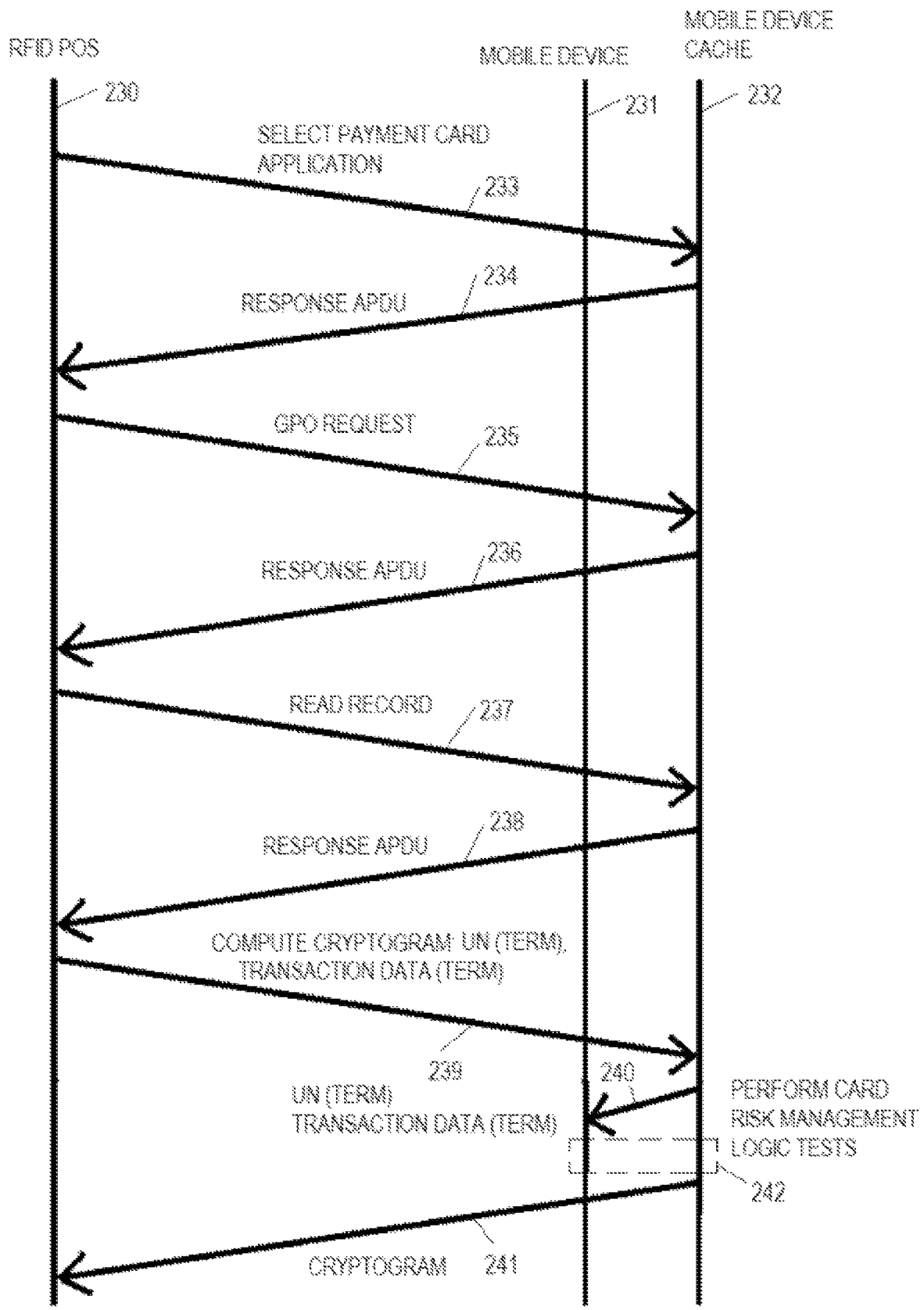
FIG. 24 illustrates an embodiment of an interrogation between a point-of-sale and a mobile device.

FIG. 24 illustrates an interrogation between a point of sale 230 and mobile device 231 sometime after the mobile device has received the mobile device cache data 227 from the application system 222. This interrogation may be carried out over near field communication (NFC) on both the point-of-sale and mobile device. The data protocol layer within this interrogation may be configured for ISO7816-4 and follow APDU command and response formats. FIG. 24 is very similar to the lower half of FIG. 16, with the exception of cryptogram request 239 and response 241 on FIGS. 24 and 787 and 792 of FIG. 16. The APDU response in FIG. 24, element 241 is formulated as a response from the mobile device using the mobile device cache 232 and contains a predetermined cryptogram or an unpredictable cryptogram. Both unpredictable number (UN) and transaction data from the point-of-sale terminal passed to the mobile device 239 are not actively used to create the predetermined cryptogram response 241, however, they are used to create an unpredictable cryptogram response. They are both kept by the mobile device 240 to be transmitted to the application system later over a communication channel. If there are card risk management tests to be performed to determine which predetermined cryptogram or unpredictable cryptogram response 241 is used, they are performed by the mobile device at this time 242. Prior to the cryptogram request 239, the interrogation sequence from the point-of-sale may contain additional requests such as select payment card application 233, which is followed by a response 234 from the mobile device cache, GPO request 235, which is followed by a response 236 from the mobile device cache, and read record request 237, which is followed by a response 238 from the mobile device cache.

Figure 25:
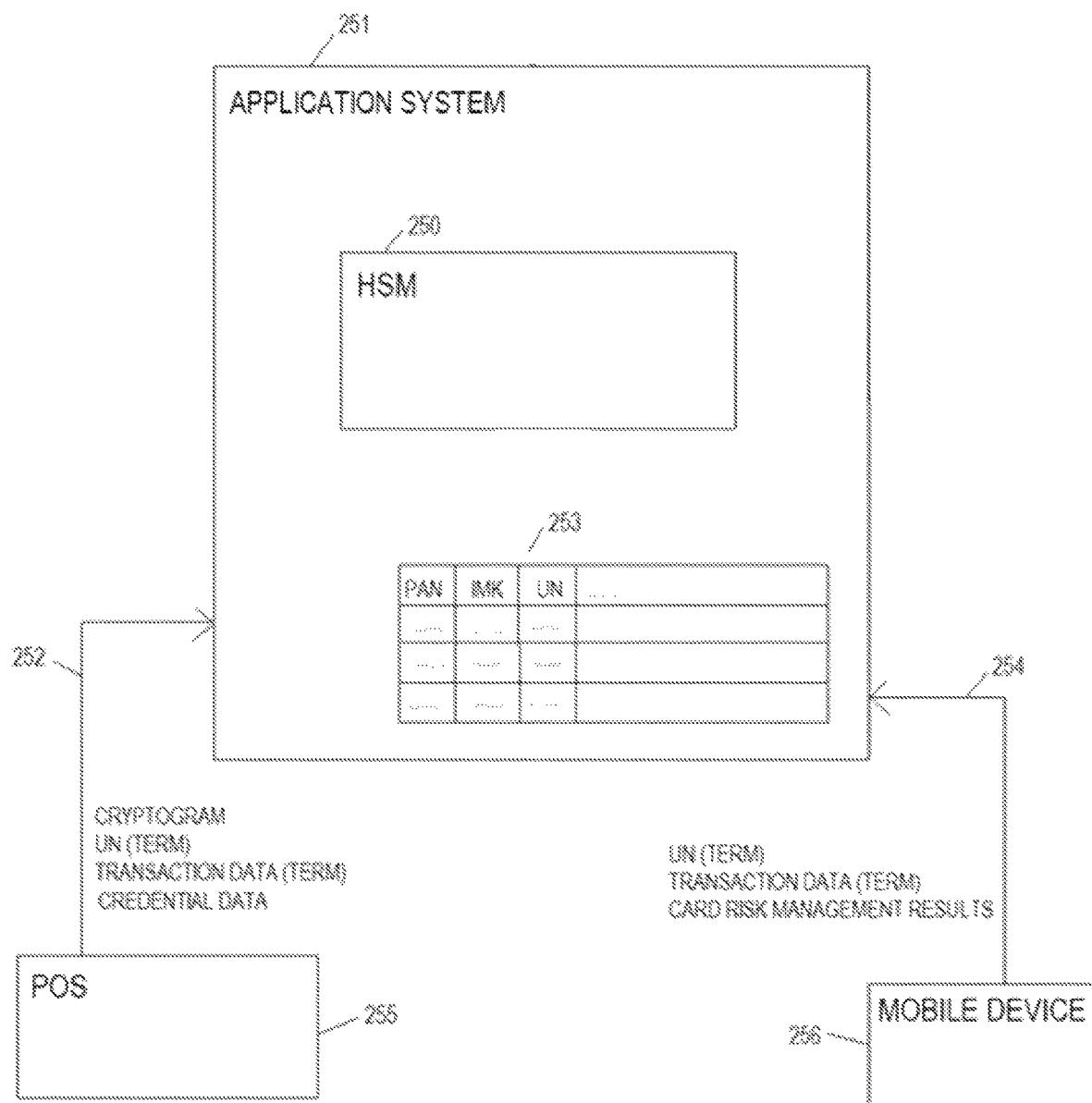
FIG. 25 illustrates an embodiment of transactional data flow from a mobile device and point-of-sale to an application system after an interrogation.

FIG. 25 illustrates an authorization request after an interrogation between a mobile device and a point-of-sale has been performed, such as in FIG. 24. Typically the point-of-sale 255 will formulate an authorization request which may be in the form of ISO8583 format. This format will contain data that pertains to the interrogation such as the cryptogram received from the mobile device, the unpredictable number and transaction data passed to the mobile device for cryptogram calculation, and other credential data. The authorization request will be passed to the application system 251 over a communication channel 252. This communication channel may not go directly to the application system, but may go first to an acquiring gateway, then to an issuing processor, and eventually to the application system 251. This communication channel may be referred to herein as "the interchange". The interchange is a private network that is used exclusively by the payment card industry for the purpose of authorization requests. After the authorization request is received by the application system, the authorization request may be matched to a particular transaction that is listed in the transaction table 210 based on the PAN 211 that is listed in the credential data of the authorization request. The application system will make the authorization decision for the authorization request.

The application system has access to the HSM 250 as well as the transaction table 253 that is also shown in FIG. 22, element 210. It may contain the original randomly created UN 213 and transaction data 215 used to create the predetermined cryptogram. It may contain the predetermined cryptogram. It may also contain a temporary cryptographic key that allows the mobile device to create an unpredictable cryptogram. The cryptogram that was received over the interchange communication channel 252 may be a predetermined cryptogram that may have been originally delivered to the mobile device in the response to a request for transaction cache data (FIG. 23, element 227). The cryptogram that was received over the interchange communication channel 252 may also be an unpredictable cryptogram that was created by the mobile device using a temporary cryptographic key.

In parallel to the data being sent from the point-of-sale to the application system, the mobile device 256, after the interrogation, sends the unpredictable number and transaction data it received from the point-of-sale terminal, the results from the card risk management tests over a separate communication channel 254 to the application system. This separate communication channel may be internet communication over a mobile network. This data from the mobile device was acquired from the point-of-sale and kept by the mobile device as shown in FIG. 24, elements 240 and 242, but may not have been used in the calculation of the cryptogram passed in FIG. 24 element 241. This data, which is sent to the application system by the mobile device 254 may be used to compare and corroboratively verify unpredictable number and transaction data that was separately sent by the point-of-sale 252. The unpredictable number and transaction data reported from the point-of-sale should match the reported unpredictable number and transaction data from the mobile device. Using the term "corroboratively" herein refers to verifying unpredictable data delivered by two separate communication channels.

An added security measure may be implemented that pertains to the data sent from the mobile device to the application system over the communication channel 254. Prior to sending the data, if the data contains transactional amount data for example: "$16.24 USD", that data may be presented to the mobile device display screen 371 from for card holder validation like this: a. "Do you authorize this $16.24 USD purchase?" The card holder may be asked to review and validate the transaction amount by touching the screen 371 or pressing a button 372 for approval. After this card holder approval process, the mobile device may make a decision to send or not send the transactional data, or simply send an "authorization failure" message to the application system, if the transaction amount is not validated on the mobile device by the card holder.

FIG. 26 illustrates the transaction table 262 that is also shown in FIG. 25, element 253 and FIG. 22, element 210. The state of the transaction table in FIG. 26 represents that of after a transaction interrogation has been performed and after the application system has received data from the mobile device as in FIG. 25, element 254. The example of the data received is shown for the unpredictable number from the terminal 260 and the transaction data 261. Both of these numbers may be used to verify an authorization request shown in FIG. 25, element 252, as they could be compared and match that of the authorization request. These numbers also may be used as placeholders to identify that a system authorization is complete.

FIG. 27 illustrates how the application system 270 may make an authorization decision regarding a particular transaction such as that listed in FIG. 26. In one embodiment shown in FIG. 27, a method of verifying a predetermined cryptogram 278 is shown. The data from a row in the transaction list table 262 in FIG. 26, which matches element 272 in FIG. 27, in addition to the cryptogram and PAN passed to the application system 271 by the point-of-sale over a communication channel, may be used to create the input to the "verify cryptogram" request 273. The HSM 275 may then use a particular key that is kept securely inside it to calculate a cryptogram based on the algorithm supplied by the applicable card specification and see if it matches the one passed in 273. Depending on the status of this match, a response is issued back to the application system that indicates "approved" or "denied". Notice that the UN and transaction data from the point-of-sale 276 is NOT used in cryptogram verification, and instead is substituted with the UN 213 and transaction data 215 that was previously created and stored in the application system. In a typical scenario, this is unexpected as the card specification for creating the cryptogram expects the cryptogram to be calculated, at least in part, from the UN and transaction data selected by the point-of-sale 276. Because our application system, prior to the interrogation with the point-of-sale, predetermined these values for unpredictable number and transaction data in order to calculate a predetermined cryptogram, the values in 276 can be ignored for the cryptogram verification process and substituted with the application system values. The emphasis about this figure and how it relates to the verification of a cryptogram is that the input data, at least in part, to the cryptogram verification is NOT the unpredictable number and transaction data passed from the point-of-sale 276 over a communication channel, but instead the randomly generated values that were previously selected and stored in a transaction table are used 272. The unpredictable number and transaction data that was generated by the point-of-sale terminal 276 is never actively used to create or verify the cryptogram, but may be used to match with a reported response from the mobile device 277 after the interrogation as an additional verification method.

In a further embodiment that is not shown but relates to FIG. 27, if a predetermined cryptogram is used that is comprised of random data and not calculated using a cryptographic key, the application system may verify a cryptogram by simply comparing the cryptogram received from the point-of-sale with a reference to a predetermined cryptogram that is kept in the application system.

In a further embodiment shown in FIG. 27, a method of verifying an unpredictable cryptogram 279 is shown. For the verification process 279, the application system would verify the cryptogram from the point-of-sale using the temporary cryptographic key that was assigned to the transaction as seen in table 210, element 380. The temporary key was used by the mobile device to create the unpredictable cryptogram that was sent from the point-of-sale. The inputs for the calculation 391 comprise data from the application system 390 and inputs from the point-of-sale 393. The inputs from the application system may comprise a temporary cryptographic key, and an application transaction counter. The inputs from the point-of-sale may comprise a cryptogram, a PAN, a UN, a transaction data. The application system may then follow the expected algorithm supplied in the card specification for verifying an expected cryptogram with the exception of substituting the expected permanent cryptographic key with the temporary cryptographic key. Notice in this embodiment a permanent cryptographic key is never used for cryptogram verification. Notice the UN and transactional data from the mobile device 392 may not be used for cryptogram verification.

Figure 28:
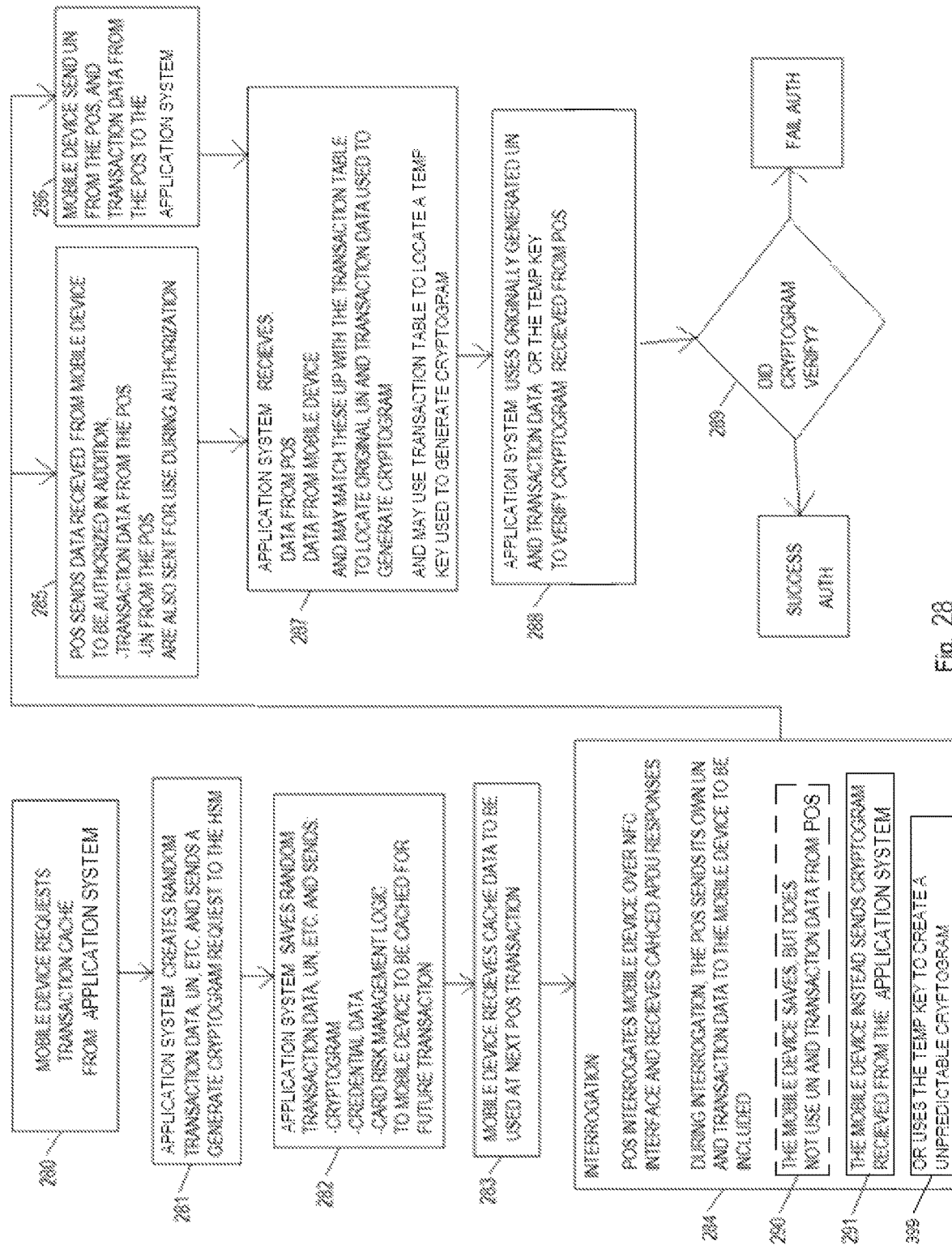
FIG. 28 illustrates an embodiment of an entire authorization data flow between a mobile device and point-of-sale.

FIG. 28 illustrates an overview of the authorization of a transaction process comprising a method for substituting an expected cryptogram with a predetermined cryptogram or unpredictable cryptogram. FIG. 28 also illustrates an overview of the authorization of a transaction process comprising a method of authorization using an expected cryptogram. FIG. 28, for all embodiments, employs the concept of the mobile device without having local access to a permanent cryptographic key that is expected to be used to create an expected cryptogram. FIGS. 21, 22, 23, 24, 25, 26, 27, 29, and 30 all have a part of this process. FIG. 21 illustrates a repository of a plurality of secure element software representations. FIGS. 22, 23 and 29 illustrate how the mobile device shares data with an application system over a communication channel. FIG. 24 illustrates interrogation between a point-of-sale and mobile device. FIGS. 25, 26 and 27 illustrate the authorization process after an interrogation is completed. FIG. 30 illustrates a mobile device that comprises one embodiment of corroborative authorization that displays the transaction amount data for manual verification by a card holder.

In FIG. 28, a mobile device first requests transaction cache information from an application system 280 over a communication channel. The application system may have created or creates at that time random data such as unpredictable number and transaction data that is required to calculate a predetermined cryptogram 281. This random data is similar in format to that of which the point-of-sale would generate at the time of interrogation with the mobile device. The application system keeps this data for later, and shares a predetermined cryptogram with the mobile device 282.

As an alternative to the method of 280, 281, 282, and 283, one embodiment may comprise the application system and the mobile device simply sharing a random sequence of data that represents a predetermined cryptogram. This is possible because the application system is the only entity that both creates and verifies the predetermined cryptogram.

As a further alternative to the method of 280, 281, 282, and 283, a further embodiment may comprise the application system and mobile device sharing a temporary cryptographic key that the mobile devices will use to create an unpredictable cryptogram.

As a further alternative to the method of 280, 281, 282, and 283, a further embodiment, although less secure, comprises the application system sending the permanent cryptographic key needed to create an expected cryptogram to the mobile device to be stored transiently; the mobile device would then have the capability to calculate the expected cryptogram locally when receiving a request for an expected cryptogram from the point-of-sale.

Data may be delivered to the mobile device 283 that comprises, for example, card risk management logic, information needed to respond to "select AID", "get processing options", "read record", and "compute cryptographic checksum" APDU requests during interrogation 282.

The mobile device receives the transaction caching data information over a communication channel and keeps it for use in the next point-of-sale interrogation 283.

As used herein "sending data" from one entity to another such as a mobile device to a remote application system or vice versa should be taken to mean sending the data from one location to another wherein the receiving entity may receive the data as a duplicate from the sending entity or receive the data in parts in addition to receiving information about the data that would enable the receiving entity to reconstruct the original data that was sent from the sending entity.

A point-of-sale performs an interrogation 284 with the mobile device, the mobile device has a cache prepared to answer the point-of-sale APDU requests over its NFC interface. As part of the interrogation, the mobile device receives a request to calculate an expected cryptogram using, at least in part, the unpredictable data sent by the point-of-sale such as an unpredictable number and transaction data.

In one embodiment of the interrogation 284, the mobile device saves, but does not use this unpredictable data from the point-of-sale 290, and instead delivers a response APDU that contains the predetermined cryptogram that is in the mobile device cache 291. The interrogation is completed. In this embodiment, element 399 is not used.

In a further embodiment of the interrogation 284, the mobile device creates an unpredictable cryptogram calculated from a temporary cryptographic key and, at least in part, the unpredictable data from the point-of-sale 399. In this embodiment, elements 290 and 291 are not used.

In a further embodiment of the interrogation 284, the mobile device creates an expected cryptogram calculation from a permanent cryptographic key transiently stored on the mobile device; and, at least in part, the unpredictable data from the point-of-sale. In this embodiment, elements 290, 291, and 399 are not used.

Then, in parallel, the point-of-sale sends data it had acquired from the mobile device during the interrogation, such as the expected cryptogram, predetermined cryptogram or unpredictable cryptogram, and ATC, in addition to details about the transaction to the application system over a communication channel 285; and the mobile device sends, over a separate communication channel, information it had acquired from the interrogation with the point-of-sale such as unpredictable number and transaction data to the application system 286.

It is possible, at this point, for an added "card holder verification" step if transactional data such as transactional dollar amount is delivered to the mobile device from the point-of-sale during the interrogation. The card holder that is using the mobile device may be asked to verify a purchase amount displayed on the mobile device display screen 371 prior to the mobile device sending the data to the application system over the separate communication channel.

The application system then uses the data from the point-of-sale, and optionally from the mobile device, to verify and authorize the transaction 287.

The application system may identify a particular transaction from a transaction table 210 as a transaction using a predetermined cryptogram, unpredictable cryptogram, or an expected cryptogram and proceed with the appropriate verification technique.

The application system may have to compare the unpredictable data sent from the point-of-sale and the unpredictable data sent from the mobile device to corroborate the transaction as an added corroborative verification method 289.

In one embodiment, the application system may verify the predetermined cryptogram with an HSM by using the previously randomly selected unpredictable number 213 and transaction data 215 as part of the input data as a substitute for the unpredictable number and transaction data sent to the application system by the point-of-sale.

In a further embodiment, the verification process could be a simple comparison between the predetermined cryptogram delivered to the mobile device (FIG. 23, elements 226, 227) and the predetermined cryptogram received from the point-of-sale (FIG. 25, element 252).

In a further embodiment, the verification process could be verification of an unpredictable cryptogram using a temporary cryptographic key assigned to the transaction in the transaction table to calculate and verify the unpredictable cryptogram.

In a further embodiment, the verification process is the verification of an expected cryptogram using an HSM that contains a permanent cryptographic key.

If the cryptogram is verified 289, authorization is considered successful, otherwise, it has failed.

FIG. 30 illustrates a mobile device. The mobile device screen 371 is contained within the body of the mobile device 370 and can be configured to display text or graphics. An input button 372 to the mobile device can be used to manually submit input to the mobile device.

FIGS. 21, 22, 23, 24, 25, 26, 27, 28, 29, 30 comprise the method of cryptogram substitution where an expected cryptogram is substituted by either a predetermined cryptogram or an unpredictable cryptogram. The method using an application system that may contain an HSM as a repository for software secure element representations. It is important to note that a cryptogram in these figures may be calculated by using a HSM that securely houses keys used to create a cryptogram. Because the application system, however, is the only entity trusted to both create and verify the cryptogram, the cryptogram that is substituted could effectively be made up of completely random data without the use of an HSM, or created from a temporary cryptographic key assigned to each transaction.

As used herein the term "interrogation" or "interrogation sequence" refers to all the APDU command requests and APDU responses between a mobile device and a point-of-sale using RFID (NFC) required to deliver a complete credential for authorizing a financial transaction to a point-of-sale as defined by a card specification. Typically, an NFC interrogation does not span multiple NFC field entrances and exits. Typically the beginning of an interrogation starts when a mobile device enters the NFC field of a point-of-sale and ends at least prior to when the mobile device exits the NFC field.

An interrogation sequence is can be entirely defined by a card specification and an interrogation is expected to gather all the digital credential data required from the mobile device in order to authorize a financial transaction. The timing of an interrogation or interrogation sequence may also be defined by a card specification. As used herein an interrogation ad heirs to the timing requirement that indicates a maximum interrogation time as specified in the card specification. Maximum interrogation time the time required to complete the entire interrogation. If the card specification does not contain timing requirements that define a maximum interrogation time, the maximum interrogation time is one second as used herein. A "fast interrogation" as used herein refers to an interrogation wherein the maximum interrogation time is to be less than 250 milliseconds. A "super fast interrogation" as used herein refers to an interrogation wherein the maximum interrogation time is to be less than 150 ms. An "ultra fast interrogation" as used herein refers to an interrogation wherein the maximum interrogation time is to be less than 100 ms. An "efficient interrogation" as used herein refers to an interrogation wherein the total interrogation time does not comprise system latency time, wherein system latency time is incurred by sending or receiving data to or from a remote source from a mobile device during the interrogation.

The term transaction as in "100% transaction caching" and other uses, based on context, may be used as a synonym for interrogation or interrogation sequence. Examples of an interrogation and interrogation data are shown in FIGS. 1, 2, and 3.

An interrogation can be considered time sensitive as the likely hood of a successful interrogation sequence greatly increases the shorter it is. This is a property of proximate nature of NFC. It is simply hard to "hover" a mobile device in an NFC field for any long length of time.

Another important aspect of the overall system described herein is the time sensitive nature of the authorization step depicted in FIG. 28 elements 285, 286, 287, 288, and 289. This is the process following the interrogation of authorizing the transaction. In a retail environment, this is expected to take less than 15 seconds and require little or no manual input from the time just after interrogation step to a receipt of an authorization response from the application system. As used herein the term "completed authorization" refers to the part of the method for authorization following that starts when the interrogation step is complete and stopping when the point-of-sale receives an authorization response from the application system. As used herein the term "fast completed authorization step" refers to a completed authorization with a maximum duration time of 15 seconds. As used herein the term "super fast completed authorization" refers to a completed authorization with a maximum duration time of 5 seconds. As used herein the term "authorization step requiring no manual input" refers to a completed authorization that contains no requirement for manual input to the mobile device by a card holder.

The method of Cryptogram Substitution is only possible in the event there is a channel to share a predetermined cryptogram or unpredictable cryptogram between the application system and the mobile device. Because of this channel for delivery, there is never a need for a permanent cryptographic key to be persistently stored local to the mobile device. Persistent storage of a permanent cryptographic key in a second location remote from the application system, as in the typical scenario of distributed secure elements inside plastic cards, is no longer a requirement in the event there is an active communication channel between a mobile device and the remote application system.

In the typical scenario, the SE on the plastic card must create an expected cryptogram independent of the remote application system, because it has no channel to receive the digital credential data. After the interrogation between the plastic card and the point-of-sale, the remote application system is then used to verify the expected cryptogram by the SE after each interrogation. This means the SE and the remote authentication server must both possess a copy of the permanent cryptographic key that generates the expected cryptogram.

In this method of Cryptogram Substitution, because there is a communication channel from the mobile device to the application system, there is no need to distribute a second copy of a permanent cryptographic key, to be stored persistently, and used for expected cryptogram calculation, to the mobile device when it is used as a payment instrument.

As discussed herein, various embodiments describe methods for performing a timely authorization of digital credential data delivered from a mobile device that is without access to a local persistently stored permanent cryptographic key; through an interrogation with a point-of-sale that behaves according to the direction of a card specification. Typically, the card specification expects the mobile device to create a cryptogram that is calculated, at least in part, using a permanent cryptographic key and, at least in part, from unpredictable data delivered from the point-of-sale to the mobile device during the interrogation. A further consideration is that a mobile device may be without power in which case the local permanent cryptographic key would need to be stored persistently in order to function properly in the system when power is restored. A further consideration is that a mobile device, or an application running in the operating system of that mobile device, may have no means to persistently store the permanent cryptographic key locally based on the requirements set forth by the card specification and based on the resources available to the mobile device or application on the mobile device. A further consideration is that the card specification requirements may dictate that the mobile device, or application running in the operating system of that mobile device, is too hostile and vulnerable, based on various criteria, to be qualified to persistently store the permanent cryptographic key in the operating system. A further consideration is that the mobile device or the application running in the operating system of the mobile device, may not have local access to the persistently stored cryptographic key in an embedded SE or embedded secure storage, or any other secure local storage container.

As used herein the terms "point-of-sale", "POS", and "point-of-sale terminal" are synonyms and include, for example, terminals that are installed at merchant checkout counters, automated teller machines (ATMs), self-serve facilities (such as gasoline pumps), and similar service stations where financial transactions are authorized, and the terms also include computers that accept payment card data for authorizing financial transactions. POS terminals may accept payment card data in a plurality of ways including magnetic stripe reading, NFC reading, ISO78161-3 contact card reading, manual typing of card data, etc. As used herein the terms "point-of-sale (POS)" and "point-of-sale terminal" are limited to a point-of-sale that behaves according to the direction of a card specifications during an interrogation with a mobile device such that the point-of-sale controls the interrogation through sending commands to the mobile device and receiving responses from a mobile device.

As used herein the term "mobile device" refers to an electronic communication device having a weight of less than 2 pounds (0.907 kg). Examples of mobile devices are cell phones, smart phones, personal digital assistants (PDAs), electronic book readers and tablet computers, provided that the device weighs less than 2 pounds (0.907 kg).

When it is said herein that a mobile device does not access a local persistently stored permanent cryptographic key, such a reference may include a mobile device that comprises an operating system, with an application that runs in that operating system, such that the application does not have access to a local persistently stored permanent cryptographic key; and/or such that that local persistently stored permanent cryptographic key is expected to be used to calculate an expected cryptogram, and/or such that the expected cryptogram is expected to be contained within at least a portion of the digital credential data sent to the point-of-sale during an interrogation; and/or such that the process is under the direction of the application.

As used herein the term "NFC emulating mobile device" is a mobile device that comprises an operating system, with an application that runs in that operating system, wherein the application has the capability of being interrogated by a point-of-sale in the role of a card, SE, or mobile device as that capability is defined in a card specification.

As used herein the term "secure mobile device" is a mobile device that has access to a local persistently stored permanent cryptographic key; wherein that local persistently stored permanent cryptographic key is expected to be used to calculate the expected cryptogram, wherein the expected cryptogram is expected to be contained within at least a portion of the digital credential data.

A cryptogram may be computed with unpredictable input data such as an unpredictable number (UN) and transaction data such as a transaction amount that is created un-predictably by a point-of-sale terminal. Even though a transaction amount may seem deterministic, it is unpredictable to the authorization system and considered unpredictable data. As used herein, this "unpredictable input data" that is used as input to a cryptogram calculation may for example be an unpredictable number, terminal input data, unpredictable terminal input data, transaction data, a transaction amount, or some other unpredictable data such as a random number, or combinations thereof.

The point-of-sale typically has no means to verify the expected cryptogram it received was actually calculated, at least in part or if at all, by the unpredictable data that it had delivered, or that the expected cryptogram it receives was actually calculated, at least in part or if at all, by the expected permanent cryptographic key. Thus, the mobile device may typically substitute the "expected" cryptogram with an "unexpected cryptogram" without detection of the substitution by the point-of-sale.

Later, the point-of-sale may request an authorization based on data, including the unexpected cryptogram that was received during the interrogation. This data is sent to an authorization authority (application system) for verification and authorization. The authorization authority is assumed to have access to the credential data, including cryptogram calculation keys, automated transaction counter, etc. that are linked to the credential data delivered by the card, SE or mobile device during the interrogation. If the authorizing authority is aware of the substitution and also has access to the unexpected cryptogram itself, or the unpredictable data that may have been used, at least in part, to create it, or the temporary cryptographic key that may have been used, at least in part, to create it, then the authorization authority may successfully verify the correctness of the cryptogram. This may happen either through a simple comparison of the cryptogram delivered by the point-of-sale with the unexpected cryptogram reference in the application system, or by performing correctness verification of the cryptogram delivered by the point-of-sale by re-calculating it.

FIG. 23 discusses the idea of a mobile device requesting cache data to be used in a future interrogation with a point-of-sale. Element 227 indicates the passing of this data from the remote source of the application system to the local source of the mobile device for caching. The data contained in element 227 are data required to respond to a point-of-sale during an interrogation. This could include a predetermined cryptogram. Alternatively, but less secure, this cache data may also include the permanent cryptographic key, in addition with other required data, to calculate an expected cryptogram locally on the mobile device when an expected cryptogram is requested. Alternatively, the cache data may also include a temporary cryptographic key, in addition with other required data, to calculate an unpredictable cryptogram locally on the mobile device. The application system has access to the cryptogram key, and additional data used to calculate a cryptogram, so it has the ability to calculate a cryptogram or simply pass the encryption key to the mobile device with supporting calculation data, and allow the mobile device to calculate the cryptogram during an interrogation.

It is important to note that during many embodiments disclosed herein the application server and mobile device can be said to share information if the data at any point in time is sent from one entity to another. In one example, unpredictable data that are used to create a predetermined cryptogram may be created by the application system and share that data with the mobile device. It is entirely possible that the mobile device creates the unpredictable data and sends it to the application system. Similarly, in another example it is possible that the mobile device creates a predetermined cryptogram made exclusively from random data and sends the predetermined cryptogram to the application system instead of the application system sending the predetermined cryptogram to the mobile device. Similarly, in another example it is possible that the mobile device creates a temporary cryptographic key that is used to create an unpredictable cryptogram and sends it to the application system instead of the inverse.

As previously noted, an application running on an operating system in a mobile device may not have access to a local persistently stored cryptographic key. Consequently it may be said that the mobile device does not have a permanent cryptographic key for use to create an expected cryptogram to be sent to the application system because the permanent cryptographic key is expected to be persistent for the life of the card, and this implies that the mobile device has the means to access the permanent cryptographic key for use during the life of the card which needs to persist through mobile device power cycles; Inversely, however, it is possible for an application system to create the permanent cryptographic key, store it persistently, and send it to the mobile device to be stored transiently.

NFC payment transactions, in particular, may be made secure by using disclosed data connection methods because the security of the transaction is based largely on the data content itself. Each transactional request that is passed through the interrogation phase of the reader and card yields Track1/Track2 equivalent data that change with every subsequent transaction, offering a single credential for each and every transaction. Further, the data content itself is shared-key-based data that may be, with virtually 100% certainty, verified that it was received from a specific card holder secure element. Because of this, the security of the data pipeline that actively transports the data are less important and may actually be considered a non-factor for the security of the financial transaction.

In some embodiments disclosed herein, a specific payment standard issued from MASTERCARD International. This standard is based on reference documentation published by PAYPASS—Mag Stripe (V3.3).pdf and other derivations. In this card specification, PAYPASS contactless payment card reader and card interrogation is documented. This document discusses specifically how an RFID reader interrogator would interact with a card containing a SE to extract and build Track1/Track2 equivalent data that is compatible for existing processing infrastructure, but contains the more secure and dynamic aspects of SE driven credential data.

In some embodiments disclosed herein, provisions are made for managing a remote system containing of a plurality of SE readers, each one being addressable and matched to a particular mobile device.

In some embodiments disclosed herein provisions are made for authenticating and validating a mobile device with a remote system to obtain access to a particular SE within a plurality of SEs in that remote system.

In some embodiments disclosed herein provisions are made for connecting a mobile device to a remote service via activating a data-pass-through mode for ISO7816-4 data commands from an POS RFID reader through a mobile device NFC interface through the mobile device OS, to a data connection to a remote system containing a plurality SEs.

In some embodiments disclosed herein provisions are made for using TCP/UDP/IP sockets to enable a communication channel between a RFID POS reader and a single SE within remote system containing a plurality of SEs.

In some embodiments disclosed herein provisions are made for authenticating over SSL to enable a TCP/UDP/IP socket communication channel between a RFID POS reader and a single SE within a remote system containing a plurality of SEs.

In some embodiments disclosed herein, similar to transaction caching above, provisions are made for one hundred percent transaction caching. These are methods and configurations that allow a mobile device to request a cache from the remote authentication system, where the cache request response encompasses data that can be used to create APDU responses to an entire point-of-sale interrogation sequence that may happen in the future. This cache may be stored securely in non-persistent memory (RAM) in the mobile device and used at the time of interrogation with the RFID (NFC) point-of-sale reader.

Building on systems for local caching as described above, some embodiments may allow a mobile device and an RFID (NFC) point-of-sale reader to interact exclusively with each other at the time of transaction (interrogation) without performing a remote request, which would result in a network delay, using data stored in the mobile device cache.

In some embodiments disclosed herein, provisions are made for substituting a properly formatted predetermined cryptogram that was created without using unpredictable data, at all, from the point-of-sale in place of actively creating and using an expected cryptogram that was created using data, at least in part, from a point-of-sale during an NFC interrogation sequence between a point-of-sale and a mobile device.

In some embodiments disclosed herein, provisions are made for substituting a properly formatted unpredictable cryptogram that was created using a temporary key in place of an expected cryptogram that was created with a permanent cryptographic key.

Cryptogram substitution builds on the advantages by transaction caching because a predetermined cryptogram or unpredictable cryptogram allows for the caching of data on a mobile device that may be used to create a response to a cryptogram request; where the cryptogram request from the point-of-sale expects the cryptogram response to use, at least in part, unpredictable data from the point-of-sale, and a permanent cryptographic key, at least in part, to create an expected cryptogram. Substituting a predetermined cryptogram or unpredictable cryptogram as the data to be used in the expected cryptogram response removes the requirement to use network resources that incur the effect of network latency time while contacting the remote secure element representation to perform the cryptogram calculation. The predetermined cryptogram or unpredictable cryptogram may be delivered to the point-of-sale instead, in this manner, as a "cache hit." When the secure element is said to be remote, it indicates that there is no access to a locally stored permanent cryptographic key to be used in an expected cryptogram calculation.

In some embodiments disclosed herein, provisions are made for a remote source to deliver a permanent cryptographic key, along with any other required data, that are used to create an expected cryptogram in a mobile device. Although, this is a less secure embodiment, as the permanent cryptographic key is exposed to the mobile device, the concept of 100% transaction caching can also be achieved with this embodiment as all of the elements to create an expected cryptogram are now located in the local cache and the mobile device need not access the remote source during the cryptogram calculation phase of the interrogation.

In some embodiments disclosed herein, the mobile device has access to transactional data information such as transactional amount that it acquired during an interrogation with a point-of-sale. This transactional amount may be used as a second verification method to the mobile device user, or card holder. The mobile device may display this amount with a verification request to the mobile device screen. Prior to successful authorization of the request, the application system may use this input in the authorization decision. Advantages to this added verification method is related to added security and confirmation of transaction amount to be authorized. This method further confirms that the user knows the dollar amount that is to be authorized during a financial transaction.

Various embodiments provide a software representation of a SE. The advantages of such embodiments include replacing a concept that may commonly perceived as a hardware solution with a software solution that saves in cost as well as space requirements.

Some embodiments disclosed herein use a base-band processor on the NFC mobile device to do one or all of the following tasks:
   a. Begin a connection to a POS RFID reader through the mobile device's NFC radio interface.
   b. Receive commands through the mobile device's NFC radio interface from the interrogation sequence offered by the POS RFID reader and pass those same commands to a remote system that is configured to receive those commands.
   c. Receive responses from a remote system and pass those responses to a POS RFID reader through the mobile device's NFC radio interface.

Alternatively, some embodiments use the base-band processor in the mobile device to do one or all of the following tasks:
   a. Begin a connection to a remote terminal configured to interrogate using 7816-4 data over TCP/UDP/IP.
   b. Receive commands through this remote terminal interface over TCP/UDP/IP interface from the remote terminal and pass those same commands to a remote system that is configured to receive those commands.
   c. Receive responses from a remote system and pass those responses to a remote terminal that is configured to receive the 7816-4 data over TCP/UDP/IP.

Some embodiments disclosed herein use a remote server network and remote array of secure elements or representations of secure elements (remote system) to do one or all of the following tasks:
   a. Authenticate a particular remote mobile device or owner of a mobile device that wishes to send commands from an interrogator to a SE that is contained in this system.
   b. Properly address a single SE within an array of SEs to respond appropriately to a validated remote device.
   c. Properly route commands that were passed to this system to a particular SE or SE software representation within the system and properly route responses from the SE out of the system to the correct validated remote device.
   d. Properly bypass a remote SE or remote SE representation and respond with static or persistent data that may represent transaction data that may be used in a contactless transaction.

Some embodiments disclosed herein combine both the tasks performed by the NFC mobile device and the remote system to allow for a complete and un-interrupted interrogation between a RFID POS reader or remote terminal and an NFC mobile device. The interrogation may be performed as set forth by payment card standards such as MASTERCARD PAYPASS, VISA Contactless, AMEX EXPRESS_PAY, DISCOVER ZIP, and contactless EMV.

The data link or data connection and communication between the mobile device and the remote system or remote terminal stated above may be carried out over standard TCP/UDP/IP services that are currently available on mobile devices.

Some advantages of various embodiments include:
   a. In the event a mobile device that is used to conduct an NFC payment transaction with an RFID terminal is lost or stolen, the remote system may be notified and communication with the SE may be blocked until the stolen or lost device is recovered or replaced. In the event the device is replaced, new card credentials do not have to be issued again, but a communication channel with the SE may be opened back up and continued upon proper authorization. Prior to this invention, all new SE credentials or cards would have to be re-issued as the hardware that contained the SE itself would have been lost or stolen also.
  b. The SE that is associated with a remote mobile device may be switched to another mobile device fast and easily and is not hardware form factor dependent. The same SE may be used with multiple mobile devices, laptop or desktop computers that have the ability to connect to this remote system that contains the SE over a data connection and authenticate properly.
  c. Compared to changing hardware interfaces, and array of different hardware interfaces, and supported hardware interfaces on a mobile device, a data connection is ubiquitous and standard. SE's currently have various hardware form factors such as:
    i. Embedded microchip (soldered to a circuit board)
    ii. SD, mini-SD, micro-SD interface
    iii. USB interface
    iv. SIM card interface
  Many mobile devices support different sets of the above hardware form factors and many support none of them at all, however, most all mobile devices support a data connection. This ubiquity aids to the portability of SE applications from device to device.
  d. Because some embodiments contain an array of SEs or SE representations, and because the remote system is designed to host and connect SE applications to multiple remote devices, it is possible for multiple remote devices from separate remote device owners to share a single SE from the array of SEs in the remote system. This sort of sharing of space on the SE enables consolidation and ultimately savings by more efficient utilization of memory on an array of SEs.
  e. Because some embodiments do not rely on a hardware specific interface for the SE, but a data connection only. It is a more ubiquitous interface and may be used with more devices without being modified or changed from a hardware perspective.
  f. Because some embodiments use an array or plurality of SEs, the ability to purchase SE chips in quantity for use in this array brings a possibility of a lower over-all cost per SE chip.

Some additional advantages of various embodiments also include:
  a. Using "2 factor" authentication to protect connection to a remote SE from a mobile device. Upon authentication, a connection channel may be opened to a SE that relates to a particular mobile device. 2 factor authentication comprises of "something you have or do" AND "something you know".
  b. An example of using "something you do" and "something you know" is using gestures (moving the phone through 3d space in reasonably reproducible manner) and an accelerometer to measure these gestures on a mobile device to create a "gesture signature" in combination with a typed in pin or password to authenticate to a remote system with an array of SEs as defined in this invention.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

The invention claimed is:

1. A method for secure application-based participation in a payment card transaction authorization process, the method comprising:
  at a mobile device, executing an application in an operating system of the mobile device;
  generating, by a remote computer system, a first non-permanent cryptographic key based on an issuer master key;
  associating, by the remote computer system, the first non-permanent cryptographic key with an account;
  receiving, by the application over a wireless network from the remote computer system, a first set of data associated with the account that has an associated digital credential, the first set of data comprising the first non-permanent cryptographic key associated with the account and an account identifier for the account;
  locally storing the first non-permanent cryptographic key at the mobile device as a local cryptographic key associated with the account;
  receiving, by the application and from a point-of-sale (POS) terminal, unpredictable data;
  implementing, by the POS terminal, an interrogation between the POS terminal and the mobile device defined by a card specification that indicates a receipt, by the POS terminal, of an expected cryptogram calculated using the unpredictable data passed to the mobile device from the POS terminal;
  receiving, by the application, at least one POS command communication sent by the POS terminal over a near field communication (NFC) communication channel, wherein the at least one POS command communication comprises a request for digital credential data to authorize a transaction against the account, the request for digital credential data including a cryptogram request;
  generating, by the application, a response cryptogram (1) using the local cryptographic key associated with the account for encryption, (2) without using a permanent cryptographic key for the digital credential, and (3) without using the unpredictable data passed to the mobile device from the POS terminal;
  sending a device response communication from the mobile device to an electronic reader of the POS terminal through the NFC communication channel, the device response communication comprising an application data protocol unit containing the response cryptogram and the account identifier for the account;
  receiving, by the remote computer system, an authorization request to authorize the transaction from the POS terminal, the authorization request comprising authorization data, wherein the authorization data comprises the response cryptogram and the account identifier;
  determining, by the remote computer system, a current non-permanent cryptographic key associated with the account using the account identifier;

calculating, by the remote computer system, a calculated cryptogram using the current non-permanent cryptographic key associated with the account;
verifying, by the remote computer system, a correctness of the response cryptogram by comparing the calculated cryptogram with the response cryptogram;
sending, by the remote computer system, an authorization response to the POS terminal, wherein the authorization response comprises data determined, at least in part, by the verifying the correctness of the response cryptogram;
generating, by the remote computer system, a second non-permanent cryptographic key based on the issuer master key, the second non-permanent cryptographic key different than the first non-permanent cryptographic key;
associating, by the remote computer system, the second non-permanent cryptographic key with the account;
receiving, by the application over the wireless network from the remote computer system, a second set of data associated with the account, the second set of data comprising the second non-permanent cryptographic key associated with the account and the account identifier for the account;
locally storing the second non-permanent cryptographic key at the mobile device as the local cryptographic key associated with the account; and
generating, by the application, another response cryptogram using the locally stored second non-permanent cryptographic key.

2. The method of claim 1, the first set of data associated with the account and the second set of data associated with the account are received via a data connection over the internet.

3. The method of claim 1, wherein generating the response cryptogram comprises generating a hash using the local cryptographic key associated with the account.

4. The method of claim 1, wherein generating the response cryptogram using the local cryptographic key comprises generating the response cryptogram using a set of inputs of the card specification.

5. The method of claim 1, wherein the first non-permanent cryptographic key and second non-permanent cryptographic key are associated with a remote payment authorization process.

6. The method of claim 1, wherein the digital credential comprises a secure element representation maintained at the remote computer system.

7. The method of claim 1, wherein the first set of data associated with the account comprises substituted Track 1 and/or Track 2 data.

8. The method of claim 7, wherein the substituted Track 1 and/or Track 2 data, if compromised, does not compromise the digital credential associated with the account.

9. A system for secure application-based participation in a payment card transaction authorization process, the system comprising:
a mobile device comprising:
a wireless interface to connect to a wireless network that is separate from a communications channel over which communications are received by the mobile device;
a processor; and
a non-transitory computer readable storage medium accessible by the processor, the computer readable storage medium storing an application executable in an operating system of the mobile device to:
receive over the wireless network from a remote computer system, a first set of data associated with an account having an associated digital credential, the first set of data comprising a first non-permanent cryptographic key associated with the account and an account identifier for the account;
store the first non-permanent cryptographic key at the mobile device as a local cryptographic key associated with the account;
receive, from a point-of-sale (POS) terminal, unpredictable data;
receive at least one POS command communication sent by the POS terminal over a near field communication (NFC) communication channel, wherein the at least one POS command communication comprises a request for digital credential data to authorize a transaction against the account, the request for digital credential data including a cryptogram request;
generate a response cryptogram (1) using the local cryptographic key associated with the account for encryption, (2) without accessing a permanent cryptographic key issued for the digital credential, and (3) without using the unpredictable data passed to the mobile device from the POS terminal;
send a device response communication from the mobile device to an electronic reader of the POS terminal through the NFC communication channel,
wherein the device response communication comprises an application data protocol unit containing the response cryptogram and the account identifier for the account;
receive, over the wireless network from the remote computer system, a second set of data associated with the account, the second set of data comprising a second non-permanent cryptographic key associated with the account and the account identifier for the account;
locally store the second non-permanent cryptographic key at the mobile device as the local cryptographic key associated with the account; and
generate another response cryptogram using the locally stored second non-permanent cryptographic key;
the system further comprising the POS terminal comprising the electronic reader, wherein the POS terminal implements an interrogation between the POS terminal and the mobile device defined by a card specification that indicates a receipt, by the POS terminal, of an expected cryptogram calculated using the unpredictable data passed to the mobile device from the POS terminal; and
the system further comprising the remote computer system, the remote computer system comprising:
a second wireless interface to connect to the wireless network;
a second memory; and
a second processor, wherein the second processor is configured to:
generate the first non-permanent cryptographic key based on an issuer master key;
associate the first non-permanent cryptographic key with the account;

receive an authorization request to authorize the transaction from the POS terminal, the authorization request comprising authorization data, wherein the authorization data comprises the response cryptogram and the account identifier;

determine a current non-permanent cryptographic key associated with the account using the account identifier;

calculate a calculated cryptogram using the current non-permanent cryptographic key associated with the account;

verify a correctness of the response cryptogram by comparing the calculated cryptogram with the response cryptogram;

send an authorization response to the POS terminal, wherein the authorization response comprises data determined, at least in part, by the verifying the correctness of the response cryptogram;

generate the second non-permanent cryptographic key based on the issuer master key, the second non-permanent cryptographic key different than the first non-permanent cryptographic key; and associate the second non-permanent cryptographic key with the account.

10. The system of claim 9, wherein the application is further executable to change the local cryptographic key associated with the account between interrogations.

11. The system of claim 9, wherein the application is further executable to request and receive the first set of data associated with the account and the second set of data associated with the account via a data connection over the internet to the remote computer system.

12. The system of claim 9, wherein generating the response cryptogram comprises generating a hash comprising encrypted data.

13. The system of claim 9, wherein generating the response cryptogram using the local cryptographic key comprises generating the response cryptogram using a set of inputs of the card specification.

14. The system of claim 9, wherein the digital credential comprises a secure element representation for the account.

15. The system of claim 9, wherein the first set of data associated with the account comprises substituted Track 1 and/or Track 2 data.

16. The system of claim 15, wherein the substituted Track 1 and/or Track 2 data, if compromised, does not compromise the digital credential associated with the account.

* * * * *

UNITED STATES PATENT AND TRADEMARK OFFICE
CERTIFICATE OF CORRECTION

| | | |
|---|---|---|
| PATENT NO. | : 12,033,157 B2 | Page 1 of 1 |
| APPLICATION NO. | : 17/724921 | |
| DATED | : July 9, 2024 | |
| INVENTOR(S) | : Charles Douglas Yeager | |

It is certified that error appears in the above-identified patent and that said Letters Patent is hereby corrected as shown below:

In the Specification

Column 1, Line 9, under CROSS REFERENCES TO RELATED APPLICATIONS, delete "from" and insert -- from U.S. patent application Ser. No. 15/996,113, filed on Jun. 1, 2018, now abandoned, which is a continuation of --.

In the Claims

Column 51, Line 31, in Claim 2, delete "the" and insert -- wherein the --.

Signed and Sealed this
Twenty-fourth Day of September, 2024

Katherine Kelly Vidal
*Director of the United States Patent and Trademark Office*